(12) United States Patent
Yamamoto et al.

(10) Patent No.: US 10,838,628 B2
(45) Date of Patent: Nov. 17, 2020

(54) STORAGE SYSTEM AND CONTROL METHOD OF MAINTAINING RELIABILITY OF A MOUNTED FLASH STORAGE

(71) Applicant: HITACHI, LTD., Tokyo (JP)

(72) Inventors: Akira Yamamoto, Tokyo (JP); Akifumi Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/119,598

(22) Filed: Aug. 31, 2018

(65) Prior Publication Data
US 2019/0138227 A1 May 9, 2019

(30) Foreign Application Priority Data

Nov. 6, 2017 (JP) .................. 2017-214020

(51) Int. Cl.
*G06F 3/06* (2006.01)
*G06F 12/16* (2006.01)

(52) U.S. Cl.
CPC ............ *G06F 3/0616* (2013.01); *G06F 3/064* (2013.01); *G06F 3/0634* (2013.01); *G06F 3/0658* (2013.01); *G06F 3/0679* (2013.01); *G06F 3/0688* (2013.01); *G06F 12/16* (2013.01)

(58) Field of Classification Search
CPC ...... G06F 3/0616; G06F 3/0634; G06F 3/064; G06F 3/0658; G06F 3/0679; G06F 3/0688; G06F 11/004; G06F 11/008; G06F 12/16; G06F 2201/81
See application file for complete search history.

(56) References Cited

U.S. PATENT DOCUMENTS

| | | |
|---|---|---|
| 2012/0005402 A1 | 1/2012 | Yamamoto et al. |
| 2012/0079167 A1 | 3/2012 | Yao et al. |
| 2012/0191900 A1* | 7/2012 | Kunimatsu ......... G06F 12/0223 711/103 |
| 2012/0240012 A1 | 9/2012 | Weathers et al. |
| 2012/0317333 A1 | 12/2012 | Yamamoto et al. |
| 2014/0293692 A1* | 10/2014 | Chen ...................... G11C 16/06 365/185.11 |

(Continued)

FOREIGN PATENT DOCUMENTS

| | | |
|---|---|---|
| JP | 2012-068986 A | 4/2012 |
| JP | 2016-004387 A | 1/2016 |

(Continued)

OTHER PUBLICATIONS

Japanese Office Action dated Jul. 14, 2020 for Japanese Application No. 2017-214020 (with English translation).

*Primary Examiner* — Aracelis Ruiz
(74) *Attorney, Agent, or Firm* — Baker Botts L.L.P.

(57) ABSTRACT

A storage system includes a flash storage in which a plurality of flash chips are accommodated and a storage controller that reads/writes data from and on the flash storage in response to a request from a high-order device, the flash chip capable of changing a mode of a cell of the flash chip to a first mode and a second mode in which an amount of storable information is less but a lifetime is longer than in the first mode, and a control method of the storage system is provided. The storage system includes: a prediction unit; a determination unit; and a mode change.

11 Claims, 33 Drawing Sheets

(56) References Cited

U.S. PATENT DOCUMENTS

| | | | |
|---|---|---|---|
| 2015/0293713 A1* | 10/2015 | Seo | G06F 12/0246 |
| | | | 711/103 |
| 2015/0363105 A1 | 12/2015 | Nakao et al. | |
| 2017/0269863 A1* | 9/2017 | Wada | G06F 3/0664 |
| 2018/0052724 A1* | 2/2018 | Lee | G06F 3/061 |

FOREIGN PATENT DOCUMENTS

| | | |
|---|---|---|
| WO | WO 2011/010344 A1 | 1/2011 |
| WO | WO 2012/168962 A1 | 12/2012 |
| WO | WO 2016/163016 A1 | 10/2016 |
| WO | WO 2017/090176 A1 | 6/2017 |

\* cited by examiner

FIG. 5

2000 LOGICAL VOLUME INFORMATION

| | |
|---|---|
| LOGICAL VOLUME ID | ~ 2001 |
| LOGICAL CAPACITY | ~ 2002 |
| LOGICAL VOLUME RAID TYPE | ~ 2003 |
| ACTUAL PAGE POINTER | ~ 2004 |
| ... | ⋮ |
| ACTUAL PAGE POINTER | ~ 2004 |

FIG. 6

2100 ACTUAL PAGE INFORMATION

| |  |
|---|---|
| FLASH PACKAGE GROUP ID | 2101 |
| ACTUAL PAGE ADDRESS | 2102 |
| EMPTY ACTUAL PAGE POINTER | 2103 |
| PAGE ALLOCATION TIME | 2104 |
| PAGE WRITE AMOUNT | 2105 |
| MOVEMENT PROGRESS FLAG | 2106 |
| MOVEMENT DESTINATION ACTUAL PAGE | 2107 |
| MOVEMENT STANDBY FLAG | 2108 |

FIG. 7

2500 FLASH PACKAGE INFORMATION

| | |
|---|---|
| FLASH PACKAGE ID | 2501 |
| FLASH PACKAGE CAPACITY | 2502 |
| VIRTUAL BLOCK CAPACITY | 2503 |

FIG. 8

2300 FLASH PACKAGE GROUP INFORMATION

| | |
|---|---|
| FLASH PACKAGE GROUP ID | ~ 2301 |
| PACKAGE GROUP RAID TYPE | ~ 2302 |
| ACTUAL NUMBER-OF-PAGES | ~ 2303 |
| EMPTY ACTUAL NUMBER-OF-PAGES | ~ 2304 |
| FLASH PACKAGE POINTER | ~ 2305 |
| ... | ⋮ |
| FLASH PACKAGE POINTER | ~ 2305 |
| UNUSABLE ACTUAL NUMBER-OF-PAGES | ~ 2306 |

*FIG. 12*

3000 PACKAGE INFORMATION

| | |
|---|---|
| PACKAGE ID | 3001 |
| PACKAGE CAPACITY | 3002 |
| ACTUAL NUMBER-OF-BLOCKS | 3003 |
| VIRTUAL NUMBER-OF-BLOCKS | 3004 |
| VIRTUAL BLOCK CAPACITY | 3005 |
| BLOCK NUMBER-OF-ERASURES | 3006 |
| MEASUREMENT START TIME | 3007 |
| INTERNAL INFORMATION STORAGE NUMBER-OF-BLOCKS | 3008 |
| INTERNAL INFORMATION STORAGE ADDRESS | 3009 |

FIG. 13

3100 CHIP INFORMATION

| | |
|---|---|
| CHIP ID | ~ 3101 |
| CHIP ACTUAL NUMBER-OF-BLOCKS | ~ 3102 |
| CHIP EMPTY ACTUAL NUMBER-OF-BLOCKS | ~ 3103 |
| CONNECTION BUS ID | ~ 3104 |
| ... | ⋮ |
| CONNECTION BUS ID | ~ 3104 |

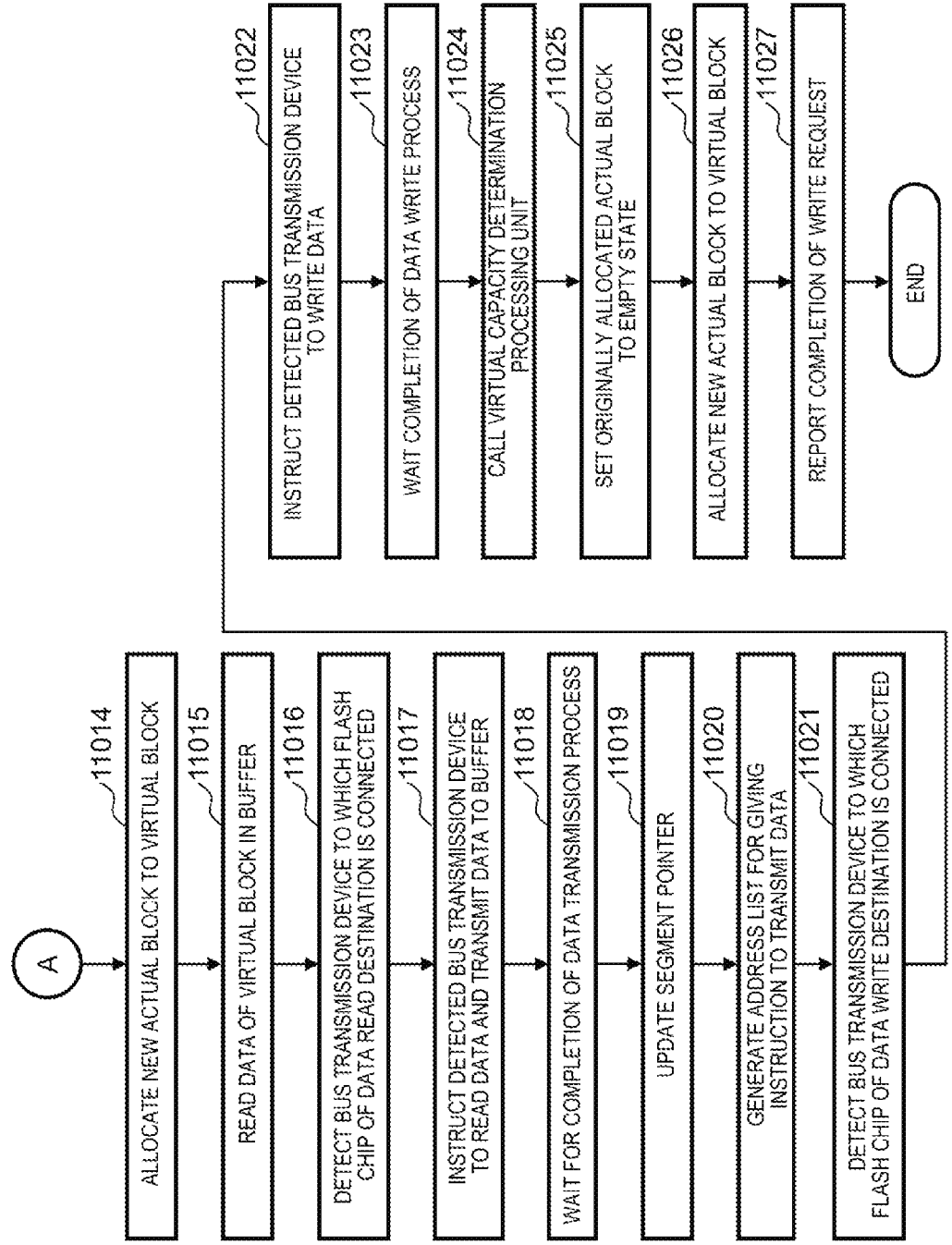

FIG. 29

15000 ACTUAL PAGE INFORMATION

| | |
|---|---|
| FLASH PACKAGE GROUP ID | ~ 2101 |
| ACTUAL PAGE ADDRESS | ~ 2102 |
| EMPTY ACTUAL PAGE POINTER | ~ 2103 |
| PAGE ALLOCATION TIME | ~ 2104 |
| PAGE WRITE AMOUNT | ~ 2105 |
| PAGE CELL MODE | ~ 15001 |
| MOVEMENT PROGRESS FLAG | ~ 2106 |
| MOVEMENT DESTINATION ACTUAL PAGE | ~ 2107 |
| MOVEMENT STANDBY FLAG | ~ 2108 |

STORAGE SYSTEM AND CONTROL METHOD OF MAINTAINING RELIABILITY OF A MOUNTED FLASH STORAGE

CLAIM OF PRIORITY

The present application claims benefit of priority to Japanese Patent Application No. 2017-214020, filed on Nov. 6, 2017, the content of which is hereby incorporated by reference into this application.

BACKGROUND OF THE INVENTION

1. Field of the Invention

The present invention relates to a storage system and a control method thereof and is suitably applied to a storage system on which a flash storage capable of mutually and dynamically changing, for example, a mode of a cell (hereinafter simply referred to as a cell mode) between a triple-level cell (TCL) and a quadruple level cell (QLC) is mounted.

2. Description of Related Art

In recent years, application of flash storages to storage systems has rapidly progressed with a reduction in prices of flash memories. While flash memories operate at high speeds, the flash memories are still expensive compared to magnetic disks. Therefore, technologies for reducing prices of flash memories are currently being developed.

As one of the technologies, there is a multi-valued technology for enabling a plurality of bits to be written on one cell of a flash memory. At present, while a TLC technology capable of writing triple values on one cell has been practically applied, a QLC technology capable of writing quadruple values on one cell is successively being developed.

On the other hand, flash memories have lifetimes. In flash memories, it is difficult to rewrite data and new data cannot be written unless data is erased in a storage region unit called a block. However, there is an upper limit to the number of erasures, and thus an allowed number of erasures may sharply decrease because of multi-valuation. For example, when a cell mode is TLC (hereinafter this mode is referred to as a TLC mode), the upper limit of the number of erasures is said to be thousands of times. On the other hand, when the cell mode is QLC (hereinafter this mode is referred to as a QLC mode), the upper limit of the number of erasures is said to decrease to hundreds of times.

Flash memories of which the number of erasures reaches the upper limit becomes unusable. Therefore, a decrease in the allowed number of erasures in association with the multi-valued flash memories described above results in a decrease in an amount of updatable data for users of the flash storages, that is, an amount of data writable on the flash storages. Even when rewriting of data is focused on some of the regions in a flash storage and updating of data is not possible only in some of the regions, the flash storage may not be used. Therefore, as a technology related to a storage system on which a flash storage is mounted as storage medium, a technology called wear leveling designed to equalize the number of erasures of each block has been widely adopted.

In fields of storages, when storage devices are broken down during a given period after purchase, the storage devices are exchanged free of charge. At present, this period (hereinafter referred to as a warranty period) is generally 5 years. Therefore, when many applications are used in a flash storage to which the QLC technology is applied, the number of erasures of the flash storage may reach the upper limit of an amount of writable data or the limit of the number of erasures within 5 years, and thus it is said that it is difficult to apply past business models. On the other hand, it is said that applications in which a frequency of a write process is low can be used in flash storages to which the QLC technology is applied.

The technology disclosed in JP-A-2012-68986 relates to a flash memory that has a dynamic cell changing function. This technology relates to a function capable of dynamically changing a cell mode of each block and is, for example, a technology capable of dynamically changing the cell mode from the QLC mode to the TLC mode. When the cell mode of the flash memory is changed from the QLC mode to the TLC mode, an amount of data which can be stored in the flash memory is ¾.

WO2011/010344 discloses a technology called global wear leveling. As described above, control is executed such that the number of erasures of each block is equalized inside a flash memory. The global wear leveling is a technology for equalizing the number of erasures between a plurality of flash storages by moving data of some of the flash storages to the other flash storages when the number of erasures of some of the flash storages increases.

Further, WO 2012/168962 discloses a technology related to a flash storage that has a compression function. When the compression function is mounted on the flash storage, an amount of data which can be stored in the flash storage from the viewpoint of a control device is changed in accordance with a compression ratio of a compression process executed in the flash storage. Accordingly, WO 2012/168962 discloses the technology for predicting an amount of data storable in a flash storage, notifying a control device of the prediction result, and controlling the amount of data stored in the flash storage in accordance with the prediction result on the side of the control device.

Whether a flash storage using the QLC technology can be used for 5 years, as described above, depends on a write frequency of applications in which the flash storage is used. However, when customers purchase flash storages, it is difficult to accurately expect write frequencies of applications to be used by the customers. Since a storage system is used by various applications mounted on a host device and a single flash storage is also used by a plurality of applications, it is difficult to beforehand predict whether a flash storage using the QLC technology can be used for 5 years.

Accordingly, when whether the flash storage using the QLC technology can be used for 5 years is predicted in accordance with a use situation of a user and the cell mode can be dynamically switched from the QLC mode to the TLC mode in only a predicted storage region in which the flash storage can be used for 5 years, it is considered that a highly reliable storage system capable of maintaining performance of the flash storage within a warranty period can be constructed while effectively utilizing storage resources.

SUMMARY OF THE INVENTION

The invention is devised in view of the foregoing circumstances and proposes a storage system and a control method thereof capable of maintaining reliability of a mounted flash storage while effectively utilizing storage resources.

In order to solve the foregoing problems, according to an aspect of the invention, there is provided a storage system including a flash storage in which a plurality of flash chips are accommodated and a storage controller that reads/writes data from and on the flash storage in response to a request from a high-order device, the flash chip capable of changing a mode of a cell of the flash chip to a first mode and a second mode in which an amount of storable information is less but a lifetime is longer than in the first mode. The storage system includes: a prediction unit that predicts a lifetime of a first storage region for each first storage region to compare the lifetime with a target period; a determination unit that determines the first storage region in which the mode of the cell is changed based on a comparison result of the prediction unit; and a mode change unit that changes the mode of the cell of the corresponding first storage region in accordance with a determination result of the determination unit.

According to another aspect of the invention, there is provided a control method of a storage system including a flash storage in which a plurality of flash chips are accommodated and a storage controller that reads/writes data from and on the flash storage in response to a request from a high-order device, the flash chip capable of changing a mode of a cell of the flash chip to a first mode and a second mode in which an amount of storable information is less but a lifetime is longer than in the first mode. The control method includes: a prediction step of predicting a lifetime of a first storage region for each first storage region and comparing the lifetime with a target period by a prediction unit; a determination step of determining the first storage region in which the mode of the cell is changed based on a comparison result of the prediction unit by a determination unit; and a mode change step of changing the mode of the cell of the corresponding first storage region in accordance with a determination result of the determination unit by a mode change unit.

According to still another aspect of the invention, there is provided a storage system including a plurality of flash chips and a controller that controls reading/writing of data from and on the flash chips in response to a request from a high-order device, the flash chip capable of changing a mode of a cell of the flash chip to a first mode and a second mode in which an amount of storable information is less but a lifetime is longer than in the first mode. The storage system includes: a prediction unit that predicts a lifetime of a first storage region for each first storage region to compare the lifetime with a target period; a determination unit that determines the first storage region in which the mode of the cell is changed based on a comparison result of the prediction unit; and a mode change unit that changes the mode of the cell of the corresponding first storage region in accordance with a determination result of the determination unit.

In the storage system and the control method thereof according to the aspects of the invention, it is possible to maintain the mode of each first storage region of the flash storage to the first mode in which an amount of information which can be stored in the mode of each first storage region of the flash storage while preventing the degree of deterioration of the first storage region from reaching a limit of the degree of the deterioration beforehand within a target period.

According to the invention, it is possible to realize the storage system and the control method thereof capable of maintaining reliability of a mounted flash storage while effectively utilizing storage resources.

BRIEF DESCRIPTION OF THE DRAWINGS

FIG. 5 is a conceptual diagram illustrating a configuration of logical volume information;

FIG. 6 is a conceptual diagram illustrating a configuration of actual page information;

FIG. 7 is a conceptual diagram illustrating a configuration of flash package information;

FIG. 8 is a conceptual diagram illustrating a configuration of flash package group information;

FIG. 12 is a conceptual diagram illustrating a configuration of package information;

FIG. 13 is a conceptual diagram illustrating a configuration of chip information;

FIG. 25B is a flowchart illustrating a processing procedure of the data write process;

FIG. 29 is a conceptual diagram illustrating a configuration of actual page information according to a second embodiment;

DESCRIPTION OF EMBODIMENTS

Hereinafter, embodiments of the invention will be described in detail with reference to the drawings.

Figure 1:
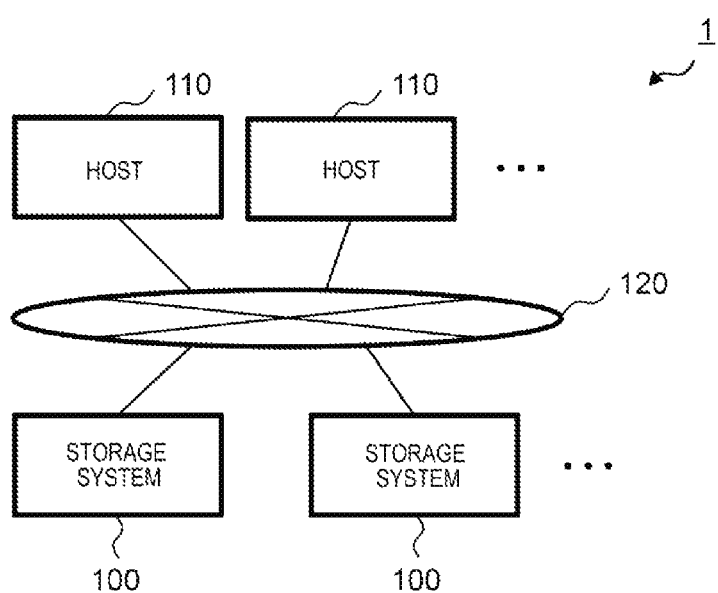
FIG. 1 is a block diagram illustrating a configuration of an information system according to an embodiment.

(1) First Embodiment (1-1) Configuration of Information System According to Embodiment In FIG. 1, reference numeral 1 overall denotes an information system according to a first embodiment. The information system 1 includes storage systems 100 and hosts 110, which are connected via a network 120 such as a storage area network (SAN).

The host 110 is a computer device (high-order device) on which a user application operates, and reads and writes data necessary in the storage system 100 via the network 120. Communication between the storage system 100 and the hosts 110 via the network 120 is executed using a protocol in which, for example, a small computer system interface (SCSI) command such as a fibre channel (FC) can be transmitted.

Hereinafter, a capacity virtualization function is assumed to be mounted on the storage system 100 in the following description. The capacity virtualization function is a function of supplying a virtual logical volume (hereinafter referred to as a virtual volume) to the host 110, allocates a storage region to the virtual volume in a capacity unit with a predetermined size called a "page" dynamically in response to a write request on the virtual volume from the host 110, and writing write target data on the allocated storage region. Here, the invention is effective even when the capacity virtualization function is not mounted on the storage system 100.

In general, a control unit in the capacity virtualization function is a "page," as described above. The "page" in the embodiment is equivalent to a page used in a capacity virtualization technology of the related art disclosed in WO 2012/168962. Therefore, the size of the "page" in the embodiment is greater than a storage region called a "block" which is an erasure unit in the flash memory.

In general, in fields of flash memories, a unit of a storage region in which data is read/written is called a page. The page generally has a less capacity than a block. However, the "page" in the embodiment means a page in the capacity virtualization technology, as described above, and the size of the page is greater than that of a "block." Accordingly, hereinafter, a read and write unit of data in a flash memory is referred to as a "segment" to distinguish the read/write unit from the page which is the control unit of the capacity virtualization technology.

Figure 2:
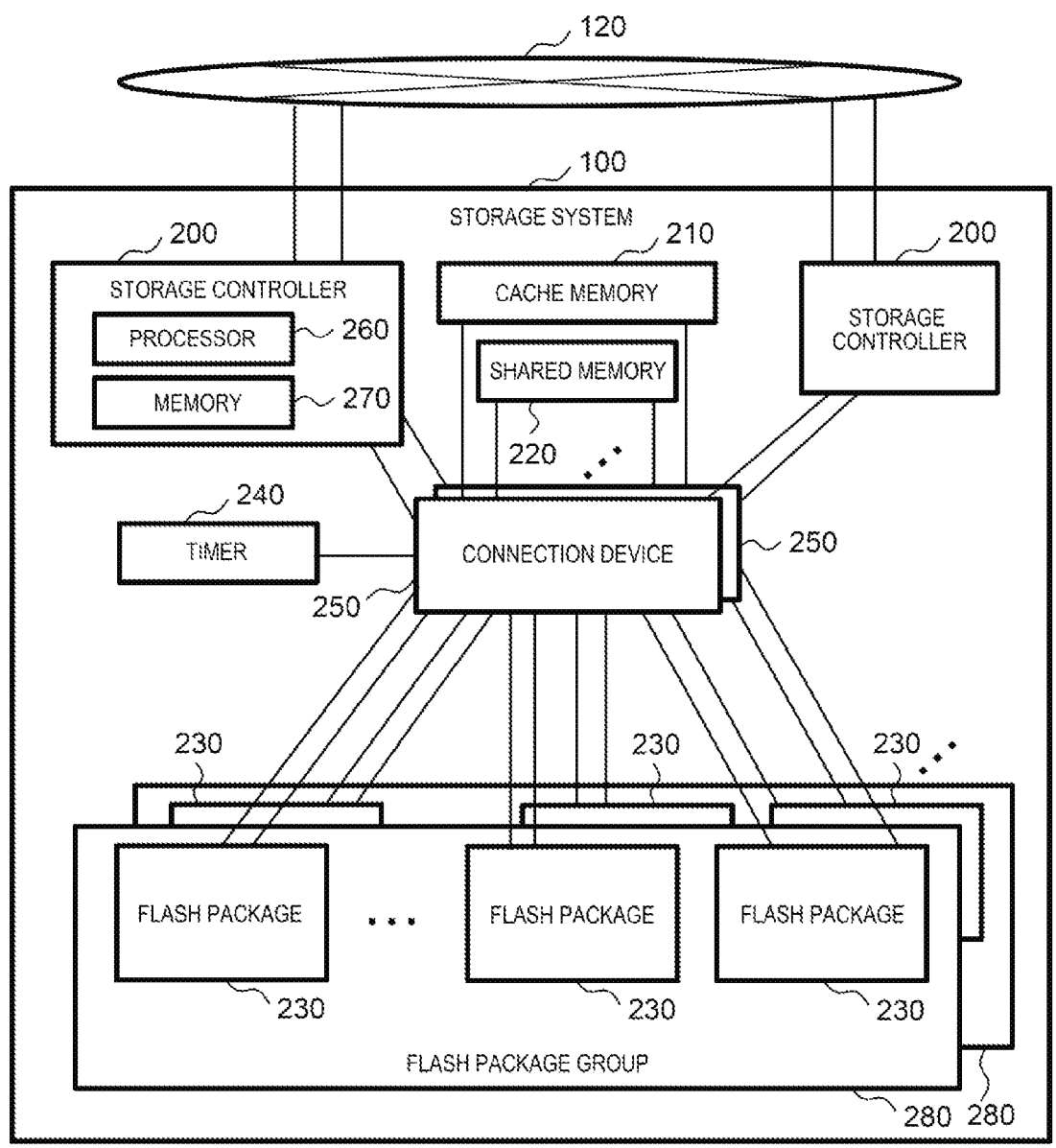
FIG. 2 is a block diagram illustrating a configuration of a storage system.

FIG. 2 illustrates a configuration example of the storage system 100 according to the embodiment. The storage system 100 includes one or more storage controllers 200, a cache storage device 210, a shared memory 220, a flash package 230, a timer 240, and one or more connection devices 250 connecting the constituent elements to each other.

The storage controller 200 is a control device that governs operation control of the whole storage system 100 and includes a processor 260 and a memory 270. The processor 260 executes a read/write process in response to a read/write request issued from the host 110 and various processes to be described below based on a program stored in the memory 270. The memory 270 is configured with, for example, a semiconductor memory and is used to retain a necessary program or information.

The cache storage device 210 and the shared memory 220 are each configured with a volatile memory such as a dynamic random access memory (DRAM). In the embodiment, the cache storage device 210 and the shared memory 220 are assumed to be backed up by a battery or the like to be nonvolatile. Here, the invention is effective even when the cache storage device 210 and the shared memory 220 are not nonvolatile.

The cache storage device 210 is used to temporarily retain data read from or written on the flash package 230. Here, of the data, data of which an access frequency from the storage controller 200 is high is retained in the cache storage device 210 without change. When a write request and write target data are received from the host 110, the storage controller 200 transmits, to the host 110, completion notification of a write process in a stage in which the data is written on the cache storage device 210. Here, the storage controller 200 may transmit, to the host 110, the completion notification of the write process in a stage in which the data is completely stored in the flash package 230.

The shared memory 220 stores control information of the cache storage device 210, important management information in the storage system 100, and contact information and synchronization information between the storage controllers 200.

The flash package 230 is a storage device that supplies a storage region for reading and writing data from the host 110. The details of the flash package 230 will be described below. The storage controller 200 manages the flash package 230 as a group that forms a redundancy array independent device (RAID) (hereinafter referred to as a flash package group) 280 in a predetermined number unit. Storage regions supplied by the single flash package group 280 or the plurality of flash package groups 280 are managed as a pool and a single logical volume or a plurality of logical volumes are defined on the pool. The logical volume is supplied as a storage region for reading/writing data to the host 110.

The number of flash packages 230 that form the single flash package group 280 differs in accordance with an RAID level set in the flash package group 280. Here, the invention is effective even when an RAID function is not mounted on the storage controller 200.

Hereinafter, all the storage media in the storage system 100 are assumed to be the flash packages 230. However, for example, different storage media other than the flash packages 230 such as hard disks may be mounted on the storage system 100. Further, hereinafter, the capacities of the flash packages 230 are assumed to be the same. However, the invention is effective even when the capacities of some of the flash packages 230 are different from the capacities of the other flash packages 230.

The timer 240 is a timepiece that counts a current time and can be referred to from all the storage controllers 200. Here, a time managed by the timer 240 may not necessarily be an absolute time. The timer 240 may be a counter indicating a value equivalent to a time elapsed from a certain time point.

The connection device 250 is configured with, for example, a network switch and connects the constituent elements in the storage system 1oo to each other. In the embodiment, to realize high reliability, each flash package 230 is assumed to be connected to the plurality of storage controllers 200 via the plurality of connection devices 250. Here, the invention is effective even when one flash package 230 is not connected to only one connection device 250.

Figure 3:
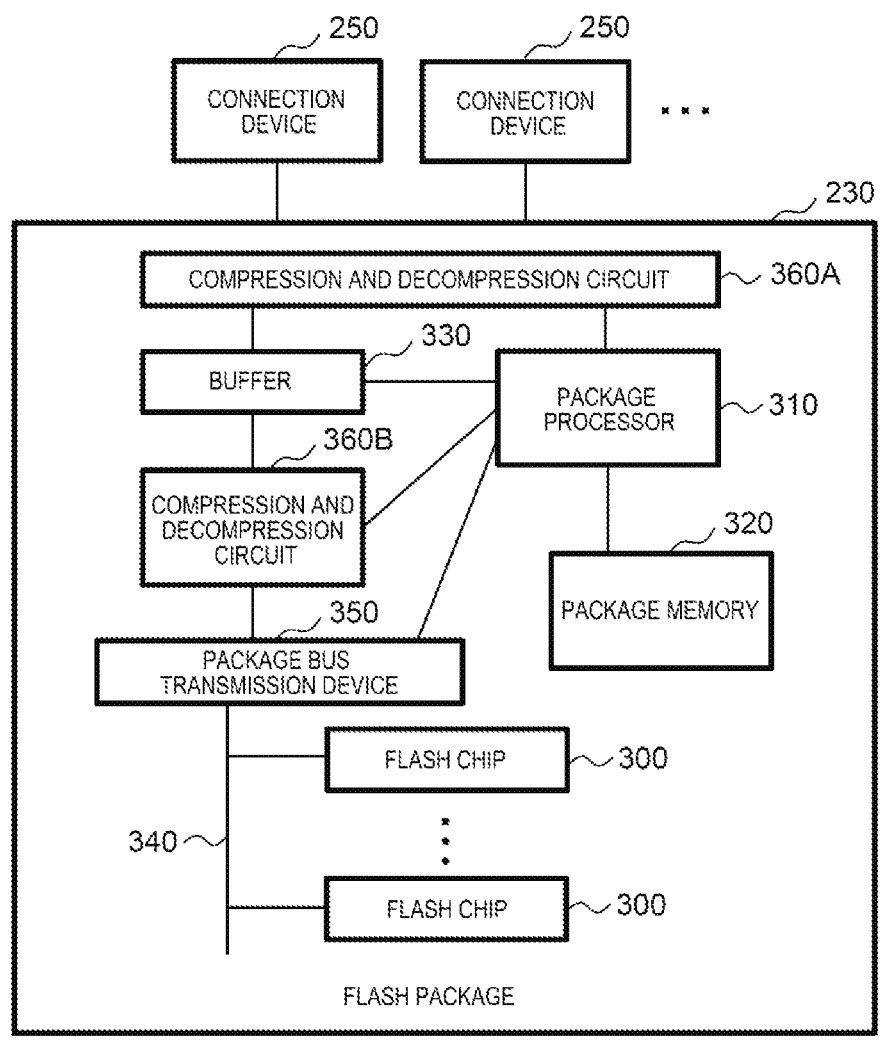
FIG. 3 is a block diagram illustrating a configuration of a flash package.

FIG. 3 illustrates a configuration example of the flash package 230. The flash package 230 includes a plurality of flash chips 300, a package processor 310, a package memory 320, a buffer 330, a package bus 240, and a package bus transmission device 350. The invention is effective even when the flash package 230 includes a compression and decompression circuit 360A or 360B and a compression process can be executed in the flash package 230.

Here, in FIG. 3, the compression and decompression circuit 360A is a compression and decompression circuit that compresses/decompresses data stored in the buffer 330 and writes the data back on the buffer 330, and the compression and decompression circuit 360B is a compression/decompression circuit that compresses and decompresses data at a timing when data is exchanged between the buffer 330 and the package bus transmission device 350. When functions of compressing and decompressing data in the flash memory 230 are mounted, one of the two compression and decompression circuits 360A and 360B may be mounted on the flash package 230.

The flash chip 300 is a flash memory chip using a QLC technology. The flash chip 300 can dynamically change the cell mode from the QLC mode to the TLC mode under the control of the package processor 310.

The package processor 310 is a processor that executes various processes in accordance with a program stored in the package memory 320. For example, the package processor 310 receives a read/write request from the storage controller 200 and executes a read/write process in response to the received read/write request in accordance with a corresponding program.

The package memory 320 is configured with, for example, a volatile semiconductor memory and retains a program to be executed by the package processor 310 or management or the like of the flash chips 300. Since the management information of the flash chip 300 is important information, it is preferable to evacuate the management information to a specific flash chip 300 at the time of planned stop or at the time of occurrence of a sudden failure. Accordingly, for the package processor 310 and the package memory 320, a battery for realizing backup for a given time may be mounted on the package memory 320 and the flash package 230 may be constructed so that the package processor 310 evacuates the management information stored in the package memory 320 to the specific flash chip 300 when a failure or the like occurs.

The buffer 330 is a semiconductor memory (for example, a volatile memory) that temporarily retains data to be read/written on the flash chip 300. In the embodiment, when a write request is given from the storage controller 200, the package processor 310 notifies the storage controller 200 that the write process is completed in response to the write request in a stage at which write target data is written on the flash chip 300. Here, the invention is effective even when the storage controller 200 is notified of the completion of the write process in a stage in which received write target data is completely written on the buffer 330.

The package bus 340 is an internal bus for transmitting data between the buffer 330 and the flash chip 300 and there are one or more package buses 340. In order to improve performance, the plurality of package buses 340 are generally provided. However, the invention is effective even when there is only one package bus 340.

The package bus transmission device 350 is provided for each package bus 340 and data is transmitted between the buffer 330 and the flash chip 300 via the corresponding package bus 340 in response to an instruction from the package processor 310.

(1-2) Various Kinds of Information Stored in Shared Memory

Figure 4:
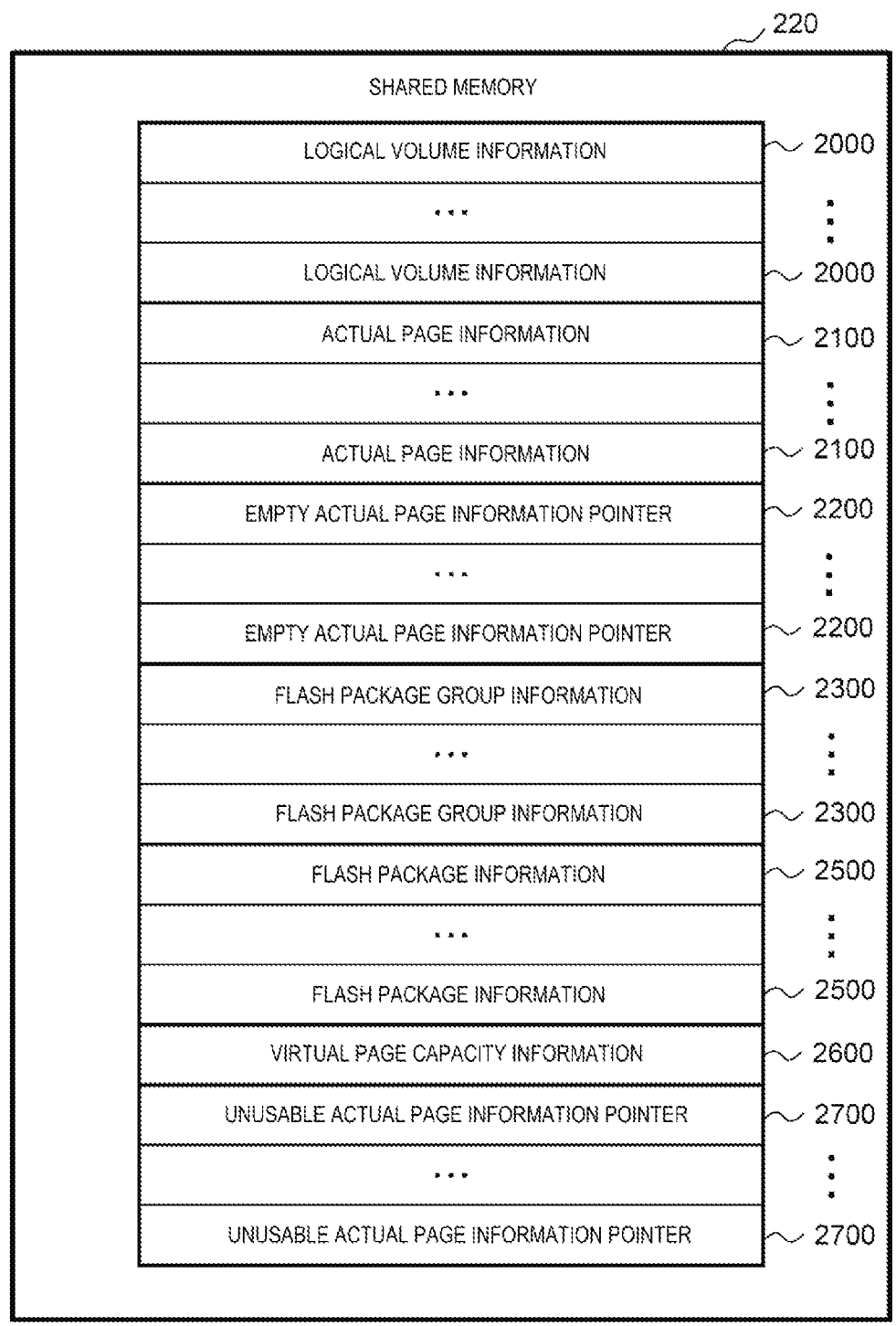
FIG. 4 is a conceptual diagram based on description on various kinds of information stored in a shared memory.

FIG. 4 illustrates a configuration example of various kinds of information stored in the shared memory 220 of the storage system 100 according to the embodiment. As illustrated in FIG. 4, the shared memory 220 includes logical volume information 2000, actual page information 2100, an empty actual page information pointer 2200, flash package group information 2300, flash package information 2500, virtual page capacity information 2600, and an unusable actual page information pointer 2700.

As described above, the capacity virtualization function is mounted on the storage system 100 according to the embodiment. In general, an allocation unit of a storage region is called a page in the capacity virtualization function. In the embodiment, a space of the logical volume is managed in a unit called a "virtual page" and a physical storage region supply by the flash package group 280 is managed in a unit called an "actual page." In the capacity virtualization function, a storage capacity of a logical volume is viewed to be greater than a capacity of an actual storage medium. Therefore, the number of virtual pages is generally greater than the number of actual pages.

When the storage controller 200 does not allocate an actual page to a virtual page instructed as a write destination of data in response to a write request from the host 110, the storage system 100 allocates an actual page to the virtual page and writes the data on the actual page based on the capacity virtualization function. The virtual page capacity information 2600 in FIG. 4 is information indicating the capacity of the virtual page.

In the embodiment, a capacity of the virtual page indicted by the virtual page capacity information 2600 is not necessarily the same as a capacity of an actual page. This is because data to be written on the actual page includes redundant data with a different size in accordance with an RAID type. Accordingly, the capacity of the actual page is determined in accordance with the RAID type of the flash package group 280 supplying the actual page.

For example, in the case of an RAID type in which data is written double like "RAID1," the capacity of an actual page is twice the capacity of a virtual page. When an RAID type in which redundant data with a capacity of one storage device is generated like "RAID5" with regard to a capacity of N storage devices, a capacity of (N+1)/N of the capacity of a virtual page is guaranteed as the capacity of an actual page. Of course, in the case of an RAID type that has no redundancy like "RAID0," the capacity of a virtual page is equal to the capacity of an actual page. In the embodiment, the capacity of a virtual page is common in the storage system 100, but the invention is effective even when the capacity of a virtual page is not common in the storage system 100.

FIG. 5 illustrates a specific data configuration of the logical volume information 2000 illustrated in FIG. 4. In general, the host 110 designates an ID of a logical volume of an access destination, an address of the logical volume, and a data length of target data and issues a read request to a write request. The logical volume information 2000 is information necessary to execute a read/write process in response to read and write requests from the host 110 and exists for each logical volume defined in the storage system 100.

As illustrated in FIG. 5, one piece of logical volume information 2000 includes a logical volume ID field 2001, a logical capacity field 2002, a logical volume RAID type field 2003, and a plurality of actual page pointers 2004.

Then, in the logical volume ID 2001, an identifier (a logical volume ID) granted to a corresponding logical volume and unique to the logical volume is stored. In the logical capacity field 2002, the capacity of the logical volume from the viewpoint of the host 110 is stored.

In the logical volume RAID type field 2003, an RAID type of a corresponding logical volume, for example, information such as "RAID0" or "RAID1," is stored. When an RAID type of the flash package group 280 supplying the corresponding logical volume is, for example, an RAID type in which redundant data is stored in one storage device among N storage devices (here, the flash packages 230) like "RAID5," N specific numerical values are also stored in the logical volume RAID type field 2003. Here, any RAID type may not be designated and the RAID type is necessarily be the RAID type that at least one flash package group 280 has.

The actual page pointer field 2004 is provided to correspond to each virtual page in the logical volume. The first actual page pointer field 2004 corresponds to the head virtual page of the logical volume and second, third, . . . actual page pointer fields 2004 correspond to the second, third, . . . virtual pages of the logical volume, respectively. Then, in the actual page pointer fields 2004, a pointer to the actual page information 2100 (see FIGS. 4 and 6) of the actual page allocated to the corresponding virtual page is stored. The storage system 100 according to the embodiment supports the virtual capacity function, as described above. Therefore, the allocation of an actual page to a virtual page is not an opportunity to define the logical volume but an opportunity to actually write data on the virtual page. Accordingly, in the case of a virtual page on which data has not yet been written, "Null" meaning that there is no information is stored in the corresponding actual page pointer field 2004.

FIG. 6 illustrates a specific data configuration of the actual page information 2100 illustrated in FIG. 4. The actual page information 2100 is provided to correspond to all the actual pages in the storage system 100, respectively, and the management information of the corresponding actual pages is stored. In the embodiment, the cell mode of the flash package 230 is dynamically changed from the QLC mode to the TLC mode in a block unit in accordance with a write frequency to guarantee a lifetime in the warranty period of the flash package 230. When the cell mode of the block is changed, the capacity of data which can be stored in the flash package 230 is also changed. In the embodiment, when each flash package 230 that forms the flash package group 280 is set to a mode in which the cells of all the blocks can store the most data (that is, the QLC mode), the number of actual pages is assumed to be determined using a capacity which can be stored in the flash package group 280 as a reference.

As illustrated in FIG. 6, the actual page information 2100 includes a flash package group ID field 2101, an actual page address field 2102, an empty actual page pointer field 2103, a page allocation time field 2104, a page write amount field 2105, a movement progress flag field 2106, a movement destination actual page field 2107, and a movement standby flag field 2108.

In the flash package group ID field 2101, an identifier (a flash package group ID) granted to the flash package group 280 and unique to the flash package group 280 supplying a corresponding actual page is stored. In the actual page address field 2102, a relative address (an actual page address) in the flash package group 280 allocated to the corresponding actual page is stored.

In the empty actual page pointer field 2103, a pointer indicating the empty actual page information 2100 of the actual page to which a subsequent virtual page is not allocated is stored when the virtual page is not allocated to the corresponding actual page. Here, when the virtual page is allocated to the corresponding actual page, "Null" is stored in the empty actual page pointer field 2103.

In the page allocation time field 2104, a time at which the actual page is allocated to the virtual page to which the actual page is currently allocated is stored. Further, in the page write amount field 2105, a data amount (page write amount) of data stored in a corresponding actual page is stored, for example, in order to update data. A write frequency of data to the actual page is calculated by a page write amount/(a current time—a page allocation time stored in the page allocation time field 2104). The details of the "write frequency" will be described later.

In the embodiment, an erasure unit of data stored in an actual page is assumed to be a block which is an erasure unit of the flash memory. Each flash package 230 according to the embodiment has a function of dynamically changing the cell mode of a block from the QLC mode to the TLC mode, as described above. Accordingly, a capacity of the flash package 230 is changed in accordance with the cell mode of each block in the flash package 230.

In the movement progress flag field 2106, the movement destination actual page field 2107, and the movement standby flag field 2108, information used at the time of moving data of a corresponding actual page to another actual page is stored. Actually, in the movement progress flag field 2106, a flag (hereinafter referred to as a movement progress flag) set to be turned on at the time of moving data of a corresponding actual page to another actual page is stored. In the movement destination actual page field 2107, an address of an actual page of a movement destination of data of a corresponding actual page is stored. Further, in the movement standby flag field 2108, a flag (hereinafter referred to as a movement standby flag) set to be turned on at the time of determining to move data stored in a corresponding actual page to another actual page is stored.

FIG. 7 illustrates a data configuration of the flash package information 2500 illustrated in FIG. 4. The flash package information 2500 is generated to correspond to each flash package 230 mounted on the storage system 100. As illustrated in FIG. 7, the flash package information 2500 includes a flash package ID field 2501, a flash package capacity field 2502, and a virtual block capacity field 2503.

In the flash package ID field 2501, an identifier (a flash package ID) granted to a corresponding flash package 230 and unique to the flash package 230 is stored. In the flash package capacity field 2502, a capacity of the flash package 230 (hereinafter referred to as a flash package capacity) is stored. Further, in the virtual block capacity field 2503, a capacity of a virtual block is stored.

Here, as described above, the invention is devised to guarantee a lifetime within a warranty period of the flash package 230 by dynamically changing the cell mode of the block in the flash package 230 in accordance with a write frequency or the degree of deterioration of the flash memory which is a criterion of the lifetime.

Here, the "write frequency" according to the embodiment is a value obtained by estimating the number of erasures of the flash package 230. The "write frequency" is an amount of data written per time and an accumulative write amount on the flash package 230 can be calculated by calculating a product of the amount of data and a device operation time. That is, the write frequency, the device operation time, and the accumulative number of erasures of the flash package have a relation of the following expression.

[Expression 1]

$$\text{write frequency} \times \text{device operation time} \times \text{time}$$
$$A = \text{accumulative number of writes} \times \text{coefficient}$$
$$A = \text{accumulative number of erasures of flash package} \quad (1)$$

In Expression (1), the coefficient A is a value generally called write amplification (WA) and is changed in accordance with the design of the flash package 230 or an I/O pattern of an application which operates. The "write frequency" can be ascertained by managing an amount of data written on each flash package 230 by the storage controller 200.

The "degree of deterioration" according to the embodiment is a value obtained in consideration of a variation in innate quality of the flash memory. For the flash memory, the innate quality is irregular and the allowable number of erasures is different due to a difference or the like in a production lot despite the same model number. Therefore, even in a state in which deterioration progresses due to the number of erasures of 300, only the number of erasures of 200 is further allowed in some regions and the number of erasures of 400 is further allowed in other regions. In general, error bits occurring in a flash memory increase since the flash memory deteriorates due to repetition of erasure. However, the allowable number of erasures of the flash memory is the number of times within a range in which reliability of the error bits satisfies a device reference.

As methods of calculating the "degree of deterioration," there is first a method of setting an initial value of an erasure number count based on the number of error bits measured in inspection before product shipment (setting a negative number of erasures as the initial value of the erasure counter in a region with good quality and setting a positive number of erasures as the initial value of the erasure counter in a region with poor quality). Second, there is a method of correcting the number of erasures based on the number of error bits occurring in a region during a device operation (adding a negative number of erasures to the number of erasures in a region with good quality and a positive number of erasures to the number of erasures in a region with poor quality). Third, there is a method of calculating the increased number of error bits per time during a device operation (adding the number of error bits to the number of actual erasures when the increased number of error bits per time is large and subtracting the number of error bits from the number of actual erasures when the increased number of error bits per time is small, and including temperature correction over time).

In a flash package in which the number of error bits occurring in a data storage region can be counted, it is easy to calculate the degree of deterioration. Of course, when a difference in the innate quality is small or it is not necessary to consider the difference in the quality, the advantageous effect of the invention can be sufficiently achieved even when the number of erasures is simply used as the degree of deterioration. In the embodiment, the number of erasures is used as an index of the degree of deterioration of the flash memory or the write frequency, but the invention is not limited to this example. Any value can be used as long as a future allowable number or erasures of the flash memory can be estimated. The degree of deterioration can be ascertained when the storage controller 200 receives information (the degree of deterioration in a block unit) from the flash package 230.

When the cell mode of the block is changed, a flash package capacity of the flash package 230 is also changed. Accordingly, the flash package capacity stored in the flash package capacity field 2502 is changed in accordance with a change in the cell mode of each block in the flash package 230. This value is received from the flash package 230 by the storage controller 200 and is set in the flash package capacity field 2502. A maximum value of the flash package capacity is obtained when the cell mode of all the blocks in the flash package 230 is the cell mode (herein, the QLC mode) in which the most values can be stored. In the embodiment, the cell mode of all the blocks in the flash package 230 is assumed to be set to the QLC mode at first.

FIG. 8 illustrates a data configuration of the flash package group information 2300 illustrated in FIG. 4. The flash package group information 2300 is generated to correspond to the flash package group 280 defined in the storage system 100.

As illustrated in FIG. 8, the flash package group information 2300 includes a flash package group ID field 2301, a package group RAID type field 2302, an actual number-of-pages field 2303, an empty actual number-of-pages field 2304, a flash package pointer field 2305, and an unusable actual number-of-pages field 2306.

In the flash package group ID field 2301, a flash package group ID granted to a corresponding flash package group 280 is stored. In the package group RAID type field 2302, an RAID type of the flash package group 280 is stored. The RAID type according to the embodiment has been described above in the logical volume RAID type field 2003 in FIG. 5.

In the actual number-of-pages field 2303, the empty actual number-of-pages field 2304, and the unusable actual number-of-pages field 2306, the number of actual pages in the flash package group 280, the number of unused actual pages (hereinafter referred to as empty actual pages), and the number of actual pages set to be unusable (hereinafter referred to as unusable actual pages) are stored, respectively. In the features of the information system 1 (see FIG. 1), as described above, the cell mode of the block necessary in the flash package 230 is dynamically changed and the capacity of the flash package 230 is accordingly changed. When the capacity of the flash package 230 is changed, the number of actual pages and the number of empty actual pages are also changed. Hereinafter, this will be described.

First, when the capacity of the flash capacity 230 is changed, the number of actual pages of the flash package group 280 to which the flash package 230 belongs is also changed. This is because usable capacities of the flash packages 230 in the same flash package group 280 are assumed to be the same from the viewpoint of the RAID. Therefore, in the embodiment, when a request to change the cell mode of a certain flash package 230 is received, the cell mode of all the flash packages 230 that form the flash package group 280 to which the flash package 230 belongs is also changed in this way.

At this time, the number of empty actual pages in each flash package 230 that forms the flash package group 280 is also similarly changed. In contrast, since the number of unusable actual pages is changed, the number of unusable actual pages is also changed. For example, when the number of actual pages is increased by 10, the number of empty actual pages is increased by 10 and the number of unusable actual pages is decreased by 10. As described above, in the embodiment, the flash package 230 determines to change the cell mode of the block necessary in the flash package 230. However, in the embodiment, the storage controller 200 may determine to change the cell mode.

The flash package pointer field 2305 is provided to correspond to each flash package 230 that forms a corresponding flash package group 280 and a pointer to the flash package information 2500 (see FIG. 4) of the corresponding flash package 230 (hereinafter referred to as a flash package pointer) is stored. The number of flash package pointers is determined in accordance with the RAID type of the flash package group 280 stored in the package group RAID type field 2302.

Figure 9:
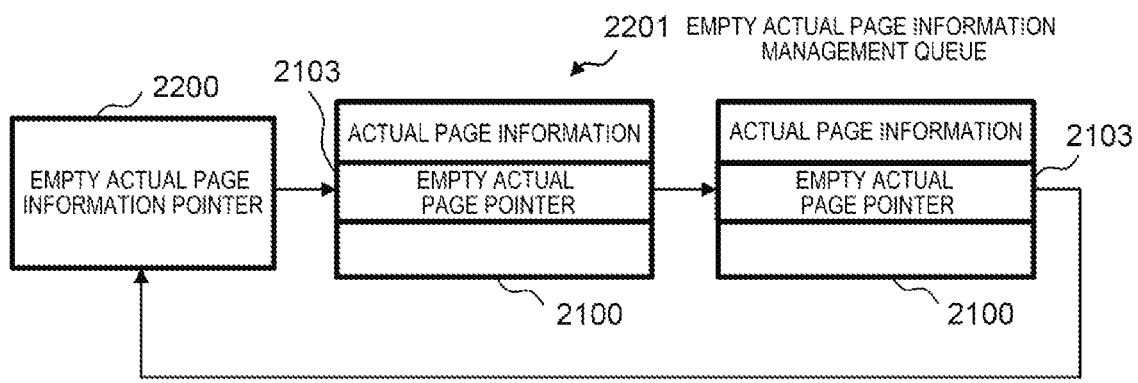
FIG. 9 is a conceptual diagram illustrating a configuration of an empty actual page information management queue.

Referring back to FIG. 4, the empty actual page information pointer 2200 is information provided for each flash package group 280. FIG. 9 illustrates a set of the empty actual pages managed by the empty actual page information pointer 2200. This structure is referred to as an empty actual page information management queue 2201.

The empty actual page information pointer 2200 is a pointer giving an instruction of the address of the actual page information 2100 corresponding to a head empty actual page in the corresponding flash package group 280. Subsequently, a pointer stored in the empty actual page pointer field 2103 in the actual page information 2100 points the actual page information 2100 corresponding to a subsequent empty actual page. In the example of FIG. 9, a pointer stored in the empty actual page pointer field 2103 of the actual page information 2100 corresponding to a final empty actual page points the empty actual page information pointer 2200, but "Null" may be stored in the empty actual page pointer field 2103 of the actual page information 2100 corresponding to the final empty actual page.

When a write request in which a virtual page to which an actual page in a logical volume is not allocated is set to be a write destination is received, the storage controller 200 reads the RAID type of the logical volume from the logical volume RAID type field 2003 (see FIG. 5) of the logical volume information 2000 (see FIGS. 4 and 5) and searches for one flash package group 280 among the flash package groups 280 in which the same RAID type as the RAID type is stored in the package group RAID type field 2302 (see FIG. 8) of the flash package group information 2300 (see FIGS. 4 and 8), for example, an empty actual page in the flash package group 280 in which the number of empty actual pages is the most. Specifically, the storage controller 200 searches for the empty actual page corresponding to the actual page information 2100 instructed by the empty actual page information pointer 2200 corresponding to the flash package group 280 and allocates the empty actual page to the virtual page.

Figure 10:
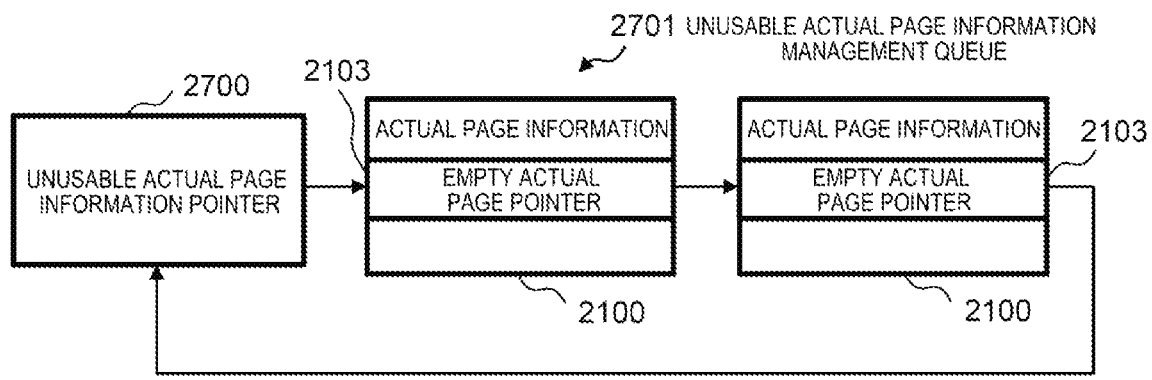
FIG. 10 is a conceptual diagram illustrating a configuration of an unusable actual page information management queue.

Referring back to FIG. 4, the unusable actual page information pointer 2700 is information generated for each flash package group 280. FIG. 10 illustrates a set of the unusable actual pages managed by the unusable actual page information pointer 2700. This structure is referred to as an unusable actual page information management queue 2701. This structure is the same as the empty actual page information management queue 2201 (see FIG. 9).

When the capacity of the flash package 230 decreases and thus the number of actual pages stored in the actual number-of-pages field 2303 (see FIG. 8) of the flash package group information 2300 (see FIGS. 4 and 8) corresponding to the flash package group 280 to which the flash package 230 belongs decreases, the actual page information 2100 managed in the empty actual page information management queue 2201 (see FIG. 9) is moved to the unusable actual page information management queue 2701 (see FIG. 10) by the decreased number. In contrast, when the capacity of the flash package 230 increases and the number of actual pages stored in the actual number-of-pages field 2303 (see FIG. 8) increases, the actual page information 2100 managed in the unusable actual page information management queue 2701 is moved to the empty actual page information management queue 2201 by the increased number.

In the storage system 100 according to the embodiment, the storage controller 200 has the capacity virtualization function, as described above. Therefore, even when the capacity of the flash package 230 is changed, countermeasures can be taken merely moving the actual page information 2100 in the above-described method. When the actual page information 2100 is moved to the unusable actual page information management queue 2701, the actual page corresponding to the actual page information 2100 may not be allocated to the virtual page. At this time, when the storage controller 200 can notify the flash package 230 that the region of the actual page is unusable, the flash package 230 can cancel a correspondent relation between the actual page and the block corresponding to the actual page and allocates the actual block to another region so that the actual block can be effectively used.

(1-3) Management Information of Flash Package

Figure 11:
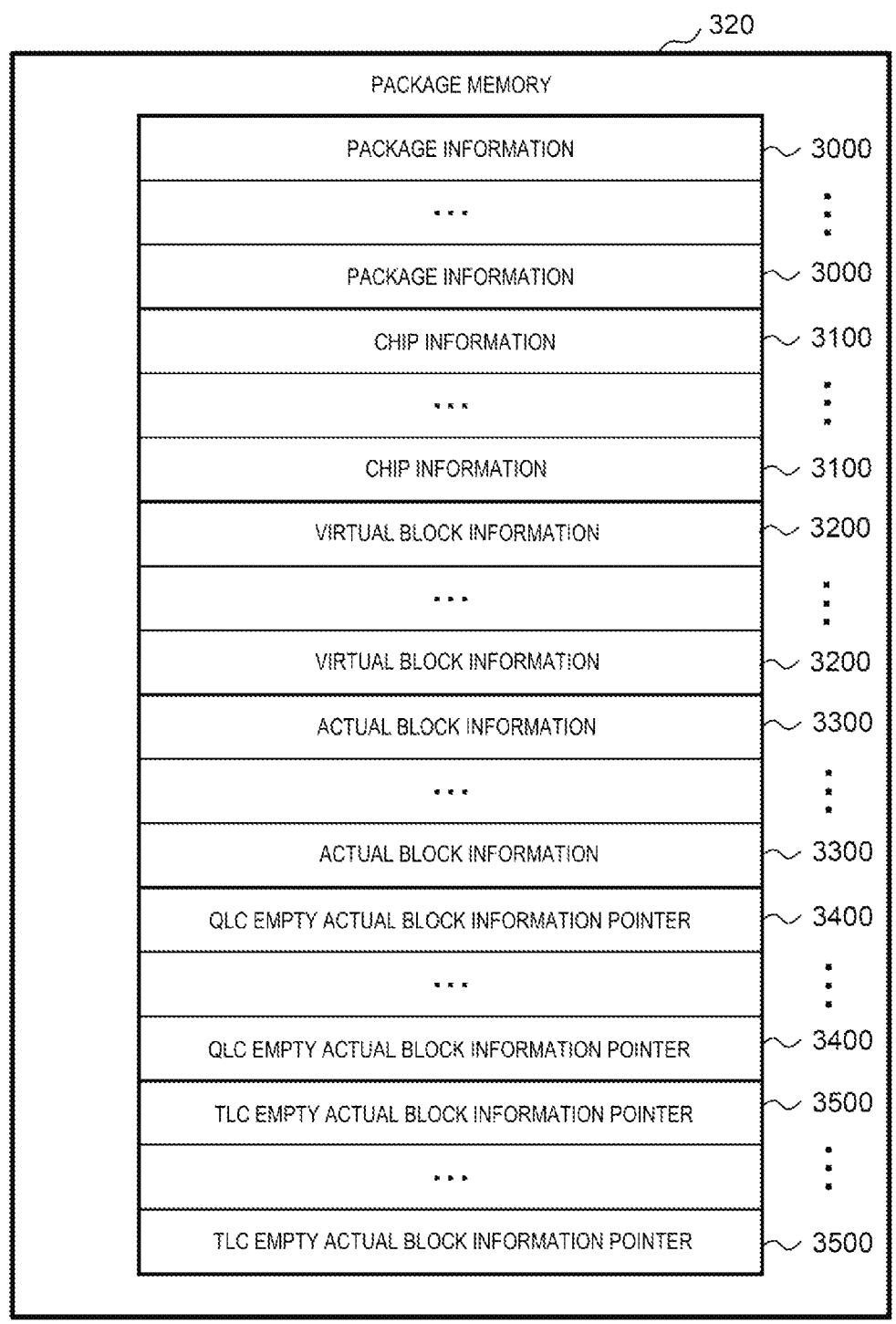
FIG. 11 is a conceptual diagram based on description on various kinds of information stored in a package memory.

Next, management information retained in each package memory 320 (see FIG. 3) by each flash package 230 (see FIG. 3) will be described. As illustrated in FIG. 11, the management information includes package information 3000, chip information 3100, virtual block information 3200, actual block information 3300, a QLC empty actual block information pointer 3400, and a TLC empty actual block information pointer 3500. The information is information necessary to realize a function of dynamically changing the cell mode of each block.

FIG. 12 illustrates a data structure of the package information 3000 illustrated in FIG. 11. As illustrated in FIG. 12, the package information 3000 includes a package ID field 3001, a package capacity field 3002, an actual number-of-blocks field 3003, a virtual number-of-blocks field 3004, a virtual block capacity field 3005, a block number-of-erasures field 3006, a measurement start time field 3007, an internal information storage number-of-blocks field 3008, and an internal information storage address field 3009.

In the package ID field 3001, a flash package ID of the flash package 230 retaining the package information 3000 is stored. In the package capacity field 3002, a capacity of all the flash packages 230 from the viewpoint of the storage controller 200 is stored. Here, the capacity of the flash package 230 is changed in accordance with the cell mode of each block in the flash package 230. In the embodiment, the number of blocks in each flash package 230 included in the flash package group 280 is equal. The invention is effective even when the number of blocks in each flash package 230 included in the flash package group 280 is not equal.

In the actual number-of-blocks field 3003, the number of blocks that exist in the flash package 230 (hereinafter referred to as actual blocks) is stored. In the virtual number-of-blocks field 3004, a value obtained by multiplying the number of actual blocks stored in the actual number-of-blocks field 3003 by (the most amount of data which can be stored in the cell mode of the actual blocks)/(the minimum amount of data which can be stored in the cell mode of the blocks) is stored as the number of virtualized blocks which exist in a corresponding logical volume (hereinafter referred to as virtual blocks).

Accordingly, in the embodiment, an address of an access target designated in a data read/write request by the storage controller 200 is first mapped to the virtual block and is subsequently mapped to a space of the actual block. The number of virtual blocks allocated to one actual block is determined in accordance with the cell mode of each actual block in the flash package 230.

In the embodiment, a changeable cell mode is assumed to be changed only from the QLC mode to the TLC mode. In the embodiment, the capacity of the virtual block is assumed to be a capacity which can be stored in an actual block when the cell mode of the actual block is set to a single-level cell (SLC) mode. Accordingly, when the cell mode is the QLC mode, four virtual blocks are allocated to one actual block. When the cell mode is the TLC mode, three virtual blocks are allocated to one actual block.

The invention is effective even when a change in the mode other than the change in the mode from the QLC mode to the TLC mode is executed. For example, the invention is effective even when a mutual change among the QLC mode, the TLC mode, and a multi-level cell (MLC) mode is executed or a mutual change among the QLC mode, the TLC mode, the MLC mode, and the SLC mode is executed. In the embodiment, the cell mode of each actual block is assumed to be the QLC mode at first. Further, in the embodiment, an opportunity to allocate the actual block to the virtual block is assumed to be an opportunity to first receive a write request in the virtual block to which the virtual block is not allocated.

In the virtual block capacity field 3005, the capacity of one virtual block is stored. Since the flash memory may not be updated in a data unit, processes of preparing an empty region in the actual block, writing write target data on the empty region, reading the data written on the actual block (the empty region) once when the empty region is full, erasing the data stored in the actual block, and subsequently writing effective data on a corresponding actual block are executed.

In the block number-of-erasures field 3006, the number of times the data is erased in the flash package 230 (hereinafter referred to as the number of block erasures) is stored. Since the flash memory may not be rewritten, processes of preparing an empty region in the actual block, writing write target data on the empty region when a write request is given, reading the data written on the actual block once when the empty region is full, erasing all the data stored in the actual block, and subsequently writing effective data on the actual block are executed.

In the measurement start time field 3007, a time at which the number of block erasures starts to be measured (hereinafter referred to as a measurement start time) is stored. In a certain actual block, a value obtained by dividing the number of block erasures stored in the block number-of-erasures field 3006 by (a current time—the measurement start time stored in the measurement start time field 3007) is the number of block erasures per unit time of the actual block. When it is assumed that this value is not changed, it is possible to estimate whether the number of block erasures of each actual block reaches an upper limit within the warranty period. Of course, as another method, the invention is effective even when it is predicted whether the number of block erasures of each actual block reaches the upper limit within a warranty period.

In the embodiment, the number of block erasures of each actual block stored in the block number-of-erasures field 3006 and the measurement start time of the number of actual block stored in the measurement start time field 3007 are assumed to start count using a time at which the flash package 230 starts operating as zero. Here, the number of block erasures and the measurement start time may be reset at an appropriate period and may be predicted based on an immediately previous write frequency.

In the internal information storage number-of-blocks field 3008, the management information of the flash package 230 stored in the package memory 320 (each piece of package information 3000, each piece of chip information, each piece of virtual block information 3200, each piece of actual block information 3300, each QLC empty actual block information pointer 3400, and each TLC empty actual block information pointer 3500) described above in FIG. 11 is stored by the number of actual blocks necessary for evacuation at the time of turning off the flash package 230 or the time of occurrence of a failure. In the internal information storage address field 3009, addresses of the actual blocks are stored.

Since the management information (the package information 3000 and the like) of the flash package 230 is important information, the management information may be multiplexed and evacuated. Since it is considered that the number of times the management information is evacuated is not large and the number of block erasures or the like of the actual block of an evacuation destination is not a problem, the cell mode of the actual block may be set to the QLC mode.

On the other hand, because of a low price and a large capacity of the flash package 230, a total amount of data of the above-described management information (the package information 3000 and the like) stored in the package memory 320 increases in some cases. In these cases, the management information is also written on the actual block in addition to the time of turning off the flash package 230 or the time of occurrence of a failure. Depending on this frequency, it is effective to set the cell mode of the actual block to the TLC mode. A sum of the number of actual blocks which can be allocated to the virtual block, the number of actual blocks in which a failure occurs, and the number of actual blocks in which the internal information is stored is a total number of actual blocks included in the flash package 230.

FIG. 13 illustrates a data configuration of the chip information 3100 illustrated in FIG. 11. The chip information 3100 is information regarding the flash chip 300 (see FIG. 3) accommodated in the flash package 230 and is generated for each flash chip 300. As illustrated in FIG. 13, the chip information 3100 includes a chip ID field 3101, a chip actual number-of-blocks field 3102, a chip empty actual number-of-blocks field 3103, and a connection bus ID field 3104.

In the chip ID field 3101, an identifier (a flash chip ID) granted to a corresponding flash chip 300 and is unique to the flash chip is stored. In the chip actual number-of-blocks field 3102, the number of actual blocks included in the flash chip 300 is stored.

Further, in the chip empty actual number-of-blocks field 3103, the number of actual blocks not allocated to virtual blocks (hereinafter referred to as empty actual blocks) among the actual blocks in the flash chip 300 is stored. Further, in each connection bus ID field 3104, each identifier of the package bus 340 (a package bus ID) to which the flash chip 300 is connected is stored.

Figure 14:
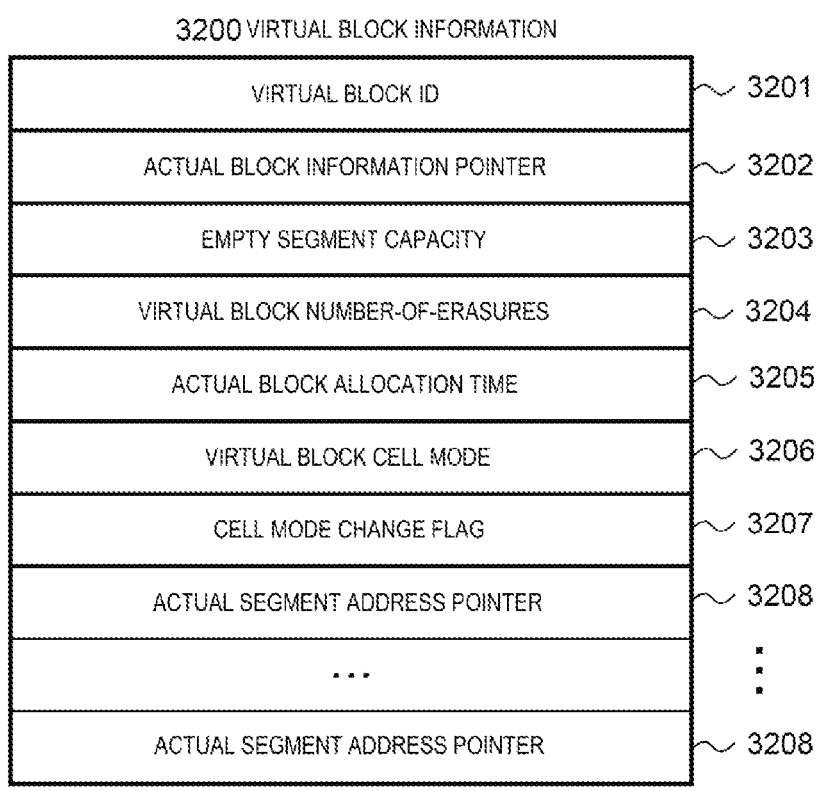
FIG. 14 is a conceptual diagram illustrating a configuration of virtual block information.

FIG. 14 illustrates a data configuration of the virtual block information 3200 illustrated in FIG. 11. The virtual block information 3200 is information generated for each of all the virtual blocks that form each form each virtual page in a logical volume with which the flash package 230 is associated. Hereinafter, the virtual block information 3200 is arranged in an address order of the corresponding virtual blocks.

As illustrated in FIG. 14, the virtual block information 3200 includes a virtual block ID field 3201, an actual block information pointer field 3202, an empty segment capacity 3203, a virtual block number-of-erasures field 3204, an actual block allocation time 3205, a virtual block cell mode field 3206, a cell mode change flag field 3207, and an actual segment address pointer field 3208.

In the embodiment, as described above, a unit of a storage region in which data is read or written in a flash memory is referred to as a "segment." In general, the unit is called a page. In the embodiment, to set a unit of capacity virtualization executed by the storage controller 200, the unit of the flash memory is referred to as a segment. In the embodiment, even when the cell mode is changed, the length of a segment is assumed not to be changed. Accordingly, when the cell mode of the actual block is the QLC mode, the number of segments is 4/3 times the number when the cell mode is the TLC mode.

In the virtual block ID field 3201, an identifier (a virtual block ID) granted to a corresponding virtual block and unique to the virtual block is stored. In the actual block information pointer field 3202, a pointer is stored in the actual block information 3300 (see FIGS. 11 and 15) of the actual block to which a corresponding virtual block is allocated. An initial value is assumed to be "Null." In the empty segment capacity 3203, a total capacity of the segments in which data in the virtual blocks is not stored (hereinafter referred to as a virtual segment) is stored.

Further, in the virtual block number-of-erasures field 3204, the number of times data stored in the corresponding virtual block is erased is stored. In the actual block allocation time 3205, a time at which the actual block allocated to the virtual block is currently allocated is stored. A value obtained by dividing the number of erasures stored in the virtual block number-of-erasures field 3204 by (a current time—the time stored in the actual block allocation time 3205) is the number of data erasures per unit time of the virtual block.

In the virtual block cell mode field 3206, the cell mode of the actual block allocated to the virtual block is stored. In the cell mode change flag field 3207, a flag (hereinafter referred to as a cell mode change flag) indicating whether it is necessary to change the cell mode of the actual block allocated to the virtual block to a mode different so far (herein, the TLC) is stored. When the cell mode change flag is set to be turned on, it meant that the cell mode of the actual block allocated to the virtual block is changed to the TLC mode. When the cell mode change flag is set to be turned off, it meant that it is not necessary to change the cell mode of the actual block allocated to the virtual block to the TLC mode.

The actual segment address pointer field 3208 is provided for each virtual segment in a corresponding virtual block. A pointer (address) pointing a segment to which the virtual segment in the actual block to which the corresponding virtual block is allocated is allocated (hereinafter referred to as an actual segment) is stored.

Figure 15:
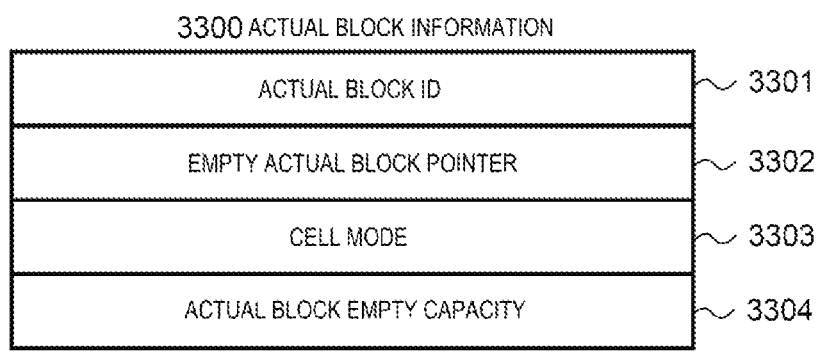
FIG. 15 is a conceptual diagram illustrating a configuration of actual block information.

FIG. 15 illustrates a data configuration of the actual block information 3300 illustrated in FIG. 11. The actual block information 3300 is information generated for each actual block that exists in the corresponding flash package 320. As illustrated in FIG. 15, the actual block information 3300 includes an actual block ID field 3301, an empty actual block pointer field 3302, a cell mode field 3303, and an actual block empty capacity field 3304.

In the actual block ID field 3301, an identifier (an actual block ID) granted to a corresponding actual block and unique to the actual block is stored. The actual block ID indicates an address of a certain flash chip 300 to which the actual block is equivalent. In the empty actual block pointer field 3302, a point to the actual block information 3300 of the subsequent actual block in an empty state is stored when the corresponding actual block is not allocated to the virtual block (is in an empty state).

In the cell mode field 3303, the cell mode of the actual block is stored. When the cell mode of the actual block is set to the QLC mode, information according to the QLC mode is stored in the cell mode field 3303. When the cell mode of the actual block is set to the TLC mode, information according to the TLC mode is stored in the cell mode field 3303.

In the actual block empty capacity field 3304, a current empty capacity of the corresponding actual block is stored. The package processor 310 (see FIG. 3) can receive a write request for a capacity equal to or less than the empty capacity with respect to the corresponding actual block from the storage controller 200 and can store write target data in an empty region in the actual block. When the data is stored in the empty region of the actual block in this way, the package processor 310 decreases a value of the empty capacity stored in the actual block empty capacity field 3304 by a data size of the stored data. When the cell mode of the actual block is the QLC mode, an initial value of the value stored in the actual block empty capacity field 3304 is 4/3 times the value when the cell mode of the actual block is the TLC mode.

Figure 16:
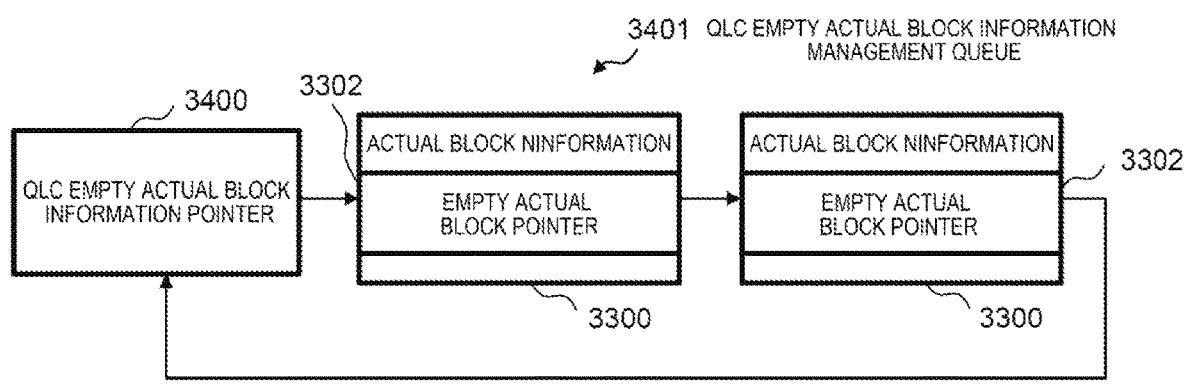
FIG. 16 is a conceptual diagram illustrating a configuration of a QLC empty actual page information management queue.

Referring back to FIG. 11, the QLC empty actual block information pointer 3400 is generated to correspond to each flash chip 300 in the flash package 230. FIG. 16 illustrates a set of the empty actual blocks of which the cell mode is set to the QLC mode and which is managed by the QLC empty actual block information pointer 3400. This structure is referred to as a QLC empty actual block information management queue 3401. The QLC empty actual block information pointer 3400 is an empty actual block of which the cell mode is set to the QLC mode (hereinafter referred to as a QLC empty actual block) among the actual blocks in the corresponding flash chip 300 and is a pointer to the actual block information 3300 of the head QLC empty actual block among the empty actual blocks.

In the empty actual block pointer field 3302 of the actual block information 3300 of the head QLC empty actual block, a point to the actual block information 3300 of the subsequent QLC empty actual block is stored. FIG. 16 illustrates a state in which a pointer to the QLC empty actual block information pointer 3400 is stored in the empty actual block pointer field 3302 of the actual block information 3300 of the final QLC empty actual block. A value stored in the empty actual block pointer field 3302 of the actual block information 3300 of the final QLC empty actual block may be "Null."

Figure 17:
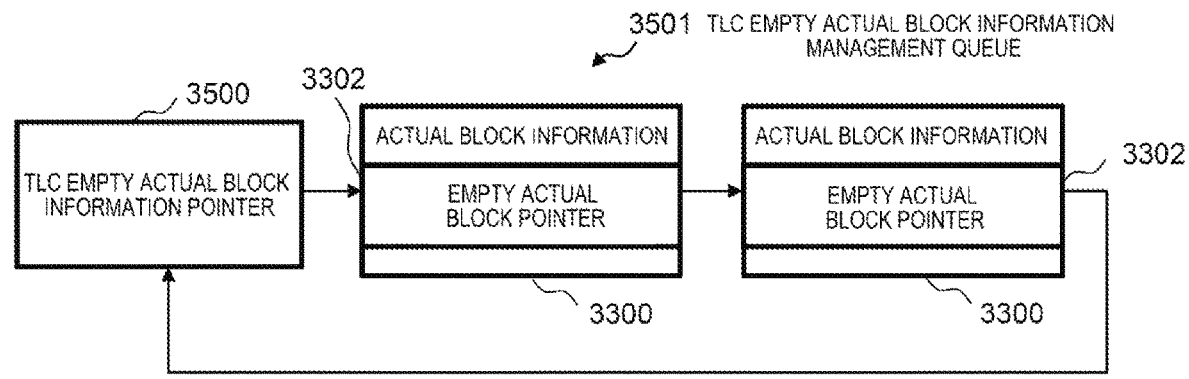
FIG. 17 is a conceptual diagram illustrating a configuration of a TLC empty actual page information management queue.

Each TLC empty actual block information pointer 3500 is also generated to correspond to each flash chip 300 in the flash package 230. FIG. 17 illustrates a set of empty actual blocks of which the cell mode is set to the TLC mode and which is managed by each pointer stored in the TLC empty actual block information pointer 3500. This structure is referred to as a TLC empty actual block information management queue 3501. The TLC empty actual block information pointer 3500 is an empty actual block of which the cell mode is set to the TLC mode (hereinafter referred to as a TLC empty actual block) among the actual blocks in the corresponding flash chip 300 and is a pointer to the actual block information 3300 of the head TLC empty actual block among the empty actual blocks.

In the empty actual block pointer field 3302 of the actual block information 3300 of the head TLC empty actual block, a point to the actual block information 3300 of the subsequent TLC empty actual block is stored. FIG. 17 illustrates a state in which a pointer to the TLC empty actual block information pointer 3500 is stored in the empty actual block pointer field 3302 of the actual block information 3300 of the final TLC empty actual block. A value stored in the empty actual block pointer field 3302 of the actual block information 3300 of the final TLC empty actual block may be "Null."

(1-4) Various Processes Executed in Storage System

Next, various processes executed by the processor 260 (see FIG. 2) of the storage controller 200 or the package processor 310 (see FIG. 3) of the flash package 230 using the information described above in FIGS. 4 and 17 will be described. A processing entity of the various processes will be described as a program below. In practice, it is needless to say that the processor 260 of the storage controller 200 or the package processor 310 of the flash package 230 executes the processes based on the program.

(1-4-1) Various Processes Executed by Storage Controller

First, content of the various processes executed by the storage controller 200 will be described. A process of the storage controller 200 is executed when the processor 260 (see FIG. 2) executes a corresponding program stored in the memory 270 (see FIG. 2).

Figure 18:
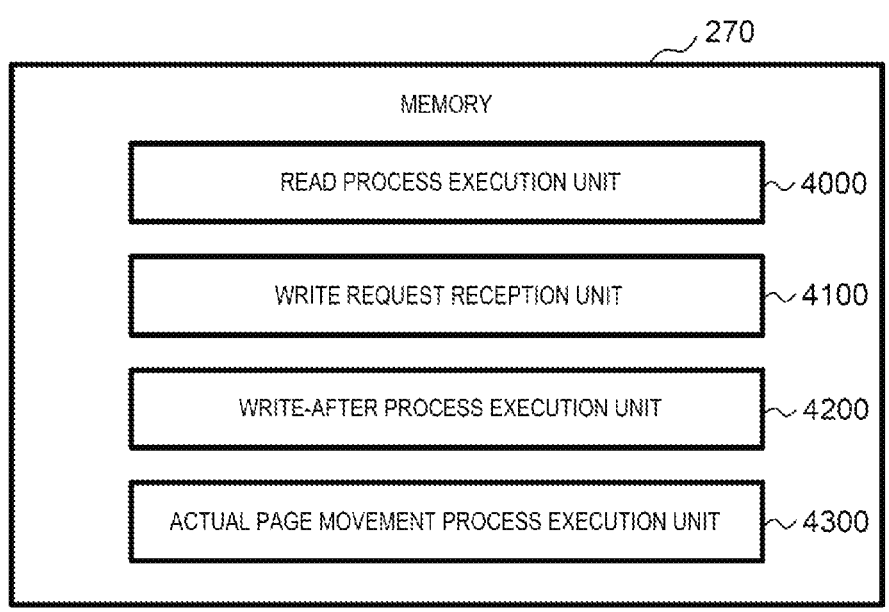
FIG. 18 is a block diagram illustrating a program configuration in a memory of a storage controller.

FIG. 18 illustrates a configuration of a program group stored in the memory 270. In the embodiment, the memory 270 of the storage controller 200 stores a read process execution unit 4000, a write request reception unit 4100, a write-after process execution unit 4200, and an actual page movement process execution unit 4300. These units are programs that realize the capacity virtualization technology.

In the embodiment, a read/write request from the host 110 is assumed to be issued in a segment (a page in a general term of a flash memory) unit which is a read/write unit of the flash memory. Of course, the invention is effective even when a read request or a write request from the host 110 designates only some of the segments. When a region of some of the segments of the flash memory is designated as a write destination, the flash package 230 reads all the segments, updates only data of the designated region, and subsequently writes the data back to the segments.

(1-4-1-1) Read Process

Figure 19:
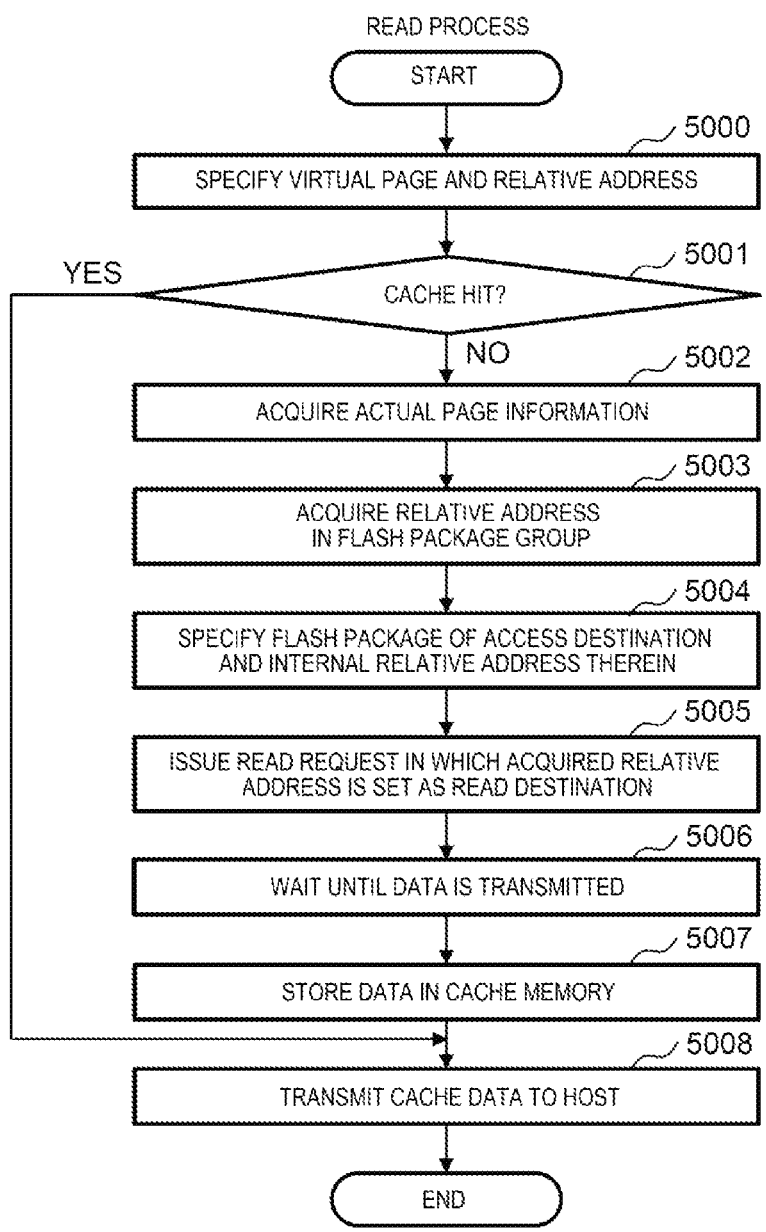
FIG. 19 is a flowchart illustrating a processing procedure of a read process.

First, a read process will be described. FIG. 19 illustrates a processing procedure of the read process executed by the read process execution unit 4000 when the storage controller 200 receives a read request from the host 110.

Step S000: the read process execution unit 4000 specifies a corresponding virtual page and a relative address of an access destination in the virtual page from an address in which read target data designated in the received read request is stored.

Step S001: the read process execution unit 4000 determines whether the read target data is stored in the cache storage device 210 (cache hit). This is a known technology. When the positive result is obtained in the determination (cache hit: Yes in step S001), the read process execution unit 4000 causes the process to step S008. When the negative result is obtained (cache miss: No in step S001), the read process execution unit 4000 causes the process to proceed to step S002.

Step S002: when the negative result is obtained in step S001, it is necessary to load the read target data to the cache storage device 210. Accordingly, the read process execution unit 4000 acquires the actual page information 2100 (see FIGS. 4 and 6) corresponding to the actual page allocated to the virtual page specified in step S000 with reference to the pointer stored in the corresponding actual page pointer field 2004 (see FIG. 5) of the logical volume information 2000 (see FIGS. 4 and 5).

Step S003: the read process execution unit 4000 acquires the flash package group 280 (see FIG. 2) to which the actual page belongs and the head address in the flash package group 280 of the actual page from the flash package group ID stored in the flash package group ID field 2101 (see FIG. 6) of the actual page information 2100 acquired in step S002 and the address of the actual page corresponding to the actual page address field 2102 (see FIG. 6).

Step S004: the read process execution unit 4000 acquires a relative address in the actual page in which the read target data is stored from the relative address of the read target specified in step S000 and the RAID type stored in the package group RAID type field 2302 (see FIG. 8) of the flash package group information 2300 (see FIG. 8) of the flash package group 280 (see FIG. 2) to which the flash package group ID acquired in step S003 is granted. The read process execution unit 4000 specifies the address of a certain flash package 230 is accessed from the calculated relative address in the actual page, the above-described acquired RAID type, and the flash package pointer stored in the corresponding flash package pointer field 2305 (see FIG. 8) of the flash package group information 2300 (see FIG. 8).

Step S005: the read process execution unit 4000 issues a read request in which the data stored in the address specified in step S004 is set as a read target with regard to the flash package 230 specified in step S004.

Step S006: the read process execution unit 4000 waits until the read target data is transmitted from the flash package 230 having issued the read request in step S005.

Step S007: the read process execution unit 4000 stores the data transmitted from the flash package 230 having issued the read request in step S005 in the cache storage device 210 (see FIG. 2).

Step S008: the read process execution unit 4000 transmits the data on the cache storage device 210 designated in the current read request to the host 110 which is a transmission source of the read request. Thereafter, the read process ends.

(1-4-1-2) Write Process

Figure 20:
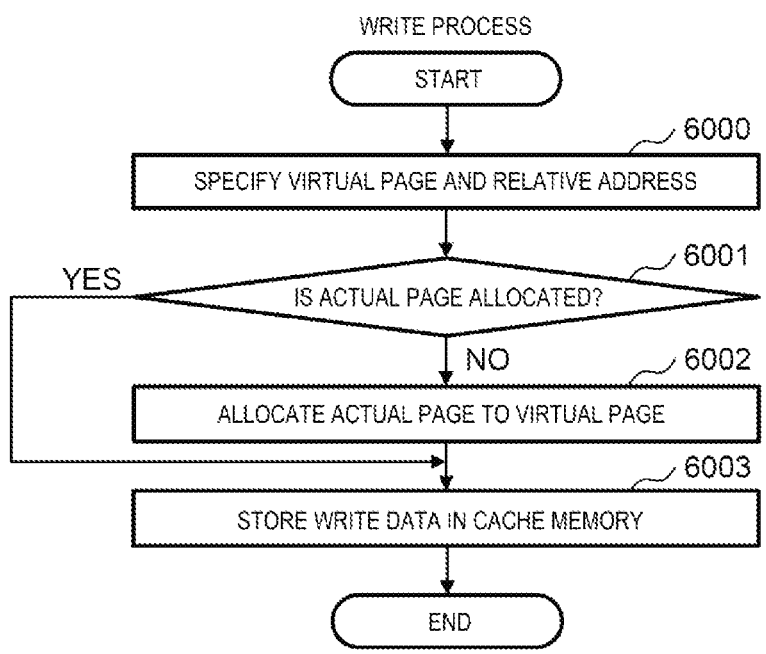
FIG. 20 is a flowchart illustrating a processing procedure of a write process.

FIG. 20 illustrates a processing procedure of a write process executed by the write request reception unit 4100 when the storage controller 200 receives a write request from the host 110.

Step 6000: the write request reception unit 4100 specifies a corresponding virtual page and a relative address in the virtual page of the access destination from an address which is a write destination of data designated in the received write request.

Step 6001: the write request reception unit 4100 determines whether the actual page is allocated to the virtual page to which the relative address specified in step 6000 is granted depending on whether "Null" is stored in the corresponding actual page pointer field 2004 (see FIG. 5) in the logical volume information 2000 (see FIG. 5) corresponding to the logical volume designated as the write destination in the write request. When the actual page is not allocated to the virtual page (No in step 6001), the write request reception unit 4100 causes the process to proceed to step 6002. When the actual page is allocated (Yes in step 6001), the write request reception unit 4100 causes the process to proceed to step 6003.

Step 6002: the write request reception unit 4100 allocates the actual page to the virtual page designated as the write destination of the data in the write request in step 6002. Specifically, the write request reception unit 4100 determines the actual page of the flash package group 280 to be is allocated with reference to the logical volume RAID type field 2003 of the logical volume information 2000 (see FIG. 5) corresponding to the logical volume designated as the write destination of the data in the write request, the RAID type stored in the package group RAID type field 2302 (see FIG. 8) of the flash package group information 2300 (see FIG. 8) of each flash package group 280 (see FIG. 2), and the number of empty actual pages stored in the empty actual number-of-pages field 2304 (see FIG. 8). Thereafter, the write request reception unit 4100 causes the pointer stored in the actual page pointer field 2004 (see FIG. 5) of the logical volume information 2000 (see FIGS. 4 and 5) corresponding to the logical volume designated as the write destination of the data in the write request to point the actual page information 2100 (see FIGS. 4 and 6) of the head empty actual page with reference to the empty actual page information pointer 2200 (see FIG. 4) corresponding to the flash package group 280 determined in this way. Thus, the actual page is allocated to the virtual page.

The write request reception unit 4100 subsequently updates the empty actual page information pointer 2200 (see FIG. 4) so that the empty actual page information pointer 2200 points the subsequent actual page information 2100 (the actual page information 2100 pointed by the pointer stored in the empty actual page pointer field 2103 (see FIG. 6) in the actual page information 2100 of the actual page allocated to the virtual page). The write request reception unit 4100 updates the value of the empty actual page pointer field 2103 in the actual page information 2100 of the actual page allocated to the virtual page designate as the write destination of the data in the write request to "Null." Further, the write request reception unit 4100 reduces the value stored in the empty actual number-of-pages field 2304 (see FIG. 8) of the flash package group information 2300 (see FIGS. 4 and 8) corresponding to the flash package group 280 supplying the actual page by 1. Further, the write request reception unit 4100 stores a current time in the page allocation time field 2104 of the actual page information 2100 (see FIG. 6) corresponding to the actual page.

In the embodiment, the case in which the series of processes of allocating the virtual page to the actual page in this way when the write request is received has been described, but the series of processes may be executed until the write target data is stored in the flash package 230.

Step 6003: the write request reception unit 4100 stores the write target data (write data) transmitted from the host 110 in the cache storage device 210 (see FIG. 2). Further, the write request reception unit 4100 notifies the host 110 of a completion report of the write process in response to the write request. Thereafter, the write process ends.

It is necessary for the flash package group 280 to generate redundant data of the write data stored in the cache storage device 210 because of the RAID configuration. Here, since this is a known method, the detailed description thereof will not be repeated in the embodiment. Since a region for storing the redundant data is also included in the actual page, a storage address in the actual page of the redundant data corresponding to the write target data is uniquely determined. The redundant data is stored once in the cache storage device 210. Information indicating an address of a certain flash package 230 in which the redundant data is written is also associated with the redundant data on the cache storage device 210 like the write target data. The write target data and the redundant data are written on the corresponding flash package 160 by the write-after process execution unit 4200, as will be described below. However, since the write target data and the redundant data are data to be written on the flash package 230 from the viewpoint of the write-after process execution unit 4200, it is not necessary to distinguish the write target data and the redundant data from each other. Similarly, it is not necessary to distinguish both the flash packages 230 from each other.

(1-4-1-3) Write-after Process

Figure 21:
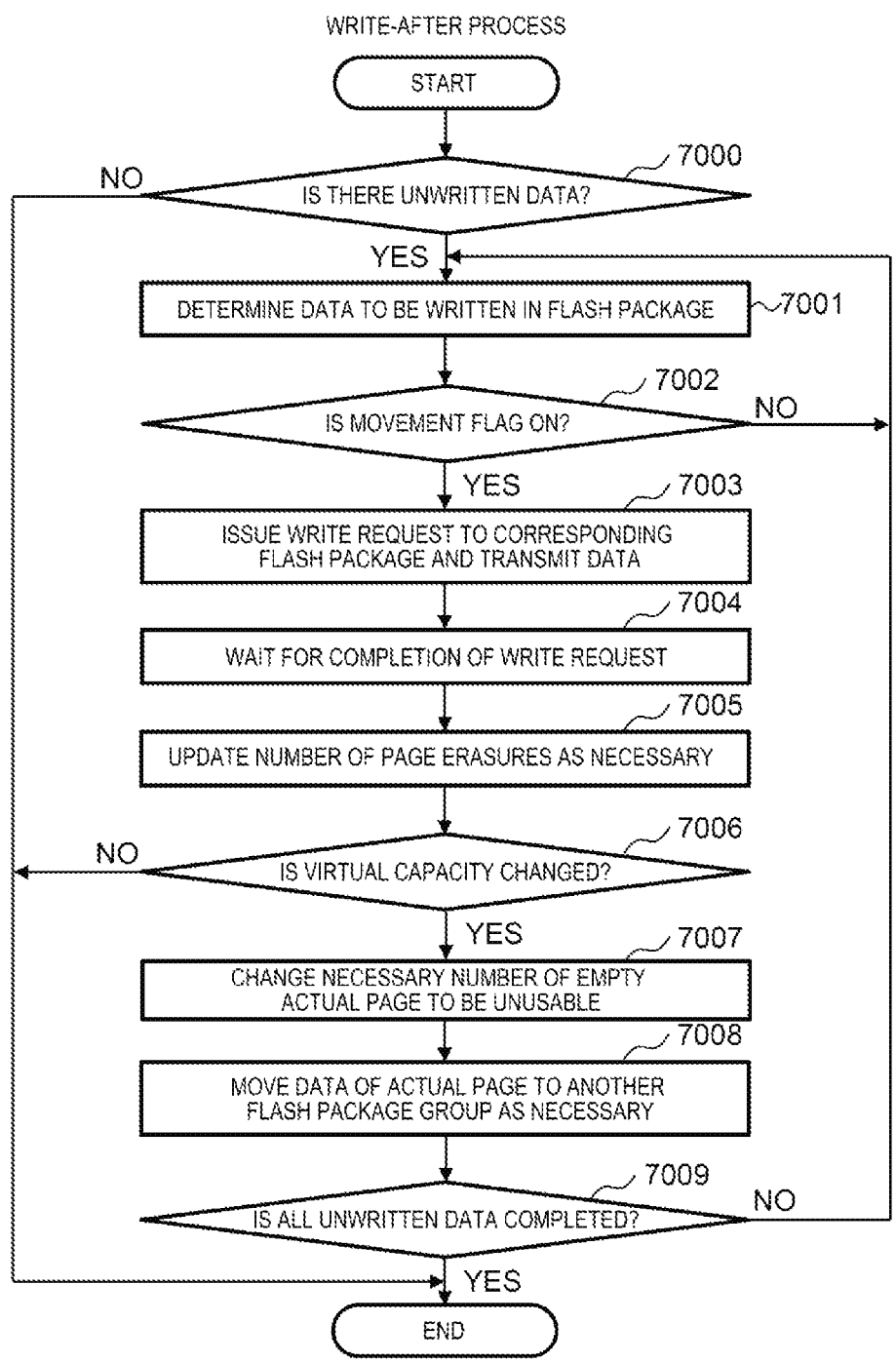
FIG. 21 is a flowchart illustrating a processing procedure of a write-after process.

FIG. 21 illustrates a processing procedure of the write-after process executed periodically or aperiodically by the write-after process execution unit 4200. The write-after process execution unit 4200 writes the write target data and the redundant data stored in the cache storage device 210 on the flash packages 230 in the processing procedure illustrated in FIG. 21 in response to a write request form the host 110. At this time, the write-after process execution unit 4200 treats the write target data and the redundant data as data to be written on the flash packages 230 without distinguishing the write target data and the redundant data from each other.

Step 7000: the write-after process execution unit 4200 searches the cache storage device 210 to determine whether there is data which is the write target data which is temporarily stored in the cache storage device 210 and data which has not yet been written on the flash package 230 (hereinafter referred to as destage target data) in response to the write request from the host 110. When there is the destage target data, the write-after process execution unit 4200 causes the process to proceed to step 7001. Conversely, when there is no destage target data, the write-after process execution unit 4200 ends the write-after process.

Step 7001: the write-after process execution unit 4200 determines the destage target data to be written on the corresponding flash package 230.

Step 7002: the write-after process execution unit 4200 extracts information regarding the address of the write destination and the flash package 230 of the write destination, the information granted to the destage target data, and checks a movement progress flag stored in the movement progress flag field 2106 (see FIG. 6) of the actual page information 2100 (see FIG. 6) corresponding to the actual page of the write destination. When the movement progress flag is set to be turned on, the actual page is moving. Therefore, the write-after process execution unit 4200 stops writing the destage target data on the flash package 230, returns the process to step 7001, and searches for another destage target data.

Step 7003: the write-after process execution unit 4200 issues a write request to designate an address of the write destination to the flash package 230 of the write destination of the destage target data and transmits the destage target data.

Step 7004: the write-after process execution unit 4200 waits for transmission of a completion report of the write process executed in response to the write request from the flash package 230 having transmitted the write request and the destage target data.

Step 7005: when the completion report of the write process is received, the write-after process execution unit 4200 confirms whether data is erased in any actual block in the actual page on which the destage target data is written at that time in association with the write process. Then, when the data is erased in any actual block, the write-after process execution unit 4200 increases the number of erasures of the predicted page by 1 from the page write amount stored in the page write amount field 2105 of the actual page information 2100 (see FIG. 6) of the actual page including the actual block.

Step 7006: the write-after process execution unit 4200 determines whether the capacity of the flash package 230 on which the destage target data is written is changed. When the capacity is changed, the write-after process execution unit 4200 causes the process to proceed to step 7007 (Yes in step 7006). When the capacity is not changed, the write-after process ends (No in step 7006).

Step 7007: when the capacity of the flash package 230 is changed, the write-after process execution unit 4200 confirms whether the minimum value of the capacity of the flash package 230 in the flash package group 280 to which the flash package 230 belongs is changed.

Here, it is necessary to equalize the capacity of each flash package 230 that forms the same flash package group 280 in principle. Accordingly, when the minimum value of the capacity of the flash package 230 of the flash package group 280 is changed due to the writing of the destage target data (this means that the capacity of the flash package 230 on which the destage target data is written is the minimum in the flash package group 280), the write-after process execution unit 4200 sets a necessary number of empty actual pages to be unusable in the other flash packages 230 in order to match the capacities of the other flash packages 230 that form the flash package group 280 to the same capacity as the minimum value.

Specifically, the write-after process execution unit 4200 moves the necessary number of pieces of actual page information 2100 in the actual page information 2100 stored in the empty actual page information management queue 2201 (see FIG. 9) managed by the empty actual page information pointer 2200 (see FIG. 4) to the unusable actual package information management queue 2701 (see FIG. 10) managed by the unusable actual page information pointer 2700 with regard to the other flash packages 230.

Step 7008: when the number of empty actual pages is equal to or less than a preset threshold, the write-after process execution unit 4200 moves the data stored in each of several actual pages from the flash package group 280 to another flash package group 280 in order to guarantee a constant number of empty actual pages normally in the flash package group 280.

Specifically, the write-after process execution unit 4200 determines half of the actual pages in which the data is stored as movement targets of the data among all the actual pages supplied by the flash package group 280 on which the destage target data is written. The half of the actual pages is determined with reference to a page write amount stored in the page write amount field 2105 (see FIG. 6) in the actual page information 2100 (see FIGS. 4 and 6) of each actual page supplied by the flash package group 280 on which the destage target data is written or the page allocation time or the like stored in the page allocation time field 2104 (see FIG. 6). Then, the write-after process execution unit 4200 sets the movement standby flag stored in the movement standby flag field 2108 (see FIG. 6) in the actual page information 2100 of each of the determined actual pages to be turned on.

Step 7009: the write-after process execution unit 4200 determines whether the processes of steps 7001 to 7008 are completely executed on all the destage target data stored in the cache storage device 210. When the negative result is obtained in the determination (No in step 7009), the write-after process execution unit 4200 returns the process to step 7001. Then, the write-after process execution unit 4200 repeats the processes of steps 7001 to 7009 while sequentially switching the destage target data determined in step 7001 to the other destage target data. Then, when the processes of steps 7001 to 7008 are completely executed on all the destage target data (Yes in step 7009), the write-after process execution unit 4200 calls the actual page movement process execution unit 4300 (see FIG. 18). Thereafter, the write-after process ends.

(1-4-1-4) Actual Page Movement Process

Figure 22:
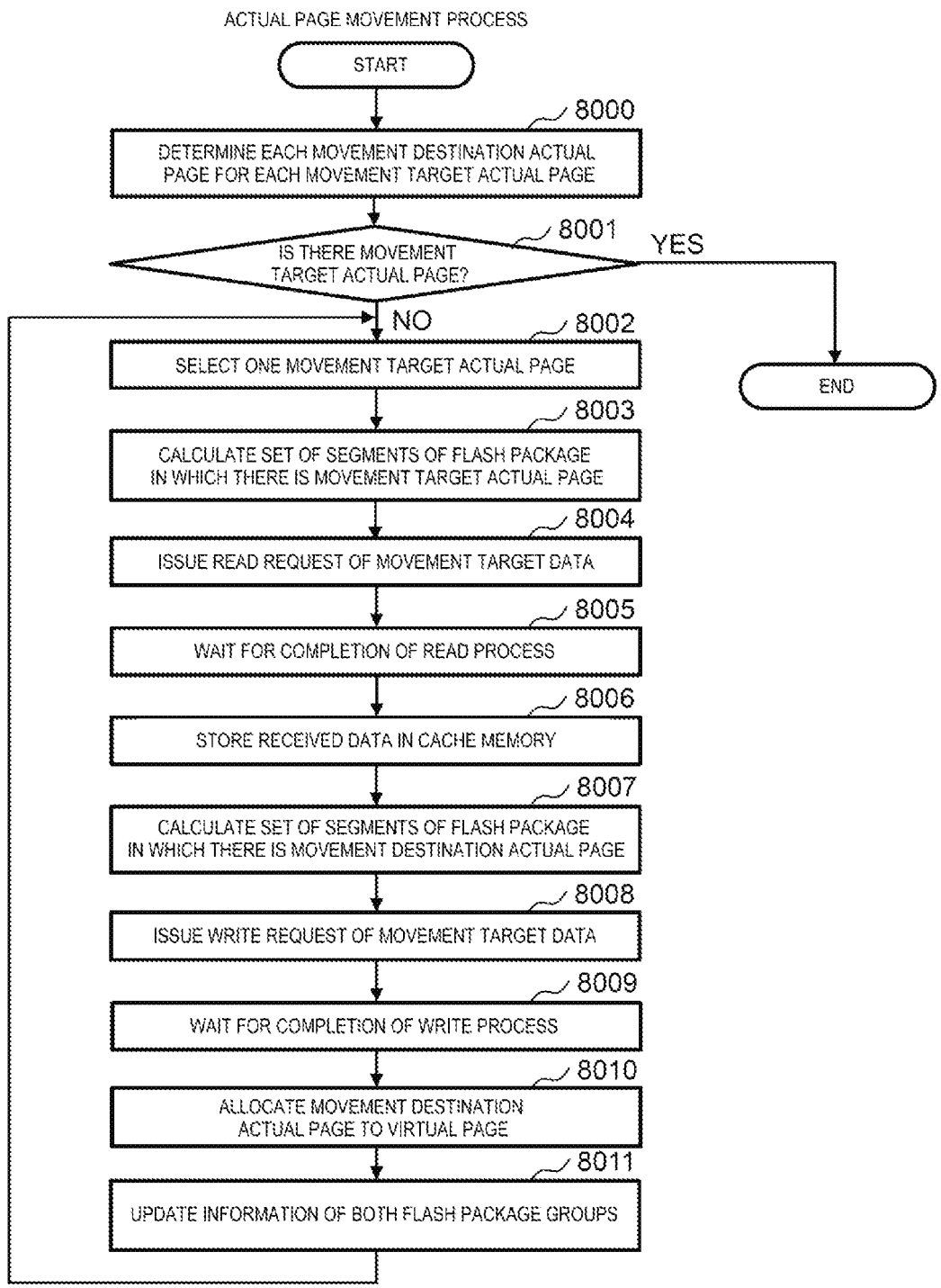
FIG. 22 is a flowchart illustrating a processing procedure of an actual page movement process.

FIG. 22 illustrates a processing procedure of an actual page movement process executed by the actual page movement process execution unit 4300 called by the write-after process execution unit 4200, as described above.

Step 8000: the actual page movement process execution unit 4300 first determines each actual page of a movement destination of data (hereinafter referred to as a movement destination actual page) stored in the movement target actual page with regard to each actual page determined as a movement destination of the data (hereinafter referred to as a movement target actual page) determined as the movement target of the data by the write-after process execution unit 4200 in step 7008 of the above-described write-after process in FIG. 21. The actual page determined as the movement destination actual page is an actual page in which no data is stored (empty actual page) among the actual pages supplied by the flash package group 280 other than the flash package group 280 of which the cell mode is changed. Then, the actual page movement process execution unit 4300 sets each pointer pointing the actual page information 2100 of the movement destination actual page determined as the movement destination of the data of the movement target actual page in the movement destination actual page of the actual page information 2100 (see FIGS. 4 and 6) of the movement target actual page field 2107 (see FIG. 6) for each movement target actual page.

Step 8001: the actual page movement process execution unit 4300 determines whether there is the unprocessed movement target actual page. This determination is executed by determining whether the movement standby flag stored in the movement standby flag field 2108 (see FIG. 6) of any actual page information 2100 (see FIGS. 4 and 6) is set to be turned on. When the positive result is obtained in the determination (Yes in step 8001), the actual page movement process execution unit 4300 causes the process to proceed to step 8002. When the negative result is obtained (No in step 8001), the actual page movement process ends.

Step 8002: the actual page movement process execution unit 4300 selects one movement target actual page from the unprocessed movement target actual pages detected in step 8001, sets the movement standby flag stored in the movement standby flag field 2108 (see FIG. 6) of the actual page information 2100 (see FIGS. 4 and 6) corresponding to the movement target actual page to be turned off, and sets the movement progress flag stored in the movement progress flag field 2106 of the actual page information 2100 to be turned on.

Step 8003: the actual page movement process execution unit 4300 calculates a set of the segments in a certain flash package 230 in which there is the movement target actual page selected in step 8002. The flash package 230 corresponding to each piece of flash package information 2500 (see FIGS. 4 and 7) pointed by each pointer stored in each flash package pointer field 2305 of the flash package group information 2300 (see FIGS. 4 and 8) of the flash package group 280 to which the flash package group ID stored in the flash package group ID field 2101 of the actual page information 2100 corresponding to the movement target actual page selected in step 8002 is granted is the obtained flash package 230. The actual page movement process execution unit 4300 obtains the set of the segments which is the movement target in each flash package 230 with regard to all the flash packages 230 from the address of the movement target actual page stored in the actual page address field 2102 (see FIG. 6) in the actual page information 2100 of the movement target actual page selected in step 8002 and the capacity of the virtual block stored in the virtual block capacity field 2503 (see FIG. 7) of the corresponding flash package information 2500 (see FIG. 7).

Step 8004: the actual page movement process execution unit 4300 transmits each read request indicating movement of the data of the segment in which the data is stored among the designated segments to the cache storage device 210 in each flash package 230 that forms the flash package group 280 supplying the movement target actual page selected in step 8002.

Step 8005: the actual page movement process execution unit 4300 waits for a completion report of the read process and transmission of the read data in response to the read request from all the flash packages 230 having transmitted the read request. The completion report includes information indicating whether the data is stored in each segment.

Step 8006: the actual page movement process execution unit 4300 stores the read data transmitted from each flash package 230 in the cache storage device 210 along with information indicating the segment in which the data is stored.

Step 8007: the actual page movement process execution unit 4300 calculates a set of the segments of a certain flash package 230 in which there is the movement destination actual page which is a movement destination of the data stored in the movement target actual page selected in step 8002. In this case, the actual page information 2100 pointed by the pointer stored in the movement destination actual page field 2107 of the actual page information 2100 (see FIGS. 4 and 6) of the movement target actual page is the actual page information 2100 of the movement destination actual page. The actual page movement process execution unit 4300 obtains a set of the segments in a certain flash package 230 in which there is the movement target actual page from the actual page information 2100, like the case described above in step S8003.

Step 8008: the actual page movement process execution unit 4300 transmits a write request indicating that the data stored in each segment that forms the movement target actual page is written in the set of the segments obtained in step 8007 and data of a write target (the data stored in each segment of the movement target actual page) to each flash package 230 obtained in step 8007. The write request includes information indicating the segment of the movement target actual page in which the data is stored.

Step 8009: the actual page movement process execution unit 4300 waits for a completion report of the write process in response to the write request from all the flash packages 230 having transmitted the write request.

Step 8010: the actual page movement process execution unit 4300 sets the movement target actual page in the empty actual page and allocates the movement destination actual page to the virtual page to which the movement target actual page has been allocated until then. Specifically, the actual page movement process execution unit 4300 stores the actual page information 2100 of the movement target actual page in the empty actual page information management queue 2201 (see FIG. 9) managed by the corresponding empty actual page information pointer 2200 (see FIG. 4) and updates the logical volume information 2000 so that the pointer stored in the corresponding actual page pointer field 2004 of the logical volume information 2000 (see FIGS. 4 and 5) of the logical volume including the virtual page points the movement destination actual page. The actual page movement process execution unit 4300 updates a time stored in the page allocation time field 2104 of the actual page information 2100 of the movement target actual page to a current time. Further, the actual page movement process execution unit 4300 clears the movement progress flag stored in the movement progress flag field 2106 of the actual page information 2100, the pointer stored in the movement destination actual page field 2107, and the movement standby flag stored in the movement standby flag field 2108 (sets the flags to be turned off and updates the pointer to "Null") with regard to both the movement target actual page and the movement destination actual page.

Step 8011: the actual page movement process execution unit 4300 updates the flash package group information 2300 (see FIG. 8) of the flash package group 280 supplying the movement target actual page and the flash package group information 2300 of the flash package group 280 supplying the movement destination actual page. Here, the actual block information 3300 in the flash package group 280 supplying the movement target actual page is moved to the TLC empty actual block information management queue 3501 managed with the corresponding unusable actual block management information 3500.

When the process of step 8011 is completed, the actual page movement process execution unit 4300 returns the process to step 8002. Thereafter, the processes of steps 8001 to 8011 are repeated until the positive result is obtained in step 8001 by completing the processes of steps 8002 to 8011 on all the movement target actual pages. Then, the actual page movement process execution unit 4300 ends the actual page movement process when the positive result is obtained in step 8001 by completing the processes of steps 8002 to 8011 on all the movement target actual pages after all.

(1-4-2) Various Processes Executed by Flash Package

Next, content of various processes executed by the flash package 230 will be described. The processes of the flash package 230 are executed when the package processor 310 (see FIG. 3) executes a corresponding program stored in the package memory 320 (see FIG. 3).

Figure 23:
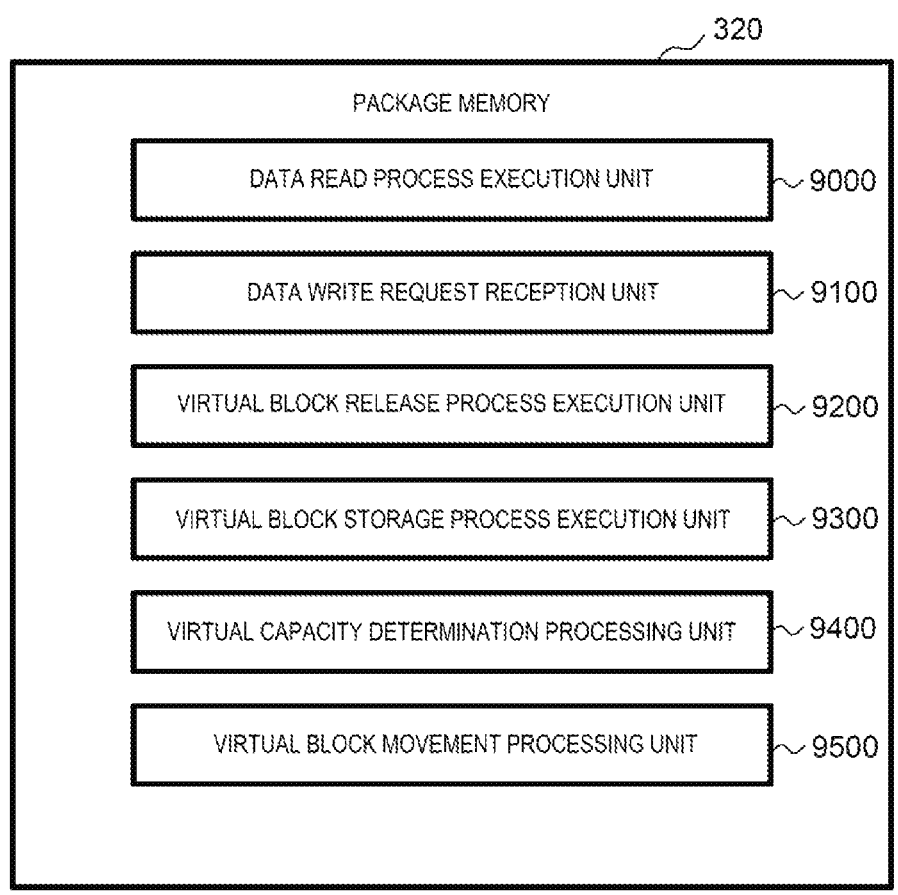
FIG. 23 is a block diagram illustrating a program configuration in a package memory of a flash package.

FIG. 23 illustrates a configuration of a program group stored in the package memory 320. In the embodiment, the package memory 320 of the flash package 230 stores a data read process execution unit 9000, a data write request reception unit 9100, an actual block release process execution unit 9200, a virtual block storage process execution unit

9300, a virtual capacity determination processing unit 9400, and a virtual block movement processing unit 9500.

(1-4-2-1) Data Read Process

Figure 24:
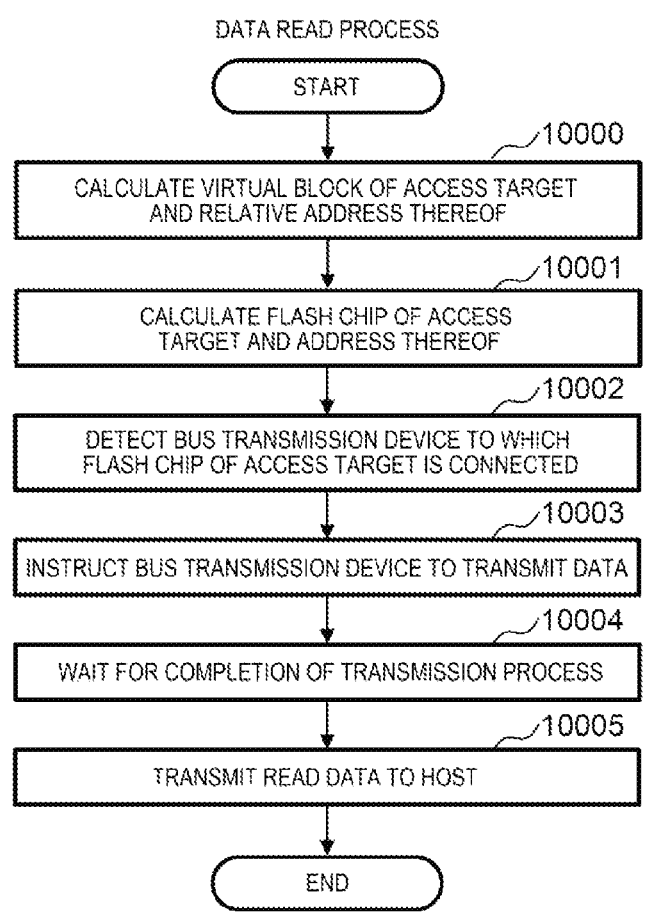
FIG. 24 is a flowchart illustrating a processing procedure of a data read process.

First, a data read process will be descried. FIG. 24 illustrates a processing procedure of a data read process executed by the data read process execution unit 9000 when the flash package 230 receives a read request from the storage controller 200 (see FIG. 2). FIG. 24 also illustrates a processing procedure when data stored in one segment is read. Here, the invention is effective even when data stored in a plurality of segments or some of the segments is read in response to the read request.

Step 10000: the data read process execution unit 9000 calculates a virtual block of an access target and a relative address of the access target in the virtual block from the address of the read target designated in the received read request. Then, the data read process execution unit 9000 acquires the virtual block information 3200 (see FIGS. 11 and 14) of the virtual block based on the calculation result. The data read process execution unit 9000 recognizes the virtual segment of the access target in the virtual block from the relative address in the calculated virtual block and recognizes the actual segment to which the virtual segment is allocated from the pointer stored in the actual segment address pointer 3208 (see FIG. 14) corresponding to the virtual segment.

Step 10001: the data read process execution unit 9000 acquires the actual block information (see FIGS. 11 and 15) of the actual block to which the virtual block of the access target is allocated based on the pointer stored in the actual block information pointer field 3202 of the virtual block information 3200 acquired in step 10000. The data read process execution unit 9000 detects the flash chip 300 (see FIG. 3) provided by the corresponding actual block (the actual block allocated by the virtual block of the access target) based on the actual block ID stored in the actual block ID field 3301 of the acquired actual block information 2200. Further, the data read process execution unit 9000 calculates an address of the actual segment allocating the virtual segment of the access target recognized in step 10000 in the flash chip 300 based on the pointer stored in the actual segment address pointer 3208 corresponding to the virtual block information 3200.

Step 10002: the data read process execution unit 9000 detects all the package buses 340 (see FIG. 3) to which the flash chip 300 is connected with reference to the connection bus ID field 3104 (see FIG. 13) of the chip information 3100 (see FIGS. 11 and 13) corresponding to the flash chip 300 of the access target calculated in step 10001 and detects all the package bus transmission devices 350 (see FIG. 3) to which the package buses 340 are connected.

Step 10003: the data read process execution unit 9000 instructs one package bus transmission device 350 among the package bus transmission devices 350 detected in step 10002 to read the data from the address calculated in step 10001 in the flash chip 300 of the access target detected in step 10001 and store the data in the buffer 330 (see FIG. 3).

Step 10004: the data read process execution unit 9000 waits until the package bus transmission device 350 instructed in step 10003 reads the data from the instructed address in the instructed flash chip 300 and completes the storing of the data in the buffer 330.

Step 10005: when the package bus transmission device 350 completes the storing of the data in the buffer 330, the data read process execution unit 9000 reads the data from the buffer 330 and transmits the read data to the storage controller 200 having transmitted the read request at that time.

Then, the data read process execution unit 9000 subsequently ends the data read process.

(1-4-2-2) Data Write Process

Figure 25A:
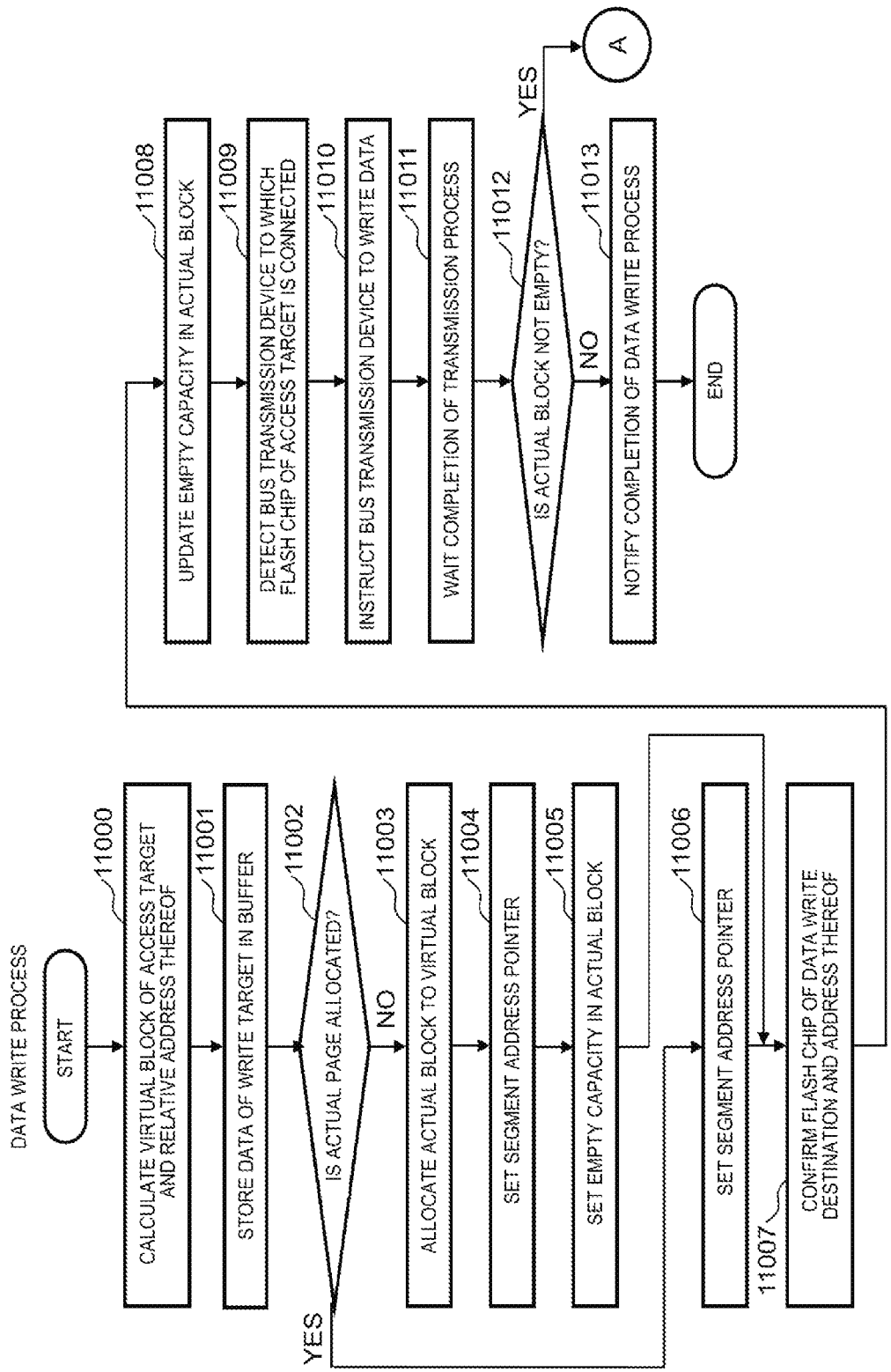
FIG. 25A is a flowchart illustrating a processing procedure of a data write process.

FIGS. 25A and 25B illustrate a processing procedure of a data write process executed by the data write request reception unit 9100 when the flash package 230 receives a write request and data of a write target from the storage controller 200 (see FIG. 2). FIGS. 25A and 25B illustrate a processing procedure when data is written on only one segment. The invention is effective even when data is written on a plurality of segments or some of the segments in response to the write request.

Step 11000: the data write request reception unit 9100 calculates a virtual block of a data write destination and a relative address of the data write destination in the virtual block from the address which is a write destination of data designated in the received write request and the capacity of the virtual block stored in the virtual block capacity field 3005 (see FIG. 12) of the package information 3000 (see FIGS. 11 and 12) of the flash package 230 of the write destination. In the embodiment, the write request from the host 110 is assumed to be issued for each segment (a page in a general term of a flash memory) which is a read/write unit of the flash memory. Of course, the invention is effective even when a read request from the host 110 designates only some of the virtual segments.

When a region of some of the virtual segments is designated as a data write destination in the write request, the data write request reception unit 9100 executes a process of reading all the data stored in the virtual segments, updating only the partial region designated in the read data, and subsequently writing the updated data of all the same virtual segments again.

Step 11001: the data write request reception unit 9100 stores the data of the write target transmitted from the storage controller 200 in the buffer 330.

Step 11002: the data write request reception unit 9100 determines whether the actual page is allocated to the virtual block of the data write destination. This determination is executed by determining whether a value other than "Null" is stored in the actual block information pointer field 3202 of the virtual block information 3200 (see FIGS. 11 and 14) corresponding to the virtual block of the data write destination. When the negative result is obtained in this determination, the data write request reception unit 9100 causes the process to proceed to step 11003 (No in step 11002). When the positive result is obtained, the process proceeds to step 11006 (Yes in step 11002).

Step 11003: the data write request reception unit 9100 allocates the actual block to the virtual block of the data write destination. In the embodiment, when the actual block is allocated to the virtual block, the actual block of the QLC mode is allocated. Specifically, the data write request reception unit 9100 allocates one actual block to four continuous virtual blocks of 4n to 4n+3 (where n>=0) including the virtual block of the data write destination. At this time, the data write request reception unit 9100 sets each pointer pointing one piece of same actual block information 3300 (see FIGS. 11 and 15) extracted from the QLC empty actual block information management queue 3401 (see FIG. 6) managed with the corresponding QLC empty actual block information pointer 3400, in the actual block information pointer field 3202 (see FIG. 14) of each piece of virtual block information 3200 (see FIGS. 11 and 14) corresponding to the four continuous virtual blocks of 4 n to 4n+3. The data write request reception unit 9100 sets a current time in each actual segment allocation time field 3206 of the four pieces of virtual block information 3200.

Step 11004: the data write request reception unit 9100 sets the address of the head actual segment of the actual block allocated to the virtual block in the segment address pointer field 3208 (see FIG. 14) associated with the virtual segment corresponding to the relative address of the data write destination in the virtual block of the data write destination.

Step 11005: the data write request reception unit 9100 stores the capacity of the actual block when the cell mode is the QLC mode, in the actual block empty capacity field 3304 (see FIG. 15) of the actual block information 3300 (see FIGS. 11 and 15) of the actual block allocated to the virtual block of the data write destination. Then, the data write request reception unit 9100 subsequently causes the process to proceed to step 11007.

Step 11006: the data write request reception unit 9100 sets the address of the actual segment in the empty state in the actual block in the segment address pointer field 3208 (see FIG. 14) associated with the virtual segment corresponding to the relative address of the data write destination in the virtual block of the data write destination with reference to the actual block empty capacity field 3304 of the actual block information 3300 (see FIGS. 11 and 15) of the actual block allocated to the virtual block of the data write destination.

Step 11007: the data write request reception unit 9100 confirms which address of a certain flash chip 300 correspond to the address of the actual segment set in the corresponding segment address pointer field 3208 (see FIG. 14) of the virtual block of the data write destination in step 11004 or 11006.

Step 11008: the data write request reception unit 9100 updates the value (an empty capacity of the actual block) stored in the actual block empty capacity field 3304 of the actual block information 3300 (see FIGS. 11 and 15) of the actual block allocated to the virtual block of the data write target with a value obtained by subtracting a capacity of one segment from the value.

Step 11009: the data write request reception unit 9100 detects the package bus 340 (see FIG. 3) to which the flash chip 300 is connected with reference to the connection bus ID field 3104 of the chip information 3100 (see FIGS. 11 and 13) corresponding to the flash chip 300 of the data write destination confirmed in step 11007 and detects the package bus transmission device 350 (see FIG. 3) connected to the package bus 340.

Step 11010: the data write request reception unit 9100 instructs the package bus transmission device 350 detected in step 11009 to write the data of the write target stored in the buffer 330 in the address confirmed in step 11007 in the flash chip 300 confirmed in step 11007.

Step 11011: the data write request reception unit 9100 waits until the package bus transmission device 350 instructed in step 11010 completes the writing of the data of the record target stored in the buffer 330 in the instructed address in the instructed flash chip 300.

Step 11012: the data write request reception unit 9100 determines whether the empty capacity of the actual block is "0" (that is, whether the actual block is not empty) with reference to the actual block empty capacity field 3304 of the actual block information 3300 (see FIGS. 11 and 15) of the actual block allocated to the virtual block of the data write target in which the value is updated in step 11008. When the negative result is obtained in this determination (No in step 11012), the data write request reception unit 9100 causes the process to proceed to step 11013. When the positive result is obtained (Yes in step 11012), the process proceeds to step 11014.

Step 11013: the data write request reception unit 9100 notifies the storage controller 200 of the transmission source of the write request that the write process is completed on the data of the write target. Thereafter, the data write process ends.

Step 11014: the data write request reception unit 9100 allocates other actual blocks to the virtual blocks (four virtual blocks in the QLC mode and three virtual blocks in the TLC mode) corresponding to the filled actual blocks. The reason why the other actual blocks are allocated is that deviation in the number of erasures of the actual blocks is reduced. In practice, the data write request reception unit 9100 calls a wear leveling processing unit which is software not illustrated in FIG. 23 to determine the actual blocks to be allocated to the virtual blocks.

In the embodiment, a set of the actual blocks in the QLC mode and a set of the actual blocks in the TLC mode are assumed to be subjected wear leveling independently. That is, the number of erasures of the set of the actual blocks in the QLC mode and the number of erasures of the set of the actual blocks in the TLC mode are equalized independently.

The data write request reception unit 9100 receives the address of the actual block information 3300 of the actual blocks in which the data of the write data is newly stored from the wear leveling processing unit. Here, when the cell mode change flag stored in the cell mode change flag field 3207 (see FIG. 14) in the virtual block information 3200 (see FIG. 14) of the virtual blocks is turned off, the actual block information 3300 of the actual blocks operating in the TLC mode is received when the actual blocks are operating in the QLC mode until now or when the actual blocks operating in the QLC mode are operating in the TLC mode until now.

Conversely, when the cell mode change flag is turned on, it is necessary to allocate the actual blocks in the cell mode different from the cell mode allocated until now. Here, when the actual blocks are operating in the QLC mode until now, the data of twelve virtual blocks corresponding to the three actual blocks in the QLC mode is stored in four actual blocks in the TLC mode. Therefore, apart from the actual blocks in the QLC mode which are current process targets, the virtual block information 3200 corresponding to two actual blocks in the QLC mode to which the virtual blocks of which the cell mode change flag is turned on are allocated and information regarding four actual blocks which are operating in the TLC mode are received. When the actual blocks are operating in the TLC mode until now, twelve virtual blocks corresponding to four actual blocks of TLC are stored in three actual blocks of QLC. Therefore, apart from the actual blocks of TLC which are current process targets, the virtual block information corresponding to three actual blocks of TLC to which the virtual blocks of which the cell mode change flag is turned on are allocated and information regarding three actual blocks operating in the QLC mode are received.

When the cell mode change flag is turned on, the cell mode of the virtual blocks stored in the virtual block cell mode field 3207 of the corresponding virtual block information 3200 is changed to the TLC mode when the cell mode is the QLC mode until now, and is changed to the QLC mode when the cell mode is the TLC mode. Further, the cell mode change flag is turned off. The actual blocks in which the data is stored are in an erasure state, and thus are assumed to be in a state in which data can be directly written.

In the embodiment, the wear leveling processing unit presupposes a known technology as in WO 2011/010344, for example. Therefore, the detailed description will not be particularly made herein. The data write request reception unit 9100 increases the number of erasures stored in the virtual block number-of-erasures field 3204 (see FIG. 14) of the corresponding virtual block information 3200 herein. In practice, the data write request reception unit 9100 updates the number of erasures with a value obtained by adding "0.33" to an original value with regard to the virtual blocks to which the actual pages in the TLC mode are allocated until now and updates the number of erasures with a value obtained by adding "0.25" with regard to two virtual blocks to which the actual pages in the QLC mode are allocated.

Step 11015: when the cell mode is not changed, the data write request reception unit 9100 reads the data stored in four virtual blocks to the buffer 330 (see FIG. 3) when the cell mode of the current virtual blocks is the QLC mode and reads the data stored in three virtual blocks to the buffer 330 when the cell mode of the current virtual blocks is the TLC mode. When the cell mode is changed, the data stored in twelve virtual blocks is read to the buffer 330. Therefore, an address list indicating that data with a certain length is transmitted to the buffer 330 is generated from a certain address of a certain flash chip 300 and from addresses pointed by the segment address pointers stored in the segment address pointer field 3208 in which the stored value is not "Null" in the segment address pointer field 3208 of the corresponding virtual block information 3200 (see FIGS. 11 and 14).

Step 11016: the data write request reception unit 9100 accesses the chip information 3100 corresponding to the flash chip 300 recognized in step 11007, identifies the package bus 340 to which the flash chip 300 is connected, and recognizes the corresponding package bus transmission device 350.

Step 11017: the data write request reception unit 9100 designates the flash chip 300 and the address of the flash chip 300 with regard to the package bus transmission device 350 recognized in step 11016 based on the address list generated in step 11015, reads the data stored in the addresses, and gives an instruction to transmit the data to the buffer 330.

Step 11018: the data write request reception unit 9100 waits until the package bus transmission device 350 instructed in step 11017 completes transmission of the data to the buffer 330 (completes the data to the buffer 330) in response to the instruction.

Step 11019: when the cell mode is not changed, the data write request reception unit 9100 updates the segment address point 3208 in which "Null" is not set in the virtual block information 3200 (the virtual block information 3200 of four virtual blocks in the QLC mode and the virtual block information 3200 of three virtual blocks in the TLC mode) of each virtual block set as a processing target. The data write request reception unit 9100 sets the head address of the actual block allocated to the first valid segment address pointer 3208 and sets each of values obtained by sequentially adding the segment length to the head address in the subsequent valid segment address pointers 3208. When the cell mode is changed from the QLC mode to the TLC mode, this process is repeated four times to execute a process of storing the data of three virtual blocks to one actual block. When the cell mode is changed from the TLC mode to the QLC mode, this process is repeated three times to execute a process of storing the data of four virtual blocks to one actual block.

Step 11020: the data write request reception unit 9100 detects the address of a certain flash chip 300 in which there is the actual page with reference to the actual block ID field 3301 (see FIG. 15) of the actual block information 3300 (see FIG. 15) corresponding to the newly allocated actual block and generates an address list for giving an instruction to transmit the data written in the buffer 330 to the actual page in step 11017.

Step 11021: the data write request reception unit 9100 accesses the chip information 3100 (see FIG. 13) corresponding to the flash chip 300 in which the write data is stored and which is detected in step 11020, identifies the package bus 340 to which the flash chip 300 is connected, and detects the corresponding package bus transmission device 350.

Step 11022: the data write request reception unit 9100 instructs the package bus transmission device 350 recognized in step 11021 to read the data stored in the buffer 330 in step 11017 from the buffer 330 and write the data in the address detected in step 11020 in the flash chip 300 detected in step 11020.

Step 11023: the data write request reception unit 9100 waits until the package bus transmission device 350 instructed in step 11022 completes the writing of the data in the designated address of the flash chip 300 designated from the buffer 330 in response to the instruction.

Step 11024: the data write request reception unit 9100 calls the virtual capacity determination processing unit 9400 (see FIG. 23) in order to check whether it is necessary to change the virtual capacity of the flash package 230.

Step 11025: this step is a step of causing the actual blocks (the filled actual blocks) originally allocated to the virtual blocks to which the other actual blocks are allocated in step 11014 to enter an empty state. The data write request reception unit 9100 first erases all the data stored in the originally allocated actual blocks. When the data erasure process is completed, the data write request reception unit 9100 sets the address of the actual block information 3300 pointed by the QLC empty actual block information pointer 3400 (see FIG. 11) in the empty actual block pointer field 3302 (see FIG. 15) of the actual block information 3300 (see FIG. 15) corresponding to the actual blocks and sets the address of the actual block information 3300 corresponding to the originally allocated actual blocks in the QLC empty actual block management information pointer 3400.

Step 11026: the data write request reception unit 9100 allocates the other actual blocks to the virtual blocks (four virtual blocks in the case of the QLC mode and three virtual blocks in the case of the TLC mode) corresponding to the filled actual blocks. Specifically, the data write request reception unit 9100 updates the virtual block information 3200 so that the actual block information pointer field 3202 (see FIG. 14) of the corresponding filled virtual block information 3200 (see FIG. 14) indicates the actual block information 3300 of the newly allocated actual blocks.

Step 11027: the data write request reception unit 9100 reports the completion of the data write process to the storage controller 200 (see FIG. 2). At this time, since erasure occurs in the virtual blocks, the data write request reception unit 9100 reports the occurrence of the erasure to the storage controller 200. When the virtual capacity of the flash package 230 is changed, the data write request reception unit 9100 reports the new virtual capacity and the past capacity (the value stored in the package capacity field 3002 (see FIG. 12)) to the storage controller 200. The data write request reception unit 9100 sets the new virtual capacity in the package capacity field 3002.

(1-4-2-3) Actual Block Release Process

Figure 26:
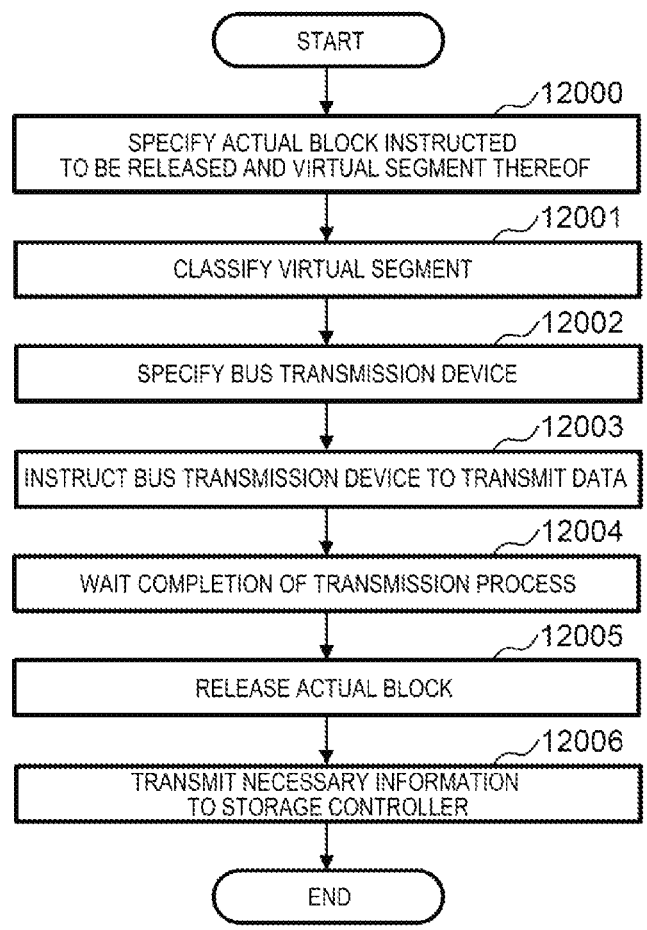
FIG. 26 is a flowchart illustrating a processing procedure of an actual block release process.

FIG. 26 illustrates a processing procedure of an actual block release process executed by the actual block release process execution unit 9200 (see FIG. 23) when the storage controller 200 designates a range of a region (a set of the virtual segments) and gives a request to release the range of the region (hereinafter referred to as a block release request) to the flash package 230 (see FIG. 3). In this case, the storage controller 200 is assumed to designate the virtual blocks of a multiple of 12 as the range of the region to be released.

Step 12000: the actual block release process execution unit 9200 calculates a range of a region which is a target and is designated in the received block release request and a set of the virtual blocks instructed to be released from the capacity of the flash package 230 stored in the package capacity field 3002 of the package information 3000 (see FIG. 12) of each flash package 230. The actual block release process execution unit 9200 accesses the virtual block information 3200 of the virtual block for each virtual block and acquires the segment address of each virtual segment included in the range of the region instructed to be released from the corresponding actual segment address pointer field 3208.

Step 12001: the actual block release process execution unit 9200 classifies all the virtual segments included in the range of the region to be released into the virtual segments of which the corresponding segment address point is "Null" and the virtual segments of which the corresponding segment address point is not "Null." Hereinafter, the segment address pointer which is not "Null" is referred to as a "valid segment address pointer."

Step 12002: the actual block release process execution unit 9200 specifies the flash chip 300 supplying the actual block including the actual segment pointed by the valid segment address point for each valid segment address pointer, specifies the package bus 340 (see FIG. 3) to which the flash chip 300 is connected with reference to the chip information 3100 (see FIG. 13) corresponding to the flash chip 300, and specifies the package bus transmission device 350 (see FIG. 3) connected to the package bus 340.

Step 12003: the actual block release process execution unit 9200 generates an information list in which all the flash chips 300 to be accessed and relative address to be accessed in the flash chips 300 based on all the valid actual segment address pointers 3208. Thereafter, the generated information list is delivered to the corresponding package bus transmission device 350 specified in step 12002, the data is read from the actual segment of the corresponding relative address in the corresponding flash chip 300 in accordance with the information list, and an instruction to store the data in the buffer 330 is given.

Step 12004: the actual block release process execution unit 9200 waits until all the package bus transmission devices 350 instructed in step 12003 reads the data from the actual segment of the instructed relative address in the instructed flash chip 300 and completes storing of the data in the buffer 330.

Step 12005: the actual block release process execution unit 9200 releases all the actual blocks to which each virtual block in which the storing of the data in the buffer 330 is completed is allocated.

Specifically, the actual block release process execution unit 9200 updates the values of the actual block information pointer field 3202 of the virtual block information 3200 (see FIG. 14) corresponding to the virtual block and the corresponding segment address pointer field 3205 with "Null."

The actual block release process execution unit 9200 updates the values stored in the actual block empty capacity field 3304 (see FIG. 15) of all the corresponding actual block information 3300 (see FIG. 15) with the empty capacity when the cell mode is the TLC mode, and updates all the values stored in the cell mode field 3303 of the actual block information 3300 with the TLC mode.

Further, the actual block release process execution unit 9200 erases the data stored in all the corresponding actual blocks and changes the cell mode of the actual blocks to the TLC mode. Thereafter, the actual block release process execution unit 9200 connects all the corresponding actual block information 3300 (see FIG. 15) to the TLC empty actual block information management queue 3501 (see FIG. 17) managed with the corresponding TLC empty actual block information pointer 3500 (see FIG. 11).

Step 12006: the actual block release process execution unit 9200 transmits a processing result of step 12001 and information regarding the actual segments of which the data is read to the buffer 330 to the storage controller 200. Then, the actual block release process execution unit 9200 subsequently ends the actual block release process.

(1-4-2-4) Virtual Block Storage Process

Figure 27:
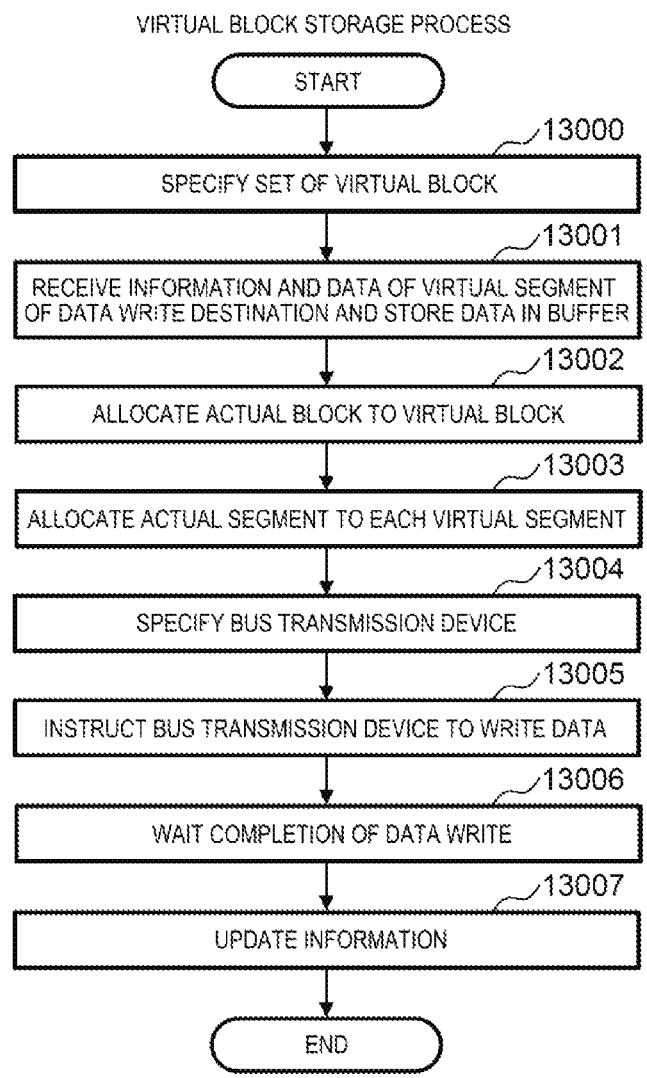
FIG. 27 is a flowchart illustrating a processing procedure of a virtual block storage process.

FIG. 27 illustrates a processing procedure of a virtual block storage process executed by the virtual block storage process execution unit 9300 when the storage controller 200 designates a range of a region (a set of a virtual block), allocates each actual block to each virtual block within the range of the region, and gives a request to store data transmitted from the storage controller 200 (hereinafter referred to as a virtual block storage request) to the flash package 230 (see FIG. 3). In this case, the storage controller 200 is assumed to designate the virtual blocks of a multiple of 12 as the range of the region to be released.

Step 13000: the virtual block storage process execution unit 9300 calculates a range of a region designated in the received virtual block storage request and a set of the virtual blocks which are targets from the capacity of the flash package 230 stored in the package capacity field 3002 of the package information 3000 (see FIG. 12) of each flash package 230. In the embodiment, 4n+3 (where, n>=0) virtual blocks are assumed to be designated from 4n virtual blocks. The virtual block storage process execution unit 9300 accesses the virtual block information 3200 of the virtual block for each virtual block and acquires the segment address of the actual segment associated with each virtual segment included in the virtual block from each actual segment address pointer field 3208 of the corresponding virtual block information 3200 (see FIG. 14).

Step 13001: the virtual block storage process execution unit 9300 designates all the virtual segments in which the data is stored among the virtual segments within the range of the region designated in the virtual block storage request from the storage controller 200, acquires the data to be stored in the virtual segments, and stores the acquired data of each virtual segment in the buffer 330 (see FIG. 3).

Step 13002: the virtual block storage process execution unit 9300 allocates the actual blocks to the virtual blocks within the range of the region designated in the virtual block storage request. In the embodiment, the virtual block storage process execution unit 9300 allocates the empty actual blocks in the QLC mode at this time. Accordingly, at this time, the virtual block storage process execution unit 9300 allocates the number of actual blocks of ¼ of the number of virtual blocks included in the range of the region designated in the virtual block storage request. Specifically, the virtual block storage process execution unit 9300 extracts the number of pieces of actual block information 3300 (see FIG. 15) of ¼ of the number of virtual blocks within the range of the region designated in the virtual block storage request from the QLC empty actual block information management queue 3401 (see FIG. 16) managed with the corresponding QLC empty actual block information pointer 3400 (see FIG. 11) and allocates the actual blocks corresponding to the actual block information 3300 to the virtual blocks.

At this time, the virtual block storage process execution unit 9300 allocates one same actual block to first four virtual blocks. Specifically, the virtual block storage process execution unit 9300 stores the pointer pointing the same actual block information 3300 extracted from the QLC empty actual block information management queue 3401 in the actual block information pointer field 3202 (see FIG. 14) of the virtual block information 3200 (see FIG. 14) each corresponding to the first four virtual blocks. Hereinafter, similarly, the virtual block storage process execution unit 9300 stores the pointer instructing the same actual block information 3300 extracted from the QLC empty actual block information management queue 3401 in the actual block information pointer field 3202 of the virtual block information 3200 of the virtual block for each of the four continuous virtual blocks with regard to all the remaining virtual blocks included in the range of the designated region.

Step 13003: the virtual block storage process execution unit 9300 allocates the actual segments to all the virtual segments in each virtual block within the range of the region designated in the virtual block storage request. Specifically, the virtual block storage process execution unit 9300 sets each value in each segment address pointer field 3208 (see FIG. 14) of the virtual block information 3200 each corresponding to the virtual blocks. At this time, the virtual block storage process execution unit 9300 sets "Null" in the segment address pointer field 3208 corresponding to the virtual segments in which data is not stored.

The virtual block storage process execution unit 9300 determines the address of the actual segment allocated to the virtual segment from the number of empty actual segments calculated from the empty capacity stored in the actual block empty capacity field 3304 (see FIG. 15) of the actual block information 3300 (see FIG. 15) corresponding to the actual block allocated to the virtual block in the segment address pointer field 3208 corresponding to the virtual segment in which data is not stored, and sets the value in the segment address pointer field 3208 corresponding to the virtual segment. When the address of the actual segment is set in the segment address pointer field 3208, the virtual block storage process execution unit 9300 decreases the empty capacity in the actual block stored in the actual block empty capacity field 3304 of the actual block information 3300 of the actual block including the actual segment by the capacity of one actual segment.

Step 13004: the virtual block storage process execution unit 9300 specifies the package bus 340 to which the flash chip 300 is connected with reference to the connection bus ID field 3104 (see FIG. 13) of the chip information 3100 (see FIG. 13) of the flash chip 300 (see FIG. 3) supplying each actual segment in which the data determined as described above is stored, and specifies the package bus transmission device 350 (see FIG. 3) connected to the package bus 340.

Step 13005: the virtual block storage process execution unit 9300 instructs the package bus transmission device 350 specified in step 13004 to store the address of a certain flash chip 300 in which the data from the storage controller 200 stored in the buffer 330 is stored.

Step 13006: the virtual block storage process execution unit 9300 waits until the package bus transmission device 350 instructed in step 13005 completes storing of the data in the instructed address in the instructed flash chip 300.

Step 13007: the virtual block storage process execution unit 9300 updates the value stored in the chip empty actual number-of-blocks field 3103 of the chip information 3100 (see FIG. 13) corresponding to the flash chip 300 on which the data is written in step 13006 with a value decreased by the number of actual blocks allocated to the virtual blocks in step 13002. The virtual block storage process execution unit 9300 reports the completion of the process in response to the virtual block storage request to the storage controller 200 of the transmission source of the virtual block storage request. Thereafter, the virtual block storage process ends.

(1-4-2-5) Virtual Capacity Determination Process

Figure 28:
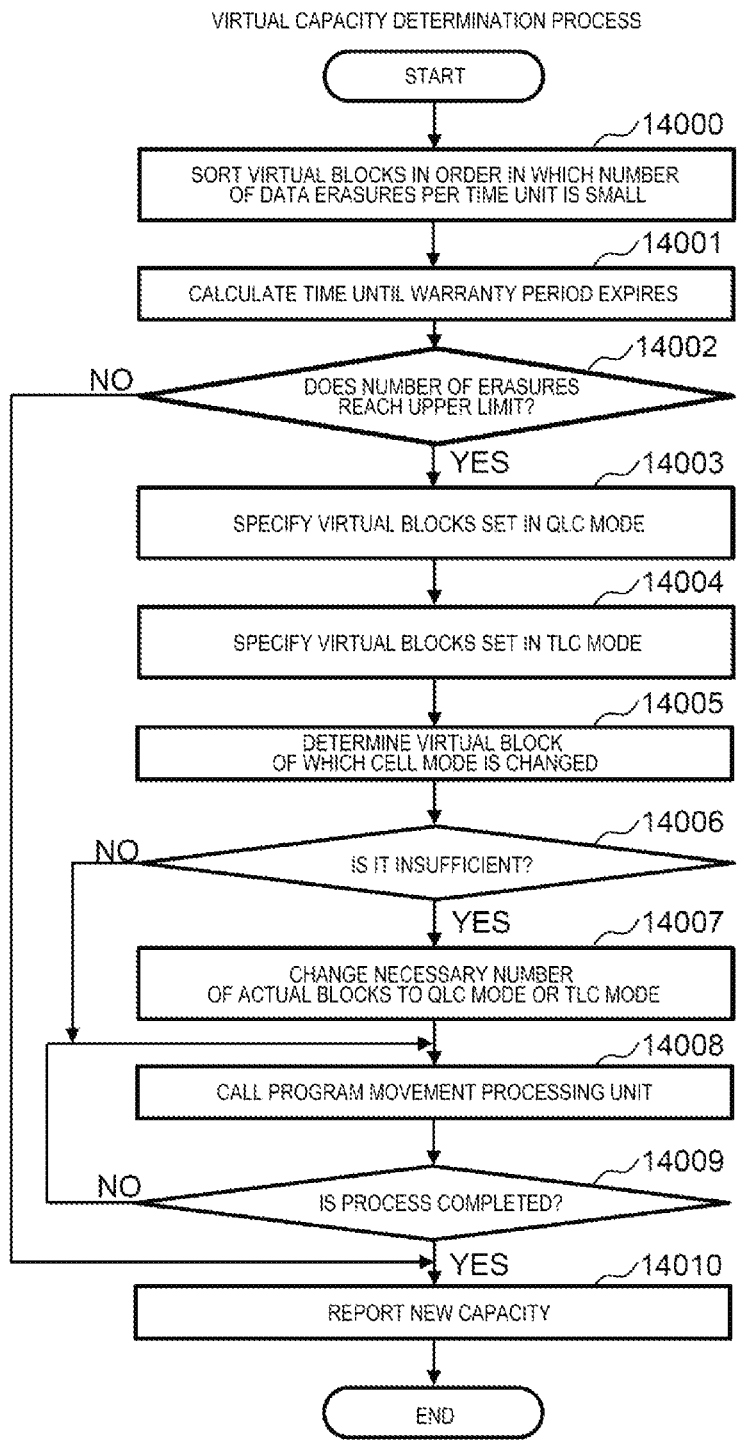
FIG. 28 is a flowchart illustrating a processing procedure of a virtual capacity determination process.

FIG. 28 illustrates a processing procedure of a virtual capacity determination process executed periodically or aperiodically by the virtual capacity determination processing unit 9400. The virtual capacity determination processing unit 9400 predicts a lifetime of the flash package 230 (hereinafter referred to as a self-flash package 230) on which the virtual capacity determination processing unit 9400 is mounted in the processing procedure illustrated in FIG. 28 and changes the cell mode of a necessary cell from the QLC mode to the TLC mode or from the TLC mode to the QLC mode as necessary.

Step 14000: with regard to all the virtual blocks to which the actual blocks in the self-flash package 230 are allocated (hereinafter referred to as target destination virtual blocks), the virtual capacity determination processing unit 9400 calculates the number of data erasures per unit time of the target virtual blocks based on the number of erasures of data in the target virtual block stored in the virtual block number-of-erasures field 3204 (see FIG. 14) of the corresponding virtual block information 3200 (see FIG. 14), a time at which the actual blocks are allocated to the target virtual blocks stored in the actual block allocation time 3205 (see FIG. 14) of the virtual block information 3200, and a current time. The virtual capacity determination processing unit 9400 arranges the target virtual blocks in the order in which the number of data erasures per unit time is small, based on the calculation result.

Step 14001: the virtual capacity determination processing unit 9400 calculates a time from the current time to a time at which the warranty period of the self-flash package 230 expires.

Step 14002: when the data of each target virtual block is erased at the same pace as the previous pace, the virtual capacity determination processing unit 9400 determines whether "the number of erasures of one target virtual block reaches an upper limit of the number of erasures of the data in the QLC mode until the warranty period of the self-flash package 230 (see FIG. 2) expires" in one target virtual block.

Specifically, with regard to each target virtual block, the virtual capacity determination processing unit 9400 estimates the number of data erasures executed in the virtual block of the allocation target until the warranty period of the self-flash package 230 expires (hereinafter referred to as the estimated number of data erasures) by multiplying the number of data erasures per unit time of the target virtual block calculated in step 14000 by the time until the warranty period of the self-flash package 230 expires, as calculated in step 14001 and adding the number of data erasures until the current target virtual block to the multiplication result. Then, the virtual capacity determination processing unit 9400 sequentially compares the estimated number of data erasures of each target virtual block estimated in this way with a threshold set as the upper limit of the number of data erasures in the QLC mode (hereinafter referred to as a threshold of the number of data erasures) in the order of the arranged target virtual blocks.

The virtual capacity determination processing unit 9400 predicts that "the number of data erasures reaches the upper limit of the number of data erasures in the QLC mode until the warranty period of the self-flash package 230 expires" with regard to the target virtual block of which the estimated number of data erasures is equal to or greater than the threshold of the number of data erasures and predicts that "the number of data erasures does not reach the upper limit of the number of data erasures in the QLC mode until the warranty period of the self-flash package 230 (see FIG. 2) expires" with regard to the target virtual block of which the estimated number of data erasures is less than the threshold of the number of data erasures.

When the virtual capacity determination processing unit 9400 predicts that "the number of data erasures does not reach the upper limit of the number of data erasures in the QLC mode until the warranty period of the self-flash package 230 expires" with regard to all the target virtual blocks (No in step 14002), a problem does not occur even when all the target virtual blocks operate in the QLC mode. Therefore, the virtual capacity determination processing unit 9400 ends the virtual capacity determination process. Conversely, when the virtual capacity determination processing unit 9400 predicts that "the number of data erasures reaches the upper limit of the number of data erasures in the QLC mode until the warranty period of the self-flash package 230 expires" with regard to one target virtual block (Yes in step 14002), the virtual capacity determination processing unit 9400 causes the process to proceed to step 14003.

Step 14003: with regard to the target virtual block of which "the number of data erasures is predicted first in step 14002 to reach the upper limit of the number of data erasures in the QLC mode until the warranty period of the self-flash package 230 expires" and each target virtual block arranged after this target virtual block, it is necessary to operate the actual blocks allocated to the target virtual blocks in the TLC mode of which the upper limit of the number of data erasures is higher than the QLC mode.

Accordingly, in step 14003, the virtual capacity determination processing unit 9400 specifies all the target virtual blocks of which the cell mode of the actual block allocated to the target virtual block is currently set to the QLC mode among the target virtual block of which "the number of data erasures is predicted first in step 14002 to reach the upper limit of the number of data erasures in the QLC mode until the warranty period of the self-flash package 230 expires" and each target virtual block arranged after this target virtual block. The target virtual blocks are specified by specifying the target virtual block of which the cell mode stored in the virtual block cell mode field 3206 (see FIG. 14) of the corresponding virtual block information 3200 (see FIG. 14) is the QLC mode.

Step 14004: in step 14004, the virtual capacity determination processing unit 9400 specifies all the target virtual blocks of which the cell mode of the actual block allocated to the target virtual block is currently set to the TLC mode among each target virtual block arranged before this target virtual block of which "the number of data erasures is predicted first in step 14002 to reach the upper limit of the number of data erasures in the QLC mode until the warranty period of the self-flash package 230 expires." The target virtual blocks are specified by specifying the target virtual block of which the cell mode stored in the virtual block cell mode field 3206 (see FIG. 14) of the corresponding virtual block information 3200 (see FIG. 14) is the TLC mode.

Step 14005: the virtual capacity determination processing unit 9400 determines the actual blocks each allocated to each target virtual block specified in step 14003 as the actual blocks of which the cell mode is changed from the QLC mode to the TLC mode, determines the actual blocks each allocated to each target virtual block specified in step 14004 as the actual blocks of which the cell mode is changed from the TLC mode to the QLC mode, and sets each cell mode change flag stored in the cell mode change flag field 3208 of the virtual block information 3200 (see FIG. 14) of the actual blocks to turned on in order to exchange the actual blocks allocated to each target virtual block specified in step 14003 with the actual blocks allocated to each target virtual block specified in step 14004.

Since the capacity ratio of QLC to TLC is 4:3, 12 target virtual blocks stored in 3 actual blocks operating in the QLC mode are permutated with 12 target virtual blocks stored in 4 actual blocks operating the TLC mode when each target virtual block specified in step 14003 and each target virtual block specified in step 14004 are permutated.

Step 14006: the virtual capacity determination processing unit 9400 determines whether the permutation of the actual blocks each allocated to each target virtual block specified in step 14003 and the actual blocks each allocated to each target virtual block specified in step 14004 is insufficient, and thus the actual block which may not be permutated with the actual block of which the cell mode is set to the TLC mode (hereinafter referred to as a remaining actual block) occurs among the actual blocks each allocated to the target virtual block specified in step 14003. Then, when the negative result is obtained in this determination (No in step 14006), the virtual capacity determination processing unit 9400 causes the process to proceed to step 14008. When the positive result is obtained (Yes in step 14006), the process proceeds to step 14007.

Step 14007: when the positive result is obtained in step 14006 and several actual blocks currently set to the QLC mode are changed to the TLC mode, the virtual capacity determination processing unit 9400 calculates whether all the data stored in each actual block allocated to the target virtual block of which "the number of data erasures is predicted to reach the upper limit of the number of data erasures in the QLC mode until the warranty period of the self-flash package 230 expires" can be moved to the actual block set to the TLC mode (that is, calculates the number of remaining actual blocks described above).

The virtual capacity determination processing unit 9400 moves the same number of pieces of actual block information 3300 as the calculated number from the QLC empty actual block information management queue 3401 (see FIG. 16) managed with the QLC empty actual block information pointer 3400 (see FIG. 11) corresponding to the self-flash package 230 to the TLC empty actual block information management queue 3501 (see FIG. 17) managed with the TLC empty actual block information pointer 3500 (see FIG. 11) corresponding to the self-flash package 230.

At this time, the virtual capacity determination processing unit 9400 changes the values stored in the cell mode field 3303 of the actual block information 3300 moved to the TLC empty actual block information management queue 3501 to the TLC mode. Further, the virtual capacity determination processing unit 9400 changes the capacities stored in the actual block empty capacity field 3304 of the actual block information 3300 to the capacities in accordance with the block sizes when the cell mode is changed to the TLC mode.

Step 14008: the virtual capacity determination processing unit 9400 calls the virtual block movement processing unit 9500 (see FIG. 23) in order to migrate the data stored in 3 actual blocks allocated to a total of 12 target virtual blocks among the target virtual blocks of which "the number of data erasures is predicted to reach the upper limit of the number of data erasures in the QLC mode until the warranty period of the self-flash package 230 expires," to a total of 4 actual blocks including the actual blocks allocated to the virtual blocks specified in step 14004 or the actual blocks of which the actual block information 3300 is moved to the TLC empty actual block information management queue 3501 in step 14007.

Step 14009: the virtual capacity determination processing unit 9400 determines whether the data stored in the actual blocks allocated to each virtual block specified in step 14003 is all migrated to the actual blocks in the TLC mode. When the negative result is obtained in this determination (No in step 14009), the virtual capacity determination processing unit 9400 returns the process to step 14008. In this way, the virtual capacity determination processing unit 9400 causes the data stored in the actual blocks allocated to each virtual block specified in step 14003 to migrate to the actual blocks in the TLC mode in units of 12 virtual blocks. Then, when the data stored in each actual block allocated to each virtual block specified in step 14003 all migrate to the actual blocks in the TLC mode (Yes in step 14009), the virtual capacity determination processing unit 9400 causes the process to proceed to step 14010.

Step 14010: the virtual capacity determination processing unit 9400 reports a new capacity of the self-flash package 230 to the storage controller 200. As described above, the virtual capacity determination process ends.

(1-4-2-6) Virtual Block Movement Process

Next, content of a process of the virtual block movement processing unit 9500 will be described. When the virtual block movement processing unit 9500 is called by the virtual capacity determination processing unit 9400, the virtual block movement processing unit 9500 executes a virtual block movement process of moving the data stored in the 12 virtual blocks designated at that time by the virtual capacity determination processing unit 9400 to the actual blocks operating in the TLC mode.

In this case, the virtual block movement processing unit 9500 first reads the data stored in the 12 virtual blocks designated by the virtual capacity determination processing unit 9400 to the buffer 330 (see FIG. 3). Since content of this process is the same as steps 12000 to 12005 of the actual block release process described above in FIG. 26, the description thereof will not be repeated herein.

Thereafter, the virtual block movement processing unit 9500 writes the data read to the buffer 330 on 4 actual blocks of movement destinations in the TLC mode. Content of this process is substantially the same as steps 13001 to 13007 of the virtual block storage process described above in FIG. 27. Here, this process is different from the virtual block storage process of FIG. 27 in which 3 actual blocks operating in the QLC mode are allocated to 12 virtual blocks in that 4 actual blocks operating the TLC mode are allocated. Since the others are the same, the description thereof will not be repeated.

(1-5) Advantageous Effects of Embodiment

In the storage system 100 according to the above-described embodiment, when the data of each target virtual block is erased at the same pace as the previous pace for each virtual block, it is determined whether "the number of erasures of one target virtual block reaches the upper limit of the number of erasures of the data in the QLC mode until the warranty period of the self-flash package 230 (see FIG. 2) expires" in one target virtual block.

In the storage system 100, when the number of data erasures of one virtual block is predicted to "reach the upper limit of the number of data erasures in the QLC mode until the warranty period of the self-flash package 230 expires," the cell mode of the actual block allocated to the virtual block is changed to the TLC mode of which the upper limit of the number of data erasures is higher than the QLC mode.

Accordingly, according to the embodiment, while the cell mode of the actual block allocated to the virtual block is used as the QLC mode as much as possible with regard to each virtual block, the cell mode of the actual block allocated to the virtual block is changed to the TLC mode with regard to the virtual block of which the number of data erasures is predicted to reach the upper limit of the number of data erasures in the QLC mode until the warranty period of the self-flash package 230 (see FIG. 2) expires. Therefore, it is possible to realize the highly reliable storage system capable of maintaining performance of the flash storage 230 within the warranty period while effectively utilizing storage resources.

According to the embodiment, since the actual blocks each allocated to each virtual block can be operated in the QLC mode in which the amount of information storable in one cell is as large as possible, the amount of information stored in the whole storage system 100 can be large. Accordingly, it is possible to reduce the cost when the whole information system 1 is constructed.

(2) Second Embodiment

Next, a second embodiment will be described. In the second embodiment, only differences from the first embodiment will be described.

FIG. 29 illustrates a data configuration of actual page information 15000 according to the embodiment and the same reference numerals are given to portions corresponding to FIG. 6. In the embodiment, the cell mode of the storage controller 200 is set to the QLC mode or the TLC mode in an actual page unit. Therefore, in the actual page information 15000 according to the embodiment, a page cell mode field 15001 is provided and information indicating a cell mode set to a corresponding actual page is stored in the page cell mode field 15001. An initial value of the cell mode of the actual page according to the embodiment is assumed to be the QLC mode.

Figure 30:
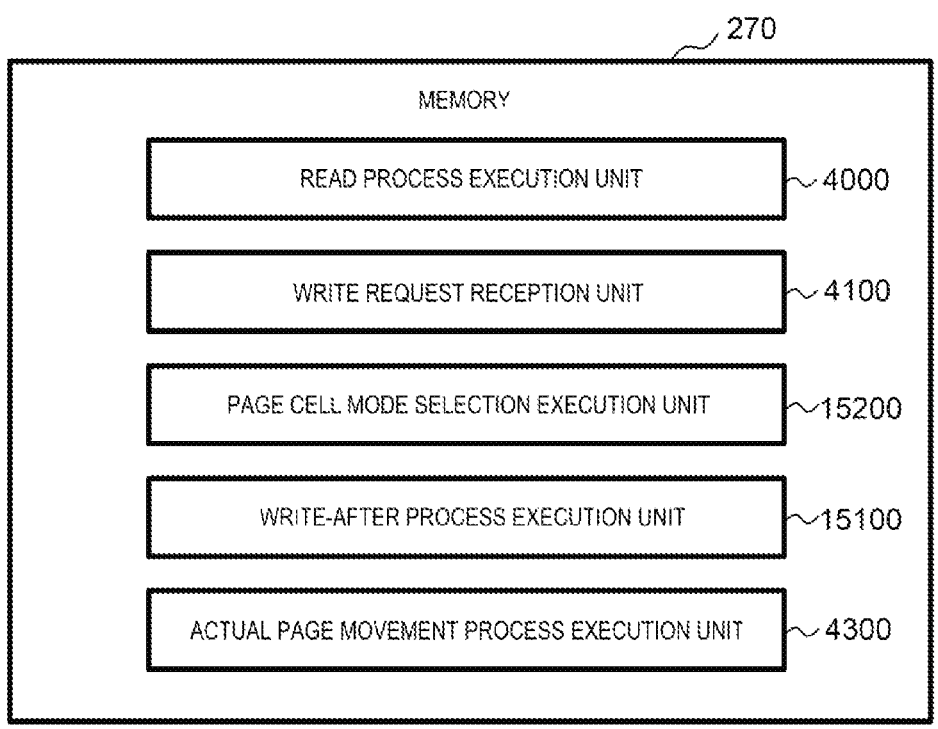
FIG. 30 is a block diagram illustrating a program configuration in a package memory of a flash package according to the second embodiment.

FIG. 30 illustrates a configuration of a program group stored in the memory 270 of the storage controller 200 according to the embodiment and the same reference numerals are given to portions corresponding to FIG. 18. The embodiment is different from the first embodiment in that content of a process of a write-after process execution unit 15100 is different from the write-after process execution unit 4200 (see FIG. 18) of the first embodiment and a page cell mode selection execution unit 15200 is stored as one of the programs in the memory 270.

Figure 31:
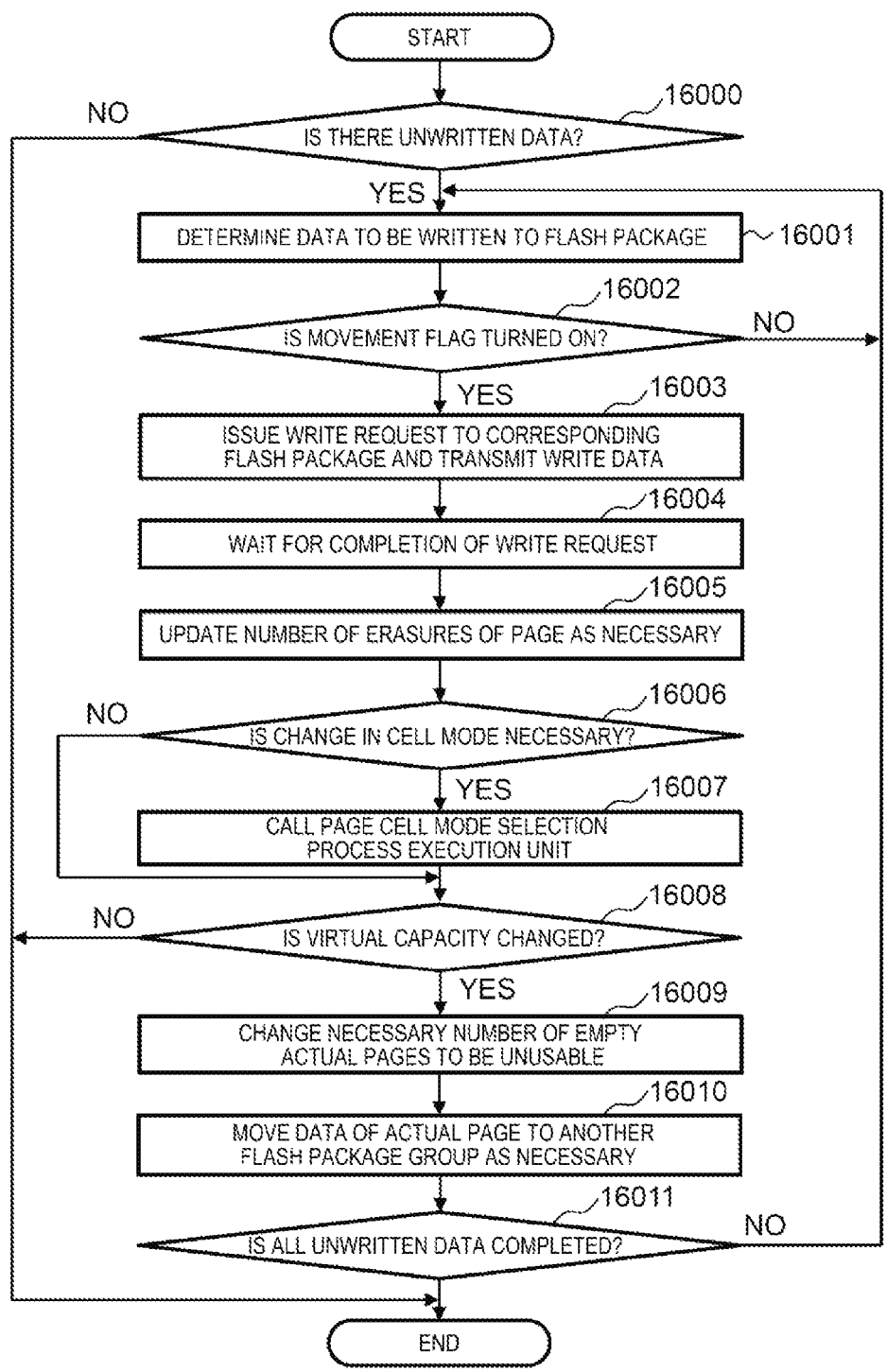
FIG. 31 is a flowchart illustrating a processing procedure of a write-after process according to the second embodiment.

FIG. 31 illustrates a processing procedure of a write-after process of the second embodiment executed by the write-after process execution unit 15100 according to the embodiment. Content of processes of step 16000 to 16005 and steps 16008 to 16011 is the same as that of steps 7000 to 7005 and steps 7006 to 7009 of the write-after process of the first embodiment described above in FIG. 21, and thus the description thereof will not be repeated herein.

The write-after process according to the embodiment is different from the write-after process according to the first embodiment in that steps 16006 and 16007 are executed between steps 16005 and 16008.

Step 16006: the write-after process execution unit 15100 checks whether it is necessary to reexamine the cell mode of the actual page in which data (destage target data) transmitted to the flash package 230 corresponding to step 16003 is stored. The write-after process execution unit 15100 obtains the positive result in step 16006 (Yes in step 16006), for example, when the number of erasures of a page is equal to or greater than a certain threshold. In this case, the process proceeds to step 16007. Otherwise, the write-after process execution unit 15100 causes the process to proceed to step 16008 (No in step 16006).

Step 16007: the write-after process execution unit 15100 calls the page cell mode selection execution unit 15200 (see FIG. 30). Thereafter, the process proceeds to step 16008.

Figure 32:
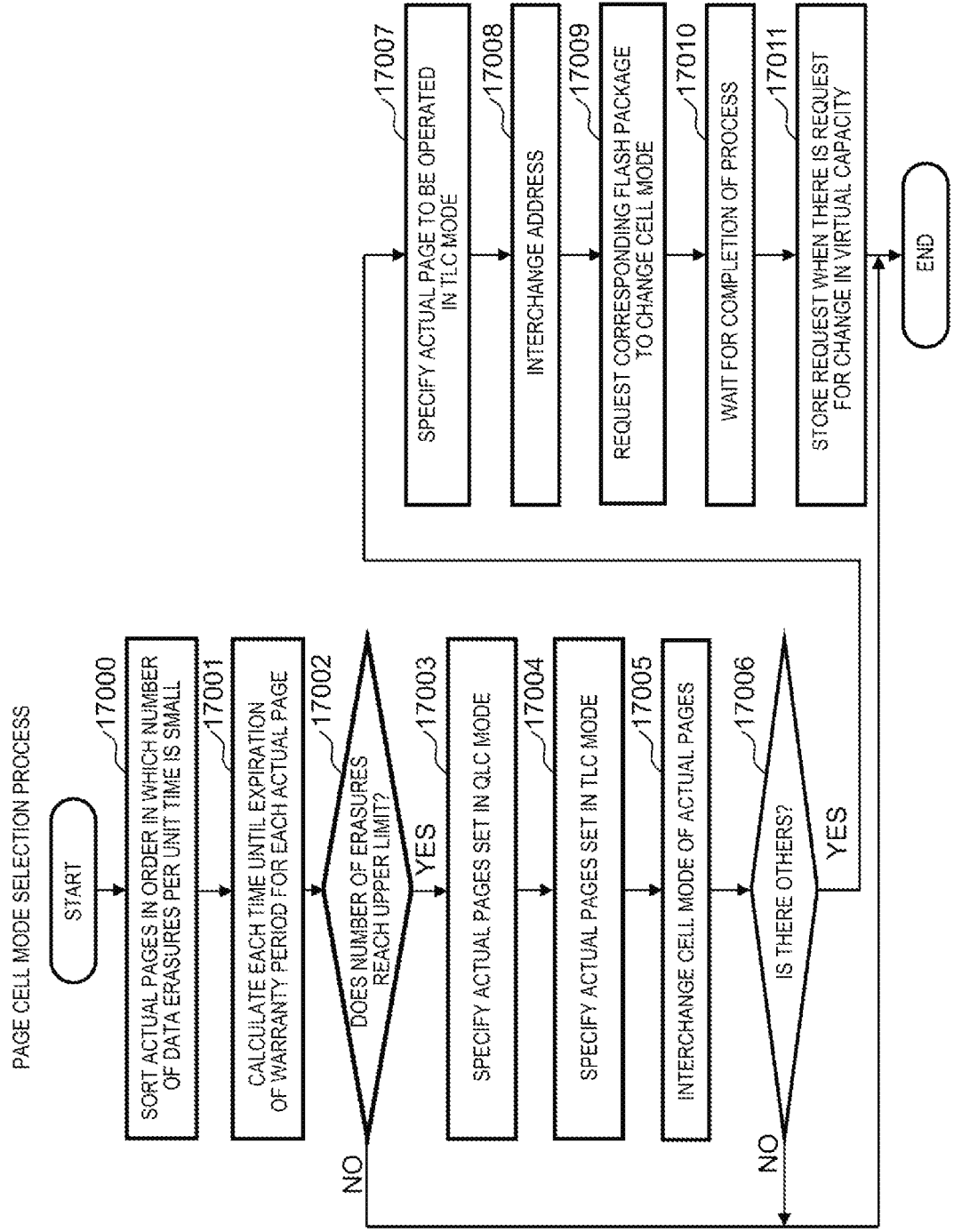
FIG. 32 is a flowchart illustrating a processing procedure of a select process and a page cell mode.

FIG. 32 illustrates a processing procedure of the cell mode selection process executed by the page cell mode selection execution unit 15200 called by the write-after process execution unit 15100 in step 16007 of the above-described write-after process.

Step 17000: with regard to all the actual pages, the page cell mode selection execution unit 15200 calculates the number of data erasures per unit time of the actual page based on a data write amount of the actual page information 15000 (see FIG. 29) of the actual pages to the actual pages stored in the page write amount field 2105 and a time at which the actual pages stored in the page allocation time field 2104 of the actual page information 15000 are allocated to the virtual pages. The page cell mode selection execution unit 15200 sorts the actual pages in the order in which the number of data erasures per unit time is small based on the calculation result.

Step 17001: the page cell mode selection execution unit 15200 calculates a time from a current time to completion of a warranty period for each actual page.

Step 17002: the page cell mode selection execution unit 15200 determines whether the number of data erasures of the actual page reaches an upper limit of the QLC mode until the warranty period of the flash package 230 (see FIG. 2) supplying the actual page expires when the data of the actual page is erased at the same pace as the previous pace in the order of the actual pages of which the number of data erasures per unit time is small. Then, when the negative result is obtained on all the actual pages (No in step 17002), the page cell mode selection execution unit 15200 ends the cell mode selection process since a problem does not occur even when the actual pages are operated in the QLC mode. When the positive result is obtained on one actual page (Yes in step 17002), the page cell mode selection execution unit 15200 causes the process to proceed to step 17003.

Step 17003: with regard to the actual page in which the positive result is obtained first in step 17002 and each actual page arranged after the actual page, it is necessary to set the cell mode of the actual page to the TLC mode of which the upper limit of the number of data erasures is higher than the QLC mode in the operation. Accordingly, in step 17003, the page cell mode selection execution unit 15200 specifies all the actual pages of which the cell mode is currently set to the QLC mode among the actual pages in which the positive result is obtained first in step 17002 and each actual page arranged after the actual page. The actual pages are specified by specifying the actual pages of which the cell mode stored in the page cell mode field 15001 (see FIG. 29) of the actual page information 15000 (see FIG. 29) of the corresponding actual page is the QLC mode.

Step 17004: with regard to the actual pages arranged before the actual page in which the positive result is obtained first in step 17002, it is predicted that the number of data erasures of the actual page does not reach the upper limit of the number of data erasures in the QLC mode until the warranty period of the flash package 230 (see FIG. 2) supplying the actual page expires even when the cell mode of the actual page is the QLC mode. Accordingly, in step 17004, the page cell mode selection execution unit 15200 specifies all the actual pages of which the cell mode is currently set to the TLC mode among the actual pages arranged before the actual page in which the positive result is obtained first in step 17002. The actual pages are specified by specifying the actual pages of which the cell mode stored in the page cell mode field 15001 (see FIG. 29) of the actual page information 15000 (see FIG. 29) of the corresponding actual page is the TLC mode.

Step 17005: the page cell mode selection execution unit 15200 obtains the flash package 230 so that the cell mode is interchanged between a set of the actual pages specified in step 17003 and a set of the actual pages specified in step 17004. Specifically, the page cell mode selection execution unit 15200 changes the address of the flash package 230 of the flash package group 280. Thereafter, the page cell mode selection execution unit 15200 requests interchange of the cell mode (an address changed from the QLC mode to the TLC mode and an address changed from the TLC mode to the QLC mode) in each flash package and waits completion of the process.

In the embodiment, in each flash package 230, the virtual block of a multiple of 12 is designated and the interchange of the cell mode described above is requested. That is, the cell modes of 12 virtual blocks allocated to 3 actual blocks in the QLC mode and 12 virtual blocks allocated to 4 actual blocks in the TLC mode are interchanged. Thereafter, the page cell mode selection execution unit 15200 updates the cell modes stored in the page cell mode field 15001 of the actual page information 15000 (see FIG. 29) corresponding to the actual pages on which the interchange is executed. Since the interchange is merely executed, the number of actual blocks operating in the QLC mode and the number of actual blocks operating in the TLC mode are not changed in the flash package 230.

Step 17006: the page cell mode selection execution unit 15200 checks whether it is necessary to newly change the actual page operating in the QLC mode to the actual page operating in the TLC mode since the interchange of the cell mode in step 17005 is insufficient. When the negative result is obtained in this determination, the page cell mode selection execution unit 15200 ends the cell mode selection process (No in step 17006). When the positive result is obtained in this determination, the process proceeds to step 17007 (Yes in step 17006).

Step 17007: when the positive result is obtained in step 17006, it is necessary to operate some of the actual pages in the TLC mode. Therefore, the page cell mode selection execution unit 15200 specifies the actual pages operating in the QLC mode currently with the actual pages necessarily operated in the TLC mode.

Step 17008: the page cell mode selection execution unit 15200 converts the address of the set of the actual pages specified in step 17007 to the address of the flash package 230 of the flash package group 280.

Step 17009: the page cell mode selection execution unit 15200 designates the address and requests the corresponding flash package 230 so that the cell mode of the cell with the address is changed to the TLC mode. In the embodiment, in each flash package 230, the virtual blocks of a multiple of 12 are assumed to be designated.

Step 17010: the page cell mode selection execution unit 15200 waits to be notified of completion of the process from the flash package 230 requesting the change in the cell mode in step 17009.

Step 17011: with regard to each actual page of which the cell mode is changed to the TLC mode, the page cell mode selection execution unit 15200 changes the cell mode to the TLC mode stored in the page cell mode field 15001 (see FIG. 29) of the actual page information 15000 (see FIG. 29) of the actual pages. When there is a request for the change in the virtual capacity, the page cell mode selection execution unit 15200 stores the request and completes the process.

Figure 33:
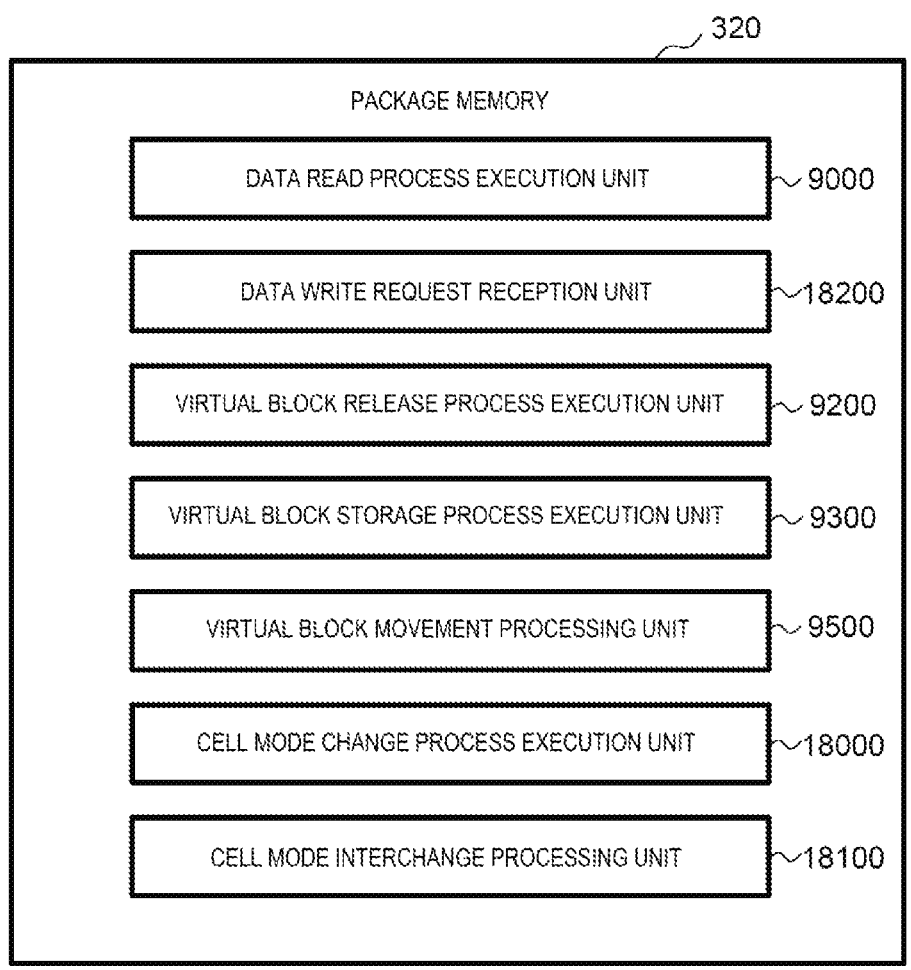
FIG. 33 is a block diagram illustrating a program configuration in a package memory of a flash package according to the second embodiment.

FIG. 33 illustrates a configuration of a program group stored in the package memory 320 (see FIG. 3) of the flash package 230 according to the embodiment and the same reference numerals are given to portions corresponding to FIG. 23. Differences from the first embodiment in that content of a process of a data write request reception unit 18200 is different form content of the process of the data write request reception unit 9100 (see FIG. 23) of the first embodiment and a cell mode change process execution unit 18000 and a cell mode interchange processing unit 18100 are stored instead of the virtual capacity determination processing unit 9400 (see FIG. 23).

Figure 34:
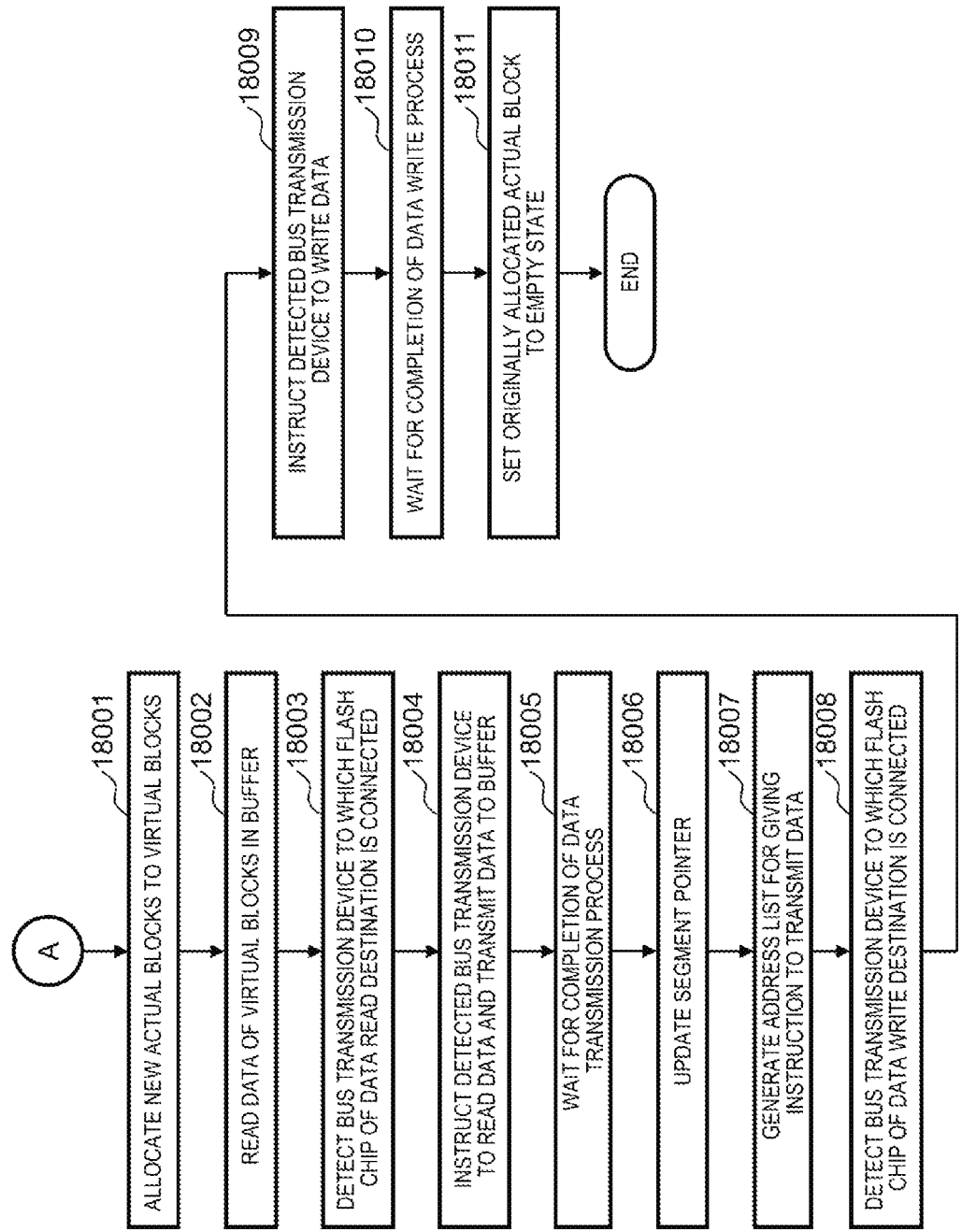
FIG. 34 is a flowchart illustrating a processing procedure of a part of a data write process according to the second embodiment.

FIG. 34 illustrates a part of the data write process executed by the data write request reception unit 18200 according to the embodiment instead of the data write process of the first embodiment described above in FIG. 25B. For different portions from the data write process described above in FIG. 25A, the data write request reception unit 18200 according to the embodiment executes a similar process to that of the data write request reception unit 9100 of the first embodiment. Therefore, the description thereof will not be repeated herein.

In FIG. 34, the data write request reception unit 18200 according to the embodiment processes steps 18001 to 18010 similarly to steps 11014 to 11023 of the data write process of the first embodiment described above in FIG. 25B. The data write request reception unit 18200 subsequently processes step 18011 similarly to step 11025 of FIG. 25B without calling the virtual capacity change determination execution unit 12500 (see FIG. 23). Thereafter, the data write process ends.

The cell mode interchange processing unit 18100 merely executes a process of turning on the cell mode change flag stored in the cell mode change flag field 3207 (see FIG. 14) of the virtual block information 3200 (see FIG. 14) with regard to each virtual block of the virtual blocks of which the cell mode is requested to be changed from the QLC mode to the TLC mode and the virtual blocks of which the cell mode is requested to be changed from the TLC mode to the QLC mode. Therefore, the detailed description of the process of the cell mode interchange processing unit 18100 will not be repeated.

Figure 35:
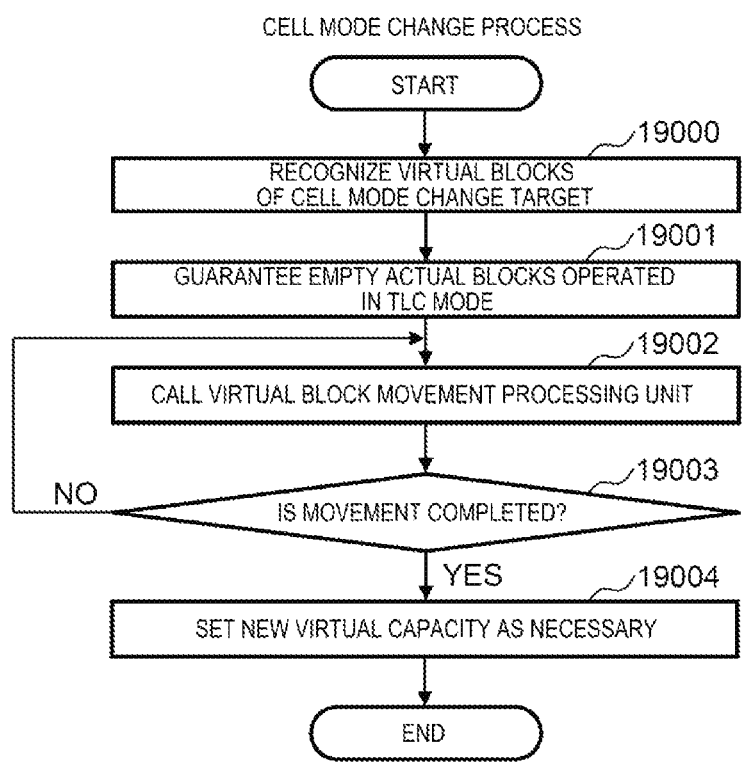
FIG. 35 is a flowchart illustrating a processing procedure of a part of a cell mode change process.

FIG. 35 illustrates a processing procedure of a cell mode change process executed by the cell mode change process execution unit 18000 requested to interchange the cell mode from the page cell mode selection execution unit 15200 in step 17005 of the write-after process described above in FIG. 32. Here, the virtual blocks of a multiple of 12 are assumed to be designated as interchange targets from the page cell mode selection execution unit 15200.

Step 19000: a cell mode change process execution unit 16000 recognizes whether it is necessary to change the cell mode of a certain virtual block from the QLC mode to the TLC mode from the address designated in the request. In this case, a process of moving data stored in 12 virtual blocks to which 3 actual blocks operating in the QLC mode are allocated to 4 actual blocks operating the TLC mode is executed once or more.

Step 19001: it is necessary to guarantee a necessary number of empty actual blocks operated in the TLC. Therefore, the cell mode change process execution unit 16000 calculates a necessary number of actual pages from the set of the virtual blocks of which the data is moved. The number of pieces of actual page information 15000 (see FIG. 29) is moved from the QLC empty actual block information management queue 3401 (see FIG. 16) managed with the QLC empty actual block information pointer 3400 (see FIG. 11) to the TLC empty actual block information management queue 3501 managed with the TLC empty actual block information pointer 3500 (see FIG. 11).

The cell mode change process execution unit 16000 changes the cell mode of the actual pages in which the actual page information 15000 is moved from the QLC mode to the TLC mode in this way. Further, the cell mode change process execution unit 16000 changes the cell mode stored in the page cell mode field 15001 (see FIG. 29) of the actual page information 15000 to the TLC mode with regard to the actual pages. Furthermore, with regard to each actual block that forms the actual pages, the cell mode change process execution unit 16000 changes the capacity stored in the actual block empty capacity field 3304 of the actual block information 3300 (see FIG. 15) to a capacity in accordance with a block size when the cell mode is the TLC mode.

Step 19002: since the data of the 12 virtual blocks operating in the QLC mode is moved to the actual pages in the TLC mode, the cell mode change process execution unit 16000 calls the virtual block movement processing unit 9500 (see FIG. 33). Since the process of the virtual block movement processing unit 9500 has been described above in the first embodiment, the description thereof will not be repeated.

Step 19003: the cell mode change process execution unit 16000 determines whether the movement is completed with regard to all the virtual blocks of the movement targets. When the negative result is obtained in this determination, the cell mode change process execution unit 16000 returns the process to step 19002 and calls the virtual block movement processing unit 9500 again (No in step 19003). Conversely, when the positive result is obtained in this determination, the cell mode change process execution unit 16000 causes the process to proceed to step 19004 (Yes in step 19003).

Step 19004: the cell mode change process execution unit 16000 confirms the number of virtual blocks in an empty state in the TLC empty actual block information management queue 3501 (see FIG. 17) managed with the TLC empty actual page information pointer 3500 (see FIG. 11) from the QLC empty actual block information management queue 3401 (see FIG. 16) managed with the QLC empty actual block information pointer 3400 (see FIG. 11). When the number of virtual blocks is not sufficient, the cell mode change process execution unit 16000 sets a new virtual capacity. When the virtual capacity of the flash package 230 is changed, the cell mode change process execution unit 16000 reports the new virtual capacity and the previous capacity (values stored in the package capacity field 3002 (see FIG. 12) of the corresponding package information 3000 (see FIG. 12)) to the storage controller 200. The cell mode change process execution unit 16000 sets the new virtual capacity in the package capacity field 3002. Then, the cell mode change process execution unit 16000 ends the cell mode change process.

According to the embodiment, since the actual pages each allocated to each virtual page can be operated in the QLC mode in which the amount of information storable in one cell is as large as possible, the same advantageous effects as the advantageous effects of the first embodiment can be obtained.

(3) Other Embodiments

In the above-described first embodiment, the function of the prediction unit that predicts whether the degree of deterioration which is the degree of deterioration in the virtual block (the actual block) reaches the limit of the degree of deterioration within the target period in the case of a current cell mode for each virtual block (actual block) is mounted on the package processor 310 (see FIG. 3) of the flash package 230 (see FIG. 3), as described above, but the invention is not limited thereto. The function may be mounted on the storage controller 200 (see FIG. 2). In the second embodiment, the function of the prediction unit that predicts whether the degree of deterioration which is the degree of deterioration in the virtual page (the actual page) reaches the limit of the degree of deterioration within the target period in the case of a current cell mode for each virtual page (actual page) is mounted on the storage controller 200, as described above, but the invention is not limited thereto. The function may be mounted on the package processor 310 of the flash package 230.

In the above-described first and second embodiments, when the cell mode of the actual blocks or the actual pages in the QLC mode is changed to the TLC mode, the data stored in the actual blocks or the actual pages before the change is moved to other actual blocks or actual pages in the same flash package 230 or the same flash package group 280 (see FIG. 2), as described above, but the invention is not limited thereto. The data may be moved to the actual blocks or the actual pages in another flash package 230 or another flash package group 280.

Further, in the above-described first and second embodiments, the number of data erasures for each block or each page within the warranty period of the flash package 230 (see FIG. 3) is estimated based on the data write amount on the blocks or the pages, as described above, but the invention is not limited thereto. For example, the number of data erasures per unit time in the blocks or the pages may be counted and the number of data erasures for each block or each page within the warranty period of the flash package 230 may be estimated based on the count result.

Further, in the above-described first and second embodiments, the degree of deterioration in the virtual blocks or the virtual pages is predicted based on the data write amount on the virtual blocks or the virtual pages within the warranty period of the flash package 230, as described above, but the invention is not limited thereto. For example, the degree of deterioration in the virtual blocks or the virtual pages may be estimated based on the number of writes per unit time (write frequency) on each virtual block managed in the flash package 230. Various methods can be widely applied as the method of predicting the degree of deterioration of the virtual blocks or the virtual pages. Even when the degree of deterioration in the virtual blocks or the virtual pages is predicted based on the number of writes per unit time (write frequency) on each virtual block managed in the flash package 230, the same advantages as those of the first and second embodiments can be obtained.

In this case, the "limit of the degree of deterioration" is determined by definition of the degree of deterioration. For example, when the "degree of deterioration" is defined as the number of overwrites of data on the blocks or the pages, the upper limit of the number of overwrites determined by measurement or the like on the blocks or the pages in advance is the "limit of the degree of deterioration." Accordingly, in this case, the virtual capacity determination processing unit 9400 (see FIG. 23) or the page cell mode selection execution unit 15200 (see FIG. 30) predicts whether the number of writes (the number of overwrites) of the data on the virtual blocks or the virtual pages reaches the limit of the number of writes (the number of overwrites) requested in advance by measurement or the like within the warranty period.

Further, in the above-described first and second embodiments, the warranty period of the flash package 230 is set as the target period, as described above, but the invention is not limited thereto. A period other than the warranty period of the flash package 230 may be set as the target period.

Further, in the above-described first and second embodiments, the virtual capacity determination processing unit 9400 (see FIG. 23) or the page cell mode selection execution unit 15200 (see FIG. 30) have the functions of the prediction unit that predicts whether the degree of deterioration of the storage region reaches the limit of the degree of deterioration within the target period when the cell mode is the first mode in the storage region with a predetermined size, the determination unit that determines the storage region of which the cell mode is changed from the first mode to the second mode based on the prediction result of the prediction unit, and the mode change unit that changes the cell mode of the corresponding storage region to the second mode in accordance with the determination result of the determination unit, as described above, but the invention is not limited thereto. Programs that have the functions of the prediction unit, the determination units, and the mode change unit may be independently provided.

The invention can be widely applied to a storage system that includes a flash package in which a single flash ship or a plurality of flash chips are accommodated and a storage controller that reads/writes data from and on the flash package in response to a request from a high-order device.

What is claimed is:

1. A storage system including a flash storage in which a plurality of flash chips are accommodated and a storage controller that reads/writes data from and on the flash storage in response to a request from a high-order device, the flash chip capable of changing a mode of a cell of the flash chip to a first mode and a second mode in which an amount of storable information is less but a lifetime is longer than in the first mode, the storage system comprising:
   a prediction processor predicting a lifetime of a first storage region for each first storage region to compare the lifetime with a target period, wherein the lifetime of the first storage region is predicted based on a degree of deterioration determined by a number of erasures of data or an error bit value from the first storage region, and wherein the degree of deterioration allowed in the first storage region is different than a degree of deterioration in a second storage region;

a determination processor determining the first storage region in which the mode of the cell is changed based on a comparison result of the prediction processor; and
a mode processor changing the mode of the cell of the corresponding first storage region in accordance with a determination result of the determination processor, wherein a plurality of the flash storages are managed as a flash storage group that forms redundant arrays of inexpensive disks (RAID), and data stored in the first storage region is moved to the first storage region in the same flash storage or the same flash storage group, when the determination processor determines it is necessary to change the mode of the cell of at least one flash storage in the group, the modes of cells of all the flash storages in the same RAID group are changed.

2. The storage system according to claim 1, wherein the lifetime is predicted based on a write frequency on the flash storage.

3. The storage system according to claim 1, wherein an error bit value at the time of reading data of the first storage region is used to determine the lifetime.

4. The storage system according to claim 1, wherein the prediction processor, the determination processor, and the mode processor are provided in the flash storage, the storage controller manages a capacity of each flash module, and the flash storage further includes a notification processor for notifying the storage controller of a change in the capacity when the mode of the cell of the first storage region is changed.

5. The storage system according to claim 1, wherein the prediction processor is provided in the storage controller.

6. The storage system according to claim 1, further comprising:
a data movement processor moving data stored in the first storage region of which the mode of the cell is determined to be changed by the determination processor, to the first storage region in the same or different flash storage, wherein the mode of the cell is changed after the movement of the data.

7. The storage system according to claim 1, wherein the first storage region is a block which is an erasure unit in the flash storage.

8. The storage system according to claim 1, wherein the first storage region in which the lifetime is predicted and the mode of the cell is changed is a unit smaller than a block which is an erasure unit in the flash storage.

9. A storage system in which when a mode of a cell of a first storage region is changed from a first mode to a second mode based on prediction of a lifetime of the first storage region, a mode of another cell is changed from the second mode to the first mode, wherein the first storage region is managed as a flash storage group of a plurality of storage regions that forms redundant arrays of inexpensive disks (RAID), and wherein when it is necessary to change the mode of at least one cell of the first storage region in the group, modes of a plurality of cells of all the storage regions in the same RAID group are changed.

10. A control method of a storage system including a flash storage in which a plurality of flash chips are accommodated and a storage controller that reads/writes data from and on the flash storage in response to a request from a high-order device, the flash chip capable of changing a mode of a cell of the flash chip to a first mode and a second mode in which an amount of storable information is less but a lifetime is longer than in the first mode, the control method comprising steps of:
predicting a lifetime of a first storage region for each first storage region to compare the lifetime with a target period by a prediction processor, wherein the lifetime of the first storage region is predicted based on a degree of deterioration determined by a number of erasures of data or an error bit value from the first storage region, and wherein the degree of deterioration allowed in the first storage region is different than a degree of deterioration in a second storage region;
determining the first storage region in which the mode of the cell is changed based on a comparison result of the prediction processor by a determination processor; and
changing the mode of the cell of the corresponding first storage region in accordance with a determination result of the determination processor by a mode processor, wherein a plurality of the flash storages are managed as a flash storage group that forms redundant arrays of inexpensive disks (RAID), and data stored in the first storage region is moved to the first storage region in the same flash storage or the same flash storage group, when the determination processor determines it is necessary to change the mode of the cell of at least one flash storage in the group, the modes of cells of all the flash storages in the same RAID group are changed.

11. A storage system including a plurality of flash chips and a controller that controls reading/writing of data from and on the flash chips in response to a request from a high-order device, the flash chip capable of changing a mode of a cell of the flash chip to a first mode and a second mode in which an amount of storable information is less but a lifetime is longer than in the first mode, the storage system comprising:
a prediction processor that predicts a lifetime of a first storage region for each first storage region to compare the lifetime with a target period, wherein the lifetime of the first storage region is predicted based on a degree of deterioration determined by a number of erasures of data or an error bit value from the first storage region, and wherein the degree of deterioration allowed in the first storage region is different than a degree of deterioration in a second storage region;
a determination processor that determines the first storage region in which the mode of the cell is changed based on a comparison result of the prediction processor; and
a mode processor that changes the mode of the cell of the corresponding first storage region in accordance with a determination result of the determination processor, wherein a plurality of the flash chips are managed as a flash chip group that forms redundant arrays of inexpensive disks (RAID), and data stored in the first storage region is moved to the first storage region in the same flash chip or the same flash chip group, when the determination processor determines it is necessary to change the mode of the cell of at least one flash chip in the group, the modes of cells of all the flash chips in the same RAID group are changed.

* * * * *